US012706968B2

(12) United States Patent
Chao et al.

(10) Patent No.: US 12,706,968 B2
(45) Date of Patent: Aug. 11, 2026

(54) USE OF EPHEMERAL WORKLOADS TO MONITOR COMPUTE ENVIRONMENTS

(71) Applicant: Fortinet, Inc., Sunnyvale, CA (US)

(72) Inventors: Neil Chao, Cupertino, CA (US); Chonghan Chen, Mountain View, CA (US); Craig E. Skinfill, Harleysville, PA (US); Dmytro Ilchenko, Cary, NC (US); Anand Natarajan, San Ramon, CA (US); Meghan Kast, Mountain View, CA (US); Derek G. Murray, Redwood City, CA (US); Rui Zhang, Brooklyn, NY (US); Yijou Chen, Cupertino, CA (US)

(73) Assignee: FORTINET, INC., Sunnyvale, CA (US)

( * ) Notice: Subject to any disclaimer, the term of this patent is extended or adjusted under 35 U.S.C. 154(b) by 56 days.

(21) Appl. No.: 18/986,377

(22) Filed: Dec. 18, 2024

(65) Prior Publication Data

US 2025/0202973 A1 Jun. 19, 2025

Related U.S. Application Data

(60) Provisional application No. 63/611,446, filed on Dec. 18, 2023.

(51) Int. Cl.
*H04L 67/1008* (2022.01)
*H04L 67/1038* (2022.01)

(52) U.S. Cl.
CPC ...... *H04L 67/1008* (2013.01); *H04L 67/1038* (2013.01)

(58) Field of Classification Search
CPC ........................ H04L 67/1008; H04L 67/1038
See application file for complete search history.

(56) References Cited

U.S. PATENT DOCUMENTS

2015/0277856 A1* 10/2015 Payne ..................... G06F 7/588 708/250
2017/0366616 A1* 12/2017 Rodrigues Nascimento .............. H04W 4/44
2021/0021431 A1* 1/2021 Guim Bernat ........ H04L 9/3239
2021/0135931 A1* 5/2021 Jose ........................ G06F 8/656
2023/0195444 A1* 6/2023 Vohra ........................ G06F 8/60 717/172
2023/0195535 A1* 6/2023 Pabón ..................... G06F 9/455 718/104
2024/0361939 A1* 10/2024 Brown, Jr. .............. G06F 3/061

* cited by examiner

*Primary Examiner* — Benjamin M Thieu
(74) *Attorney, Agent, or Firm* — Jaffery Watson Hamilton & DeSanctis LLP

(57) ABSTRACT

Approaches to use of ephemeral workloads to monitor compute environments are described.

20 Claims, 29 Drawing Sheets

900

RECEIVE, WITH AN EPHEMERAL JOB CONTROLLER, A REQUEST TO INITIATE AN EPHEMERAL JOB WITHIN A COMPUTING ENVIRONMENT HAVING ONE OR MORE CONTAINERS AND CORRESPONDING CONTAINER SUPPORT FUNCTIONALITY 902

ANALYZE, WITH THE EPHEMERAL JOB CONTROLLER, THE REQUEST TO INITIATE THE EPHEMERAL JOB TO DETERMINE RESOURCES AND/OR LIMITS BASED ON A TARGET CONTAINER TO WHICH AN EPHEMERAL JOB IS TO BE DEPLOYED 904

INITIATE, WITH THE EPHEMERAL JOB CONTROLLER, THE EPHEMERAL JOB CORRESPONDING TO THE REQUEST IN THE TARGET CONTAINER WITH LIMITS DETERMINED FROM THE TARGET CONTAINER 906

OBTAIN, WITH THE EPHEMERAL JOB CONTROLLER, ONE OR MORE METRICS FROM THE TARGET CONTAINER VIA THE EPHEMERAL JOB 908

PROVIDE, WITH THE EPHEMERAL JOB CONTROLLER, THE ONE OR MORE METRICS TO A REMOTE ENTITY OUTSIDE OF THE TARGET CONTAINER 910

TERMINATE, WITH THE EPHEMERAL JOB CONTROLLER AND WITH IN A PRE-SPECIFIED PERIOD OF TIME, THE EPHEMERAL JOB 912

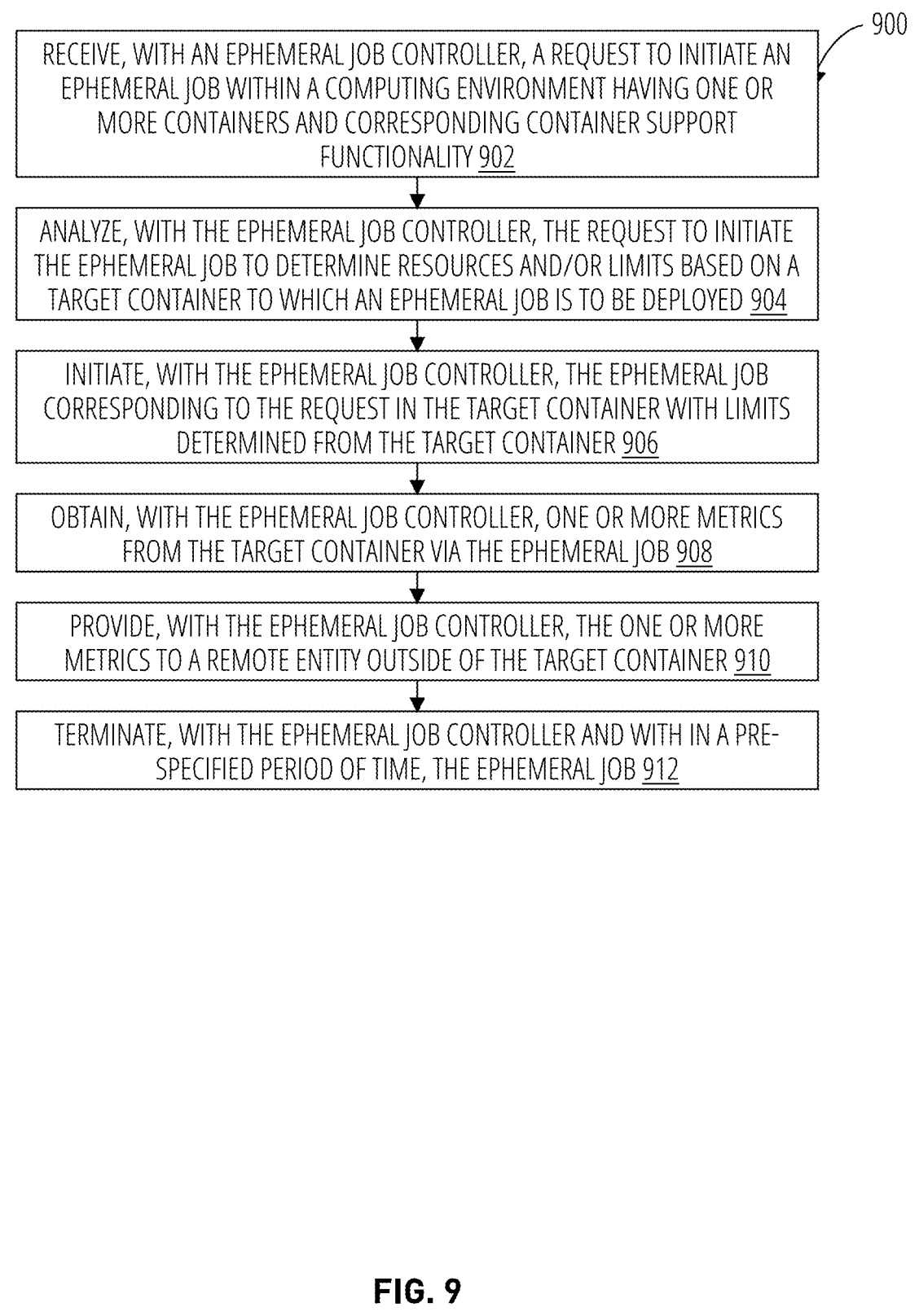

900

RECEIVE, WITH AN EPHEMERAL JOB CONTROLLER, A REQUEST TO INITIATE AN EPHEMERAL JOB WITHIN A COMPUTING ENVIRONMENT HAVING ONE OR MORE CONTAINERS AND CORRESPONDING CONTAINER SUPPORT FUNCTIONALITY 902

ANALYZE, WITH THE EPHEMERAL JOB CONTROLLER, THE REQUEST TO INITIATE THE EPHEMERAL JOB TO DETERMINE RESOURCES AND/OR LIMITS BASED ON A TARGET CONTAINER TO WHICH AN EPHEMERAL JOB IS TO BE DEPLOYED 904

INITIATE, WITH THE EPHEMERAL JOB CONTROLLER, THE EPHEMERAL JOB CORRESPONDING TO THE REQUEST IN THE TARGET CONTAINER WITH LIMITS DETERMINED FROM THE TARGET CONTAINER 906

OBTAIN, WITH THE EPHEMERAL JOB CONTROLLER, ONE OR MORE METRICS FROM THE TARGET CONTAINER VIA THE EPHEMERAL JOB 908

PROVIDE, WITH THE EPHEMERAL JOB CONTROLLER, THE ONE OR MORE METRICS TO A REMOTE ENTITY OUTSIDE OF THE TARGET CONTAINER 910

TERMINATE, WITH THE EPHEMERAL JOB CONTROLLER AND WITH IN A PRE-SPECIFIED PERIOD OF TIME, THE EPHEMERAL JOB 912

FIG. 9

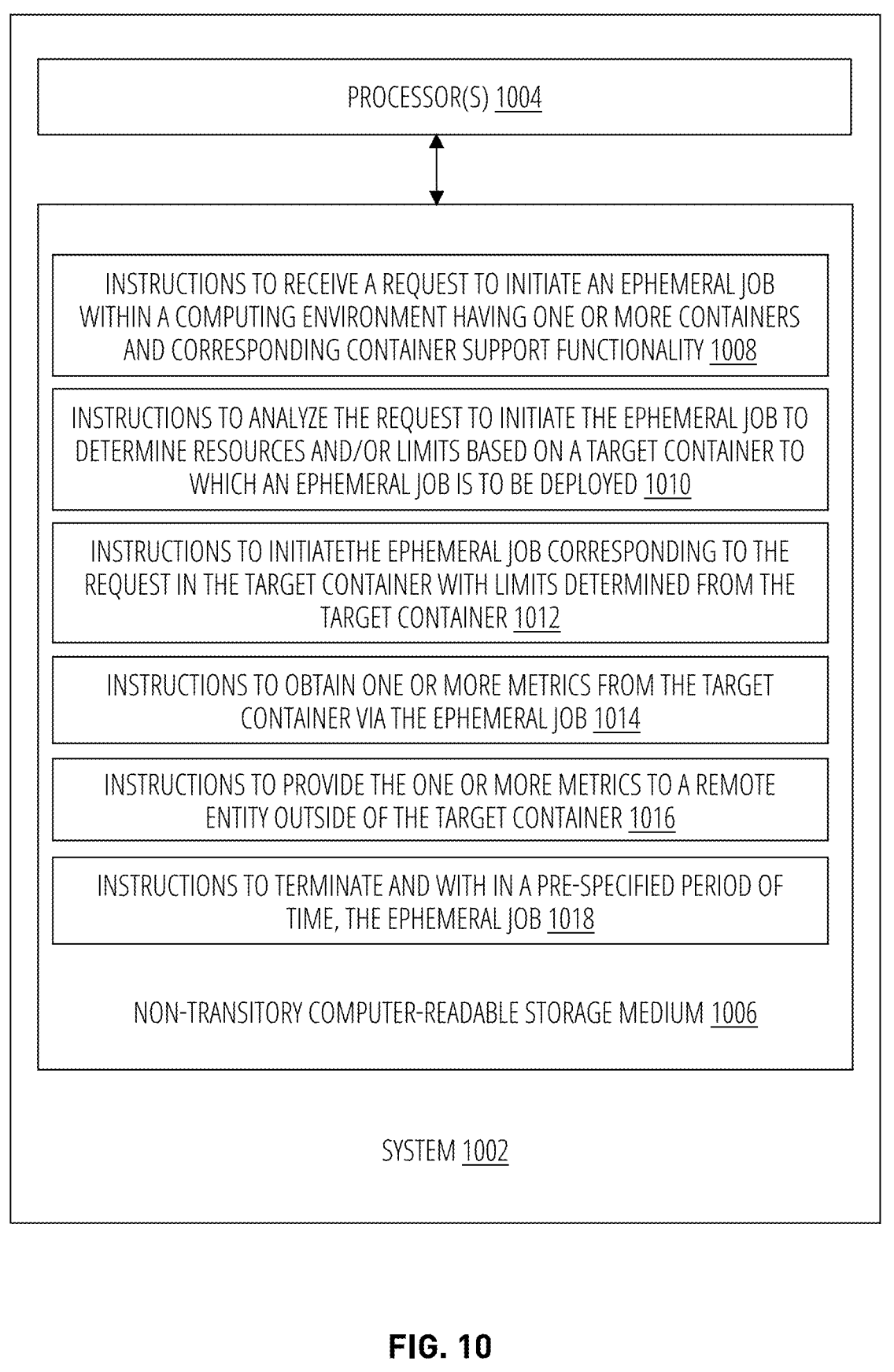

PROCESSOR(S) 1004

INSTRUCTIONS TO RECEIVE A REQUEST TO INITIATE AN EPHEMERAL JOB WITHIN A COMPUTING ENVIRONMENT HAVING ONE OR MORE CONTAINERS AND CORRESPONDING CONTAINER SUPPORT FUNCTIONALITY 1008

INSTRUCTIONS TO ANALYZE THE REQUEST TO INITIATE THE EPHEMERAL JOB TO DETERMINE RESOURCES AND/OR LIMITS BASED ON A TARGET CONTAINER TO WHICH AN EPHEMERAL JOB IS TO BE DEPLOYED 1010

INSTRUCTIONS TO INITIATETHE EPHEMERAL JOB CORRESPONDING TO THE REQUEST IN THE TARGET CONTAINER WITH LIMITS DETERMINED FROM THE TARGET CONTAINER 1012

INSTRUCTIONS TO OBTAIN ONE OR MORE METRICS FROM THE TARGET CONTAINER VIA THE EPHEMERAL JOB 1014

INSTRUCTIONS TO PROVIDE THE ONE OR MORE METRICS TO A REMOTE ENTITY OUTSIDE OF THE TARGET CONTAINER 1016

INSTRUCTIONS TO TERMINATE AND WITH IN A PRE-SPECIFIED PERIOD OF TIME, THE EPHEMERAL JOB 1018

NON-TRANSITORY COMPUTER-READABLE STORAGE MEDIUM 1006

SYSTEM 1002

FIG. 10

USE OF EPHEMERAL WORKLOADS TO MONITOR COMPUTE ENVIRONMENTS

CROSS-REFERENCE TO RELATED APPLICATION

This application claims priority of U.S. Provisional Application No. 63/611,446, filed Dec. 18, 2023, entitled "Using Ephemeral Workloads to Monitor a Compute Environment," the contents of which are incorporated by reference herein.

BACKGROUND

A data platform system may be configured to monitor one or more compute environments (e.g., a cloud compute environment). The monitoring may include collecting data about the environment(s) from one or more sources and using the data to monitor the environment(s) for anomalies, compliance, vulnerabilities, potential security threats, resources/asset management, security posture, etc. The sources of data may include one or more agents deployed in the environment(s) and/or one or more agent-less sources such as cloud log data generated by components of the environment(s). The data platform system may perform one or more actions based on the collected data to monitor the environment(s), such as generating and providing output (e.g., alerts, user interfaces and content of the user interfaces, etc.) to users such as a user of the data platform system and/or an operator of the environment(s), isolating identified issues, prioritizing identified issues, performing remedial actions designed to remediate identified issues, generating one or more logical graphs based on data collected from compute environments, using the logical graphs to monitor the environment(s) (e.g., allowing users to query the logical graph data and presenting results of the queries, detecting anomalous activity and/or potential issues based on the logical graphs), etc. However, traditional approaches to monitoring compute environments have shortcomings.

BRIEF DESCRIPTION OF THE DRAWINGS

To easily identify the discussion of any particular element or act, the most significant digit or digits in a reference number refer to the figure number in which that element is first introduced.

FIG. 2O illustrates an example of a machine server graph as rendered in an interface.

FIG. 9 is a flow diagram of an example approach to the use of ephemeral workloads to monitor compute environments.

FIG. 10 is an example of a system to perform a an example approach to the use of ephemeral workloads to monitor compute environments.

TERMS AND DEFINITIONS

Figure 1A:
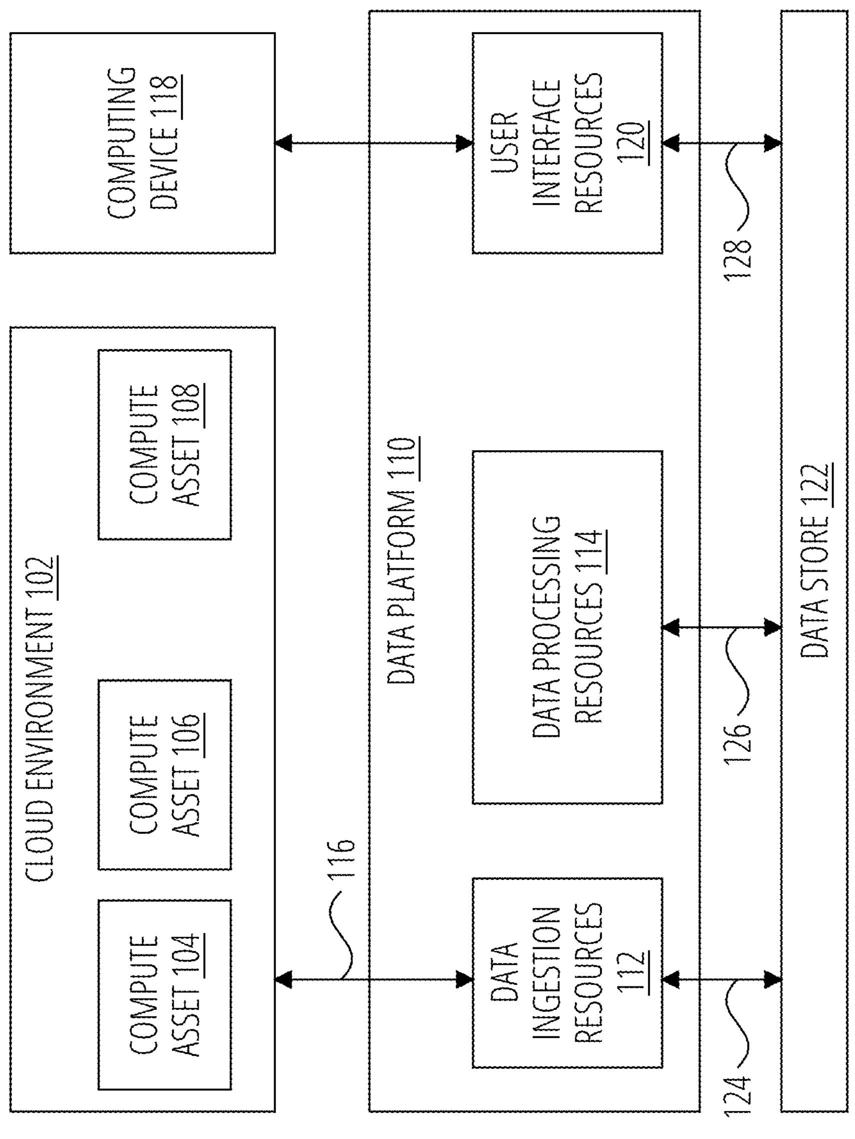
FIG. 1A shows an illustrative configuration in which a data platform is configured to perform various operations with respect to a cloud environment that includes a plurality of compute assets.

Brief definitions of terms used throughout this application are given below.

The term "client" generally refers to an application, program, process, or device in a client/server relationship that requests information or services from another program, process, or device (a server) on a network. Importantly, "client" and "server" are relative since an application may be a client to one application but a server to another. The term "client" also encompasses software that makes the connection between a requesting application, program, process, or device to a server possible, such as a file transfer protocol (FTP) client.

The phrase "endpoint protection platform" generally refers to cybersecurity monitoring and/or protection functionality performed on behalf of an endpoint (or client) device. In one embodiment, the endpoint protection platform can be deployed in the cloud or on-premises and supports multi-tenancy. The endpoint protection platform may include a kernel-level Next Generation AntiVirus (NGAV) engine with machine learning features that prevent infection from known and unknown threats and leverage code-tracing technology to detect advanced threats such as in-memory malware. The endpoint protection platform may provide monitoring and/or protection functionality on behalf of the endpoint device via an agent, which may be referred to herein as an "endpoint security agent" deployed on the endpoint device. Non-limiting examples of an endpoint protection platform include the FORTIEDR Software as a Service (SaaS) platform and the FORTICLIENT integrated endpoint protection platform available from Fortinet, Inc. of Sunnyvale, CA. In some examples, the endpoint protection platform is a participant in a cybersecurity mesh architecture (CSMA) in which various cybersecurity products/solutions/tools of a given cybersecurity or networking security vendor or across a group of participating vendors achieve a more integrated security policy by facilitating interoperability and communication among the various cybersecurity products/solutions/tools (e.g., network security appliances, a secure access service edge (SASE) platform, etc.).

The phrase "endpoint security agent" generally refers to endpoint software that runs on an endpoint device (e.g., a desktop computer, a laptop computer, or a mobile device) and monitors for cybersecurity issues arising on the endpoint device and/or protects the endpoint device against cybersecurity issues. In some examples, the endpoint security agent may be deployed on the endpoint device as a fabric agent that delivers protection, compliance, and secure access in a single, modular, lightweight client. A fabric agent may be endpoint software that runs on an endpoint device and communicates with a telemetry connection or a cybersecurity mesh (e.g., the Fortinet Security Fabric available from Fortinet, Inc. of Sunnyvale, CA) to provide information, visibility, and control to that device. In some examples, the endpoint security agent may be in the form of a lightweight endpoint agent that utilizes less than one percent of CPU and less than 100 MB of RAM and may leverage, among other things, various security event classification sources provided within one or more associated cloud-based security services.

A non-limiting example of an endpoint security agent is the FORTICLIENT Fabric Agent available from Fortinet, Inc. of Sunnyvale, CA. In one example, to simplify the initial deployment and offload ongoing monitoring, an endpoint security agent may be managed and/or supported by one or more endpoint-focused managed services, for example, to provide setup, deployment, configuration, vulnerability monitoring, and overall endpoint security monitoring. In the context of a CSMA, the endpoint security agent may communicate with an endpoint protection platform, one or more network security appliances, and/or one or more cloud-based security services via a telemetry connection and/or via application programming interface (API) integration. In some examples, the endpoint security agent enables remote workers to connect to the network using zero-trust principles securely and may enable both Universal ZTNA and Virtual Private Network (VPN)-encrypted tunnels, as well as URL filtering and cloud access security broker (CASB). The endpoint security agent may additionally provide enhanced security capabilities through artificial intelligence (AI)-based NGAV, endpoint quarantine, and application firewall, as well as support for cloud sandbox, USB device control, and ransomware protection.

As used herein, a "network security appliance" or a "network security device" generally refers to a device or appliance in virtual or physical form that is operable to perform one or more security functions. A network security device may reside within the particular network that it is protecting, or network security may be provided as a service with the network security device residing in the cloud. Some network security devices may be implemented as general-purpose computers or servers with appropriate software to perform one or more security functions. Other network security devices may include custom hardware (e.g., one or more custom Application-Specific Integrated Circuits (ASICs)).

For example, while there are differences among network security device vendors, network security devices may be classified into three general performance categories, including entry-level, mid-range, and high-end network security devices. Each category may use different types and forms of central processing units (CPUs), network processors (NPs), and content processors (CPs). NPs may be used to accelerate traffic by offloading network traffic from the main processor. CPs may be used for security functions, such as flow-based inspection and encryption. Entry-level network security devices may include a CPU and no co-processors or a system-on-a-chip (SoC) processor that combines one or more CPUs, CPs, and NPs. Mid-range network security devices may include one or more multi-core CPUs, one or more separate NP Application-Specific Integrated Circuits (ASICs), and one or more CP ASICs. At the high end, network security devices may have multiple NPs and/or multiple CPs. A network security device is typically associated with a particular network (e.g., a private enterprise network) on behalf of which it provides one or more security functions.

Non-limiting examples of security functions include authentication, next-generation firewall protection, antivirus scanning, content filtering, data privacy protection, web filtering, network traffic inspection (e.g., secure sockets layer (SSL) or Transport Layer Security (TLS) inspection), intrusion prevention, intrusion detection, denial of service attack (DoS) detection and mitigation, encryption (e.g., Internet Protocol Secure (IPSec), TLS, SSL), application control, Voice over Internet Protocol (VOIP) support, Virtual Private Networking (VPN), data loss prevention (DLP), antispam, antispyware, logging, reputation-based protections, event correlation, network access control, vulnerability management, and the like. Such security functions may be deployed individually as part of a point solution or in various combinations as a unified threat management (UTM) solution.

Non-limiting examples of network security appliances/devices include network gateways, VPN appliances/gateways, UTM appliances (e.g., the FORTIGATE family of network security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), network access control appliances (e.g., FORTINAC family of network access control appliances), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), virtual or physical sandboxing appliances (e.g., FORTISANDBOX family of security appliances), and DoS attack detection appliances (e.g., the FORTIDDOS family of DOS attack detection and mitigation appliances).

As used herein, "Zero-Trust Network Access" or "ZTNA" generally refers to a set of technologies and functionalities that enable secure access to internal applications for local or remote users (e.g., utilizing on-net endpoint or client devices within an enterprise network or off-net endpoint or client devices outside of the enterprise network, respectively). ZTNA represents the evolution of VPN remote access, bringing the zero-trust model to application access. ZTNA may be used to authenticate and authorize access to resources based on identity, device, and/or contextual data. ZTNA solutions typically grant access on a per-session basis to individual applications only after devices and users are verified.

As used herein, a "ZTNA Access Point" or "ZTNA AP" generally refers to any hardware device, software application, or combination of hardware and software that may be used to control access to protected network devices, servers, resources, services, TCP applications, and/or databases by a requesting endpoint device. Sometimes, a ZTNA AP runs one or more access proxies, including a TFAP. Depending on the implementation, a ZTNA may be provided in virtual or physical form. For example, a ZTNA AP may be a virtual node or container that runs one or more access proxies or a network security appliance (e.g., a UTM appliance) that runs one or more access proxies.

As used herein, a "job controller" or "ephemeral job controller" (EJC) is a component of the host system that allows services to dynamically launch jobs (e.g., Kubernetes jobs) with helpers for launching ephemeral jobs (e.g., Spark jobs). In an example, the job controller (or ephemeral job controller) manages concurrency limits (e.g., for clients that support a limited number of concurrent jobs). In an example, the job controller (or ephemeral job controller) provides application program interface (API) multiplexing (e.g., GET requests can be multiplexed over a Kubernetes Informer, meaning that it consumes only a small/finite number of active connections to the API server). In an example, the job controller (or ephemeral job controller) provides state handling (e.g., an EJC can provide an abstraction over the Kubernetes API to make it easier to understand the state of a job to allow clients to better handle jobs that are in an unexpected state). In an example, the job controller (or ephemeral job controller) provides Spark support (e.g., the EJC can provide a specific interface for creating Spark jobs, which simplifies management of the data platform system's Spark infrastructure). In an example, the job controller (or ephemeral job controller) can provide validation support (e.g., by validating jobs against Kubernetes best practices).

As used herein, a "secure connection" generally refers to a connection provided through a computer network by one or more protocols that secure communication and data transfers via the connection, for example, via end-to-end encryption. Non-limiting examples by which a secure connection may be established include HTTPS, Hypertext Transport Protocol version 1.1 (HTTP 1.1) over SSL, Hypertext Transfer Protocol version 2.0 (HTTP 2.0) over SSL, Hypertext Transfer Protocol version 3.0 (HTTP 3.0) over Quick User Datagram Protocol (UDP) Internet Connections (QUIC).

A "computer" or "computer system" may be one or more physical computers, virtual computers, or computing devices. As an example, a computer may be one or more server computers, cloud-based computers, cloud-based clusters of computers, virtual machine instances, or virtual machine computing elements such as virtual processors, storage and memory, data centers, storage devices, desktop computers, laptop computers, mobile devices, or any other special-purpose computing devices. Any reference to "a computer" or "a computer system" herein may mean one or more computers unless expressly stated otherwise.

The terms "connected" or "coupled" and related terms are used in an operational sense and are not necessarily limited to a direct connection or coupling. Thus, for example, two devices may be coupled directly or via one or more intermediary media or devices. As another example, devices may be coupled so that information can be passed between them without sharing any physical connection with one another. Based on the disclosure provided herein, one of ordinary skill in the art will appreciate a variety of ways in which connection or coupling exists in accordance with the aforementioned definition.

If the specification states a component or feature "may," "can," "could," or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," "in an example," "in some examples," and the like generally mean the particular feature, structure, or characteristic following the phrase is included in at least one embodiment of the present disclosure and may be included in more than one embodiment of the present disclosure. Importantly, such phrases do not necessarily refer to the same embodiment.

DETAILED DESCRIPTION

In some embodiments, a data platform system may be configured to monitor various cloud environments provided by various cloud services providers, including but not limited to Amazon Web Services (AWS), Google Cloud Platform (GCP), Azure available from Microsoft, and Oracle Cloud Infrastructure (OCI) cloud environments. For example, the data platform system may provide resource management and/or cloud security posture management for one or more such cloud environments. Such monitoring of a cloud environment may include collecting data from the cloud environment, such as configuration data (e.g., resource configuration metadata), using the data to identify vulnerabilities and/or compliance statuses of resources (e.g., software components such as software applications, libraries, etc.) in the cloud environment, and performing one or more operations based on the identified vulnerabilities and/or compliance statuses (e.g., providing output, generating alerts, remediating, etc.).

In some embodiments, the data platform system may be deployed to and run in a compute environment (e.g., a cloud environment such as AWS, GCP, Azure, OCI, etc.) where operations/workloads performed by the data platform system are executed by computing resources of the compute environment. At least some such operations/workloads may be in the form of jobs that are executed by computing resources of the compute environment. Jobs may be executed as part of any aspect of the data platform system, such as any service provided by the data platform system. For example, the data platform system may run jobs as part of generating a logical graph model based on data collected from a compute environment being monitored by the data platform system, such as jobs that determine and/or check edge dependencies of nodes of the logical graph (e.g., connection matching, edge matching, etc.) and/or any other jobs associated with generating a logical graph.

In some embodiments, one or more of the jobs run by the data platform system may be persisted jobs. A persisted job may be started up and continue to run (persisted) in the compute environment such that the job is able to respond to multiple requests, including requests associated with multiple accounts with the data platform system, which accounts may be associated with multiple customers of a service provided by the data platform system. That is, the job, while continuing to run (at least in an idle or standby mode), may be persisted, and re-used to respond to multiple requests for the job to be performed. Persisted jobs may be referred to as long-lived jobs.

In some embodiments, one or more of the jobs run by the data platform system may be ephemeral jobs. An ephemeral job may be started up and run in response to a specific request that the job be performed. After completion of the requested job, the ephemeral job may be terminated. Accordingly, the ephemeral job may be specifically started and run only for a specific request and terminated after the job is completed for the request.

Persisted and ephemeral jobs may provide various technical features and benefits. Persisted jobs may use fewer computing resources associated with startup and termination of jobs, may be easier to manage than ephemeral jobs, and may be made available across customer accounts for multi-tenant use. But if one use of a persisted job (e.g., a use of the job for one customer account) causes a problem with the job, current and subsequent uses of the job (e.g., uses of the job for other customer accounts) may be adversely affected. For example, one use of the job may overuse resources and create a bottleneck for the job, which may cause a subsequent use of the job to experience a delay and not satisfy service level objectives. Compared to persisted jobs, ephemeral jobs may provide improved isolation of data platform services between customer accounts (by running one job specific to one request instead of one job for multiple requests), resource usage predicting and sizing, and resource utilization efficiency (e.g., ephemeral jobs do not consume resources to sit idle waiting for another requested use of the job). Such benefits may provide improved privacy posture by reducing the risk of data bleed across tenants and/or may reduce costs associated with allocation and use of computing resources to run jobs.

In some deployments of the data platform system, the use of ephemeral jobs may introduce technical challenges due to limitations of the computing resources and/or services associated with the deployment. In some embodiments, for example, the data platform system may be deployed using a managed Kubernetes service such as Amazon Elastic Kubernetes Service (EKS) running in an on-premises compute environment or a cloud environment such as AWS. The managed service may have limitations, which limitations may be documented and/or undocumented. Such limitations may affect the ability to run ephemeral jobs at a large scale while satisfying service level objectives (e.g., latency requirements). For example, the managed service may have upper limits on the number of jobs that can be concurrently started and run while still providing results fast enough to satisfy required service level objectives. As another example, the managed service may have limits on the quantity or rate of queries for status information about jobs.

Kubernetes, often abbreviated as K8s, is an open-source container orchestration platform designed to automate the deployment, scaling, and management of containerized applications. Originally developed by Google, Kubernetes is commonly used for managing containerized workloads across various environments, including public clouds, private clouds, and on-premises infrastructures.

Kubernetes automates many manual processes involved in deploying and managing containers. This includes starting new applications, restarting them if they crash, and scaling them based on demand. A Kubernetes deployment is referred to as a "cluster," which consists of multiple nodes that run containers. Each node can be a physical or virtual machine and runs pods-groups of one or more containers. Users define their desired application state using manifests. Kubernetes then ensures that the current state matches this desired state through its control plane.

Kubernetes continuously monitors the health of applications and automatically restarts or replaces containers that fail or become unresponsive. It provides built-in solutions for load balancing traffic across containers and discovering services within the cluster.

Kubernetes architecture consists of two main components: the control plane and nodes. The control plane is responsible for managing the state of the cluster. It includes components like the API server, scheduler, and controller manager. Nodes are the machines that run the applications. Each node has a "kubelet," which communicates with the control plane to manage the lifecycle of containers on that node.

The kubelet is service that ensures containers are running in a pod as expected. The kube-scheduler assigns pods to nodes based on resource availability. The kube-proxy manages network routing for services within the cluster.

Kubernetes is used for micro-services management because it simplifies deploying applications composed of multiple micro-services. Kubernetes is also used for cloud migration as it facilitates moving existing applications to cloud environments. Kubernetes is also used for application modernization because it supports containerizing legacy applications to improve performance and scalability.

In an embodiment, ephemeral jobs are handled as Spark jobs. Apache Spark is a distributed computing framework designed for processing large-scale data across a cluster of computers. It achieves this by breaking tasks into smaller pieces (distributed computing) and processing them in parallel, enabling high-speed computation. Spark is versatile and can handle various types of workloads, including batch processing, interactive queries, streaming data, and machine learning tasks.

A Spark job is a unit of work submitted to Spark. It comprises multiple stages (sub-tasks) that are executed across the cluster. A Spark job is submitted by a user or application (e.g., a Python or Scala script). Spark creates a Directed Acyclic Graph (DAG) representing the sequence of operations (like a flowchart for accomplishing a task). The DAG is divided into smaller stages, and tasks within each stage are executed by the workers. The results of all tasks are aggregated and returned to the user or written to a specified output.

Ephemeral jobs are short-lived tasks that perform temporary or one-off operations. These jobs do not need persistent resources or long-running sessions. Examples include data cleanup tasks, aggregating metrics for a single report, running machine learning model predictions for a specific batch of data, etc. Spark can dynamically allocate resources for ephemeral jobs. It acquires resources only for the duration of the job and releases them afterward, ensuring efficiency. Spark can run ephemeral jobs in various modes including, for example, standalone mode that runs on its own cluster, or YARN/Mesos/Kubernetes Mode that integrates with resource managers to allocate and release resources. Ephemeral jobs can process temporary streams of data using Spark's structured streaming. This is useful for handling data bursts (e.g., processing logs from a short-lived event).

One or more of the technical challenges associated with using ephemeral jobs in a deployment of the data platform system to a compute environment may be addressed by providing a job controller configured to manage jobs of the data platform system. The job controller may be configured to manage ephemeral jobs and/or persisted jobs in a manner that maximizes and/or optimizes the use of computing resources of the compute environment by the data platform system, without exceeding the limitations of the compute environment and/or a service of the compute environment. To this end, limitations of the compute environment and/or a service of the compute environment, such as a managed container service like EKS, may be determined (e.g., experimentally where not documented) and used to configure the job controller not to exceed the limitations. Such limitations may be reached by the data platform system operating to satisfy service level objectives at large scale. For example, an orchestrator and/or other Kubernetes clients of the data platform system may issue more concurrent requests than EKS is capable of handling. As another example, the data platform system may operate at a scale that may approach or reach the limits of the number of IP addresses that can be allocated to an EKS cluster.

The job controller may function as a gateway between an orchestrator (e.g., a job scheduler) and/or other clients of the data platform system that create jobs and a managed service being used to run jobs of the data platform system within a compute environment. For example, the orchestrator may schedule jobs to be run on the managed service. Instead of providing those jobs directly to the managed service, the orchestrator may provide the jobs to the job controller. The job controller may receive the jobs from the orchestrator. The job controller may additionally determine usage metrics indicative of the usage of resources of the managed service. Based on the resource usage, the job controller may selectively multiplex, prioritize, and apply rate limiting operations to one or more jobs received from the orchestrator. Rate limiting may be applied in any suitable way, such as by rate limiting jobs globally, jobs per namespace, and/or pods per namespace.

In some embodiments, the job controller may access information from the managed service in a way that minimizes queries to the managed service, which may not be configured to be heavily queried. For example, the managed service may use a Kubernetes control plane that has status information for the managed service but is not intended to be heavily queried. The job controller may query the managed service (e.g., the control plane of the managed service by way of an API of the managed service) to obtain state information for the managed service. The job controller may cache the state information and maintain the cache for use in determining the state of the managed service and/or its resources as needed, which may reduce the number of queries to the managed service. In some implementations, the job controller may offload EKS API server load by subscribing to Kubernetes events and caching them in memory. In some embodiments, the job controller may generate and store a log of all activities of the job controller and/or the managed service in a data store that the job controller maintains for a predetermined period (e.g., as a MySQL database for the last seven days). The log may be used to obtain information as needed, which may further reduce queries to the managed service.

In some embodiments, the job controller may be configured to provide a hybrid implementation in which both ephemeral and persisted jobs are run by the data platform system. For example, a first set of jobs may be run as ephemeral jobs, and a second set of other jobs may be run as persisted jobs. The sets may be determined in a way that is configured to optimize resource utilization while satisfying service level objectives.

In some embodiments, the job controller may be configured to dynamically determine whether to run a job as an ephemeral or persistent job. The determination may be made based on any suitable criteria, such as attributes of jobs (e.g., job type, latency requirement, frequency of usc, etc.) and/or as thresholds associated with resource usage and/or state of the managed service and/or jobs being processed by the managed service. This may allow the job controller to run a job either ephemerally or persistently depending on which will satisfy policies related to resource utilization, latency, etc. For example, the job controller may determine that running a particular job as a persisted job may be more efficient than running the job as an ephemeral job by avoiding resource costs associated with frequently starting up and terminating ephemeral jobs. On the other hand, the job controller may determine that running a particular job as an ephemeral job may be more efficient than running the job as a persisted job by avoiding resource costs associated with the persisted job remaining idle waiting for requests to use the job.

In some implementations, a same binary for a job may be used to run the job either as an ephemeral job or as a persisted job. This may simplify development of code for jobs while still allowing the job controller to run the job as an ephemeral or a persisted job. In some implementations, such a binary for a job may be run as a persisted job by loading the job into an engine that keeps the job running to avoid startup and shutdown costs associated with running the job as an ephemeral job.

In some embodiments, the job controller may provide and use a feedback loop to collect information about execution of jobs. Based on the collected information, the job controller may adjust future deployments of jobs, such as by adjusting rate limiting settings, moving jobs from ephemeral to persisted execution, and/or moving jobs from persisted to ephemeral execution. The adjustment based on the feedback information may be fully automatic or may require user input (e.g., by providing a notification and/or recommendation to a user based on feedback information and prompting the user for input). The job controller may provide data that may be analyzed, such as around the sizing of jobs and resources. Based on analytics of the data, recommendations may be generated and provided to users, which recommendations may indicate actions that may be performed to adjust the job controller to conserve resources while staying within service level objectives.

In some embodiments, the job controller may be resilient to changes to the managed service. For example, the job controller may be configured to identify indicators (e.g., based on state information and/or feedback information about the managed service and/or execution of jobs by the managed service) of changes to the managed service (e.g., particularly to changes to the limitations of the managed service) and to adjust settings based on the indicators. As an example, the job controller may determine, based on indicators, that a limitation of the managed service has increased or decreased. The job controller may adjust one or more settings to adjust to the change to the limitation, such as by decreasing or increasing rate limiting.

FIG. 1A shows an illustrative configuration in which a data platform is configured to perform various operations with respect to a cloud environment that includes a plurality of compute assets. FIG. 1A shows an illustrative configuration in which data platform 110 is configured to perform various operations with respect to cloud environment 102 that includes any number of compute assets (e.g., compute asset 104, compute asset 106, compute asset 108, collectively "compute assets"). For example, data platform 110 may include data ingestion resources 112 configured to ingest data from cloud environment 102 into data platform 110, data processing resources 114 configured to perform data processing operations with respect to the data, and user interface resources 120 configured to provide one or more external users and/or compute resources (e.g., computing device 118) with access to an output of data processing resources 114. Each of these resources are described in detail herein.

Cloud environment 102 may include any suitable network-based computing environment as may serve a particular application. For example, cloud environment 102 may be implemented by one or more compute resources provided and/or otherwise managed by one or more cloud service providers, such as Amazon Web Services (AWS), Google Cloud Platform (GCP), Microsoft Azure, and/or any other cloud service provider configured to provide public and/or private access to network-based compute resources.

The compute assets may include, but are not limited to, containers (e.g., container images, deployed and executing container instances, etc.), virtual machines, workloads, applications, processes, physical machines, compute nodes, clusters of compute nodes, software runtime environments (e.g., container runtime environments), and/or any other virtual and/or physical compute resource that may reside in and/or be executed by one or more computer resources in cloud environment 102. In some examples, one or more compute assets may reside in one or more data centers.

A compute asset may be associated with (e.g., owned, deployed, or managed by) a particular entity, such as a customer or client of cloud environment 102 and/or data platform 110. Accordingly, for purposes of the discussion herein, cloud environment 102 may be used by one or more entities.

Data platform 110 may be configured to perform one or more data security monitoring and/or remediation services, compliance monitoring services, anomaly detection services, DevOps services, compute asset management services, and/or any other type of data analytics service as may serve a particular implementation. Data platform 110 may be managed or otherwise associated with any suitable data platform provider, such as a provider of any of the data analytics services described herein. The various resources included in data platform 110 may reside in the cloud and/or be located on-premises and be implemented by any suitable combination of physical and/or virtual compute resources, such as one or more computing devices, microservices, applications, etc.

Data ingestion resources 112 may be configured to ingest data from cloud environment 102 into data platform 12. This may be performed in various ways, some of which are described in detail herein. For example, as illustrated by arrow 116, data ingestion resources 112 may be configured to receive the data from one or more agents deployed within cloud environment 102, utilize an event streaming platform (e.g., Kafka) to obtain the data, and/or pull data (e.g., configuration data) from cloud environment 102. In some examples, data ingestion resources 112 may obtain the data using one or more agentless configurations.

The data ingested by data ingestion resources 112 from cloud environment 102 may include any type of data as may serve a particular implementation. For example, the data may include data representative of configuration information associated with compute assets, information about one or more processes running on compute assets, network activity information, information about events (creation events, modification events, communication events, user-initiated events, etc.) that occur with respect to compute assets, etc. In some examples, the data may or may not include actual customer data processed or otherwise generated by compute assets.

As illustrated by arrow 124, data ingestion resources 112 may be configured to load the data ingested from cloud environment 102 into data store 122. Data store 122 is illustrated in FIG. 1A as being separate from and communicatively coupled to data platform 110. However, in some alternative embodiments, data store 122 is included within 110.

Data store 122 may be implemented by any suitable data warehouse, data lake, data mart, and/or other type of database structure as may serve a particular implementation. Such data stores may be proprietary or may be embodied as vendor provided products or services such as, for example, Snowflake, Google BigQuery, Druid, Amazon Redshift, IBM Db2, Dremio, Databricks Lakehouse Platform, Cloudera, Azure Synapse Analytics, and others.

Although the examples described herein largely relate to embodiments where data is collected from agents and ultimately stored in a data store such as those provided by Snowflake, in other embodiments data that is collected from agents and other sources may be stored in different ways. For example, data that is collected from agents and other sources may be stored in a data warehouse, data lake, data mart, and/or any other data store.

A data warehouse may be embodied as an analytic database (e.g., a relational database) that is created from two or more data sources. Such a data warehouse may be leveraged to store historical data, often on the scale of petabytes. Data warehouses may have compute and memory resources for running complicated queries and generating reports. Data warehouses may be the data sources for business intelligence ('BI') systems, machine learning applications, and/or other applications. By leveraging a data warehouse, data that has been copied into the data warehouse may be indexed for good analytic query performance, without affecting the write performance of a database (e.g., an Online Transaction Processing ('OLTP') database). Data warehouses also enable joining data from multiple sources for analysis. For example, a sales OLTP application probably has no need to know about the weather at various sales locations, but sales predictions could take advantage of that data. By adding historical weather data to a data warehouse, it would be possible to factor it into models of historical sales data.

Data lakes, which store files of data in their native format, may be considered as "schema on read" resources. As such, any application that reads data from the lake may impose its own types and relationships on the data. Data warehouses, on the other hand, are "schema on write," meaning that data types, indexes, and relationships are imposed on the data as it is stored in an enterprise data warehouse (EDW). "Schema on read" resources may be beneficial for data that may be used in several contexts and poses little risk of losing data. "Schema on write" resources may be beneficial for data that has a specific purpose, and good for data that must relate properly to data from other sources. Such data stores may include data that is encrypted using homomorphic encryption, data encrypted using privacy-preserving encryption, smart contracts, non-fungible tokens, decentralized finance, and other techniques.

Data marts may contain data oriented towards a specific business line whereas data warehouses contain enterprise-wide data. Data marts may be dependent on a data warehouse, independent of the data warehouse (e.g., drawn from an operational database or external source), or a hybrid of the two. In embodiments described herein, different types of data stores (including combinations thereof) may be leveraged.

Data processing resources 114 may be configured to perform various data processing operations with respect to data ingested by data ingestion resources 112, including data ingested and stored in data store 122. For example, data processing resources 114 may be configured to perform one or more data security monitoring and/or remediation operations, compliance monitoring operations, anomaly detection operations, DevOps operations, compute asset management operations, and/or any other type of data analytics operation as may serve a particular implementation. Various examples of operations performed by data processing resources 114 are described herein.

As illustrated by arrow 126, data processing resources 114 may be configured to access data in data store 122 to perform the various operations described herein. In some examples, this may include performing one or more queries with respect to the data stored in data store 122. Such queries may be generated using any suitable query language.

In some examples, the queries provided by data processing resources 114 may be configured to direct data store 122 to perform one or more data analytics operations with respect to the data stored within data store 122. These data analytics operations may be with respect to data specific to a particular entity (e.g., data residing in one or more silos within data store 122 that are associated with a particular customer) and/or data associated with multiple entities. For example, data processing resources 114 may be configured to analyze data associated with a first entity and use the results of the analysis to perform one or more operations with respect to a second entity.

One or more operations performed by data processing resources 114 may be performed periodically according to a predetermined schedule. For example, one or more operations may be performed by data processing resources 114 every hour or any other suitable time interval. Additionally, or alternatively, one or more operations performed by data processing resources 114 may be performed in substantially real-time (or near real-time) as data is ingested into data platform 110. In this manner, the results of such operations (e.g., one or more detected anomalies in the data) may be provided to one or more external entities (e.g., computing device 118 and/or one or more users) in substantially real-time and/or in near real-time.

User interface resources 120 may be configured to perform one or more user interface operations, examples of which are described herein. For example, user interface resources 120 may be configured to present one or more results of the data processing performed by data processing resources 114 to one or more external entities (e.g., computing device 118 and/or one or more users), as illustrated by arrow 128. As illustrated by arrow 128, user interface resources 120 may access data in data store 122 to perform the one or more user interface operations.

Figure 1B:
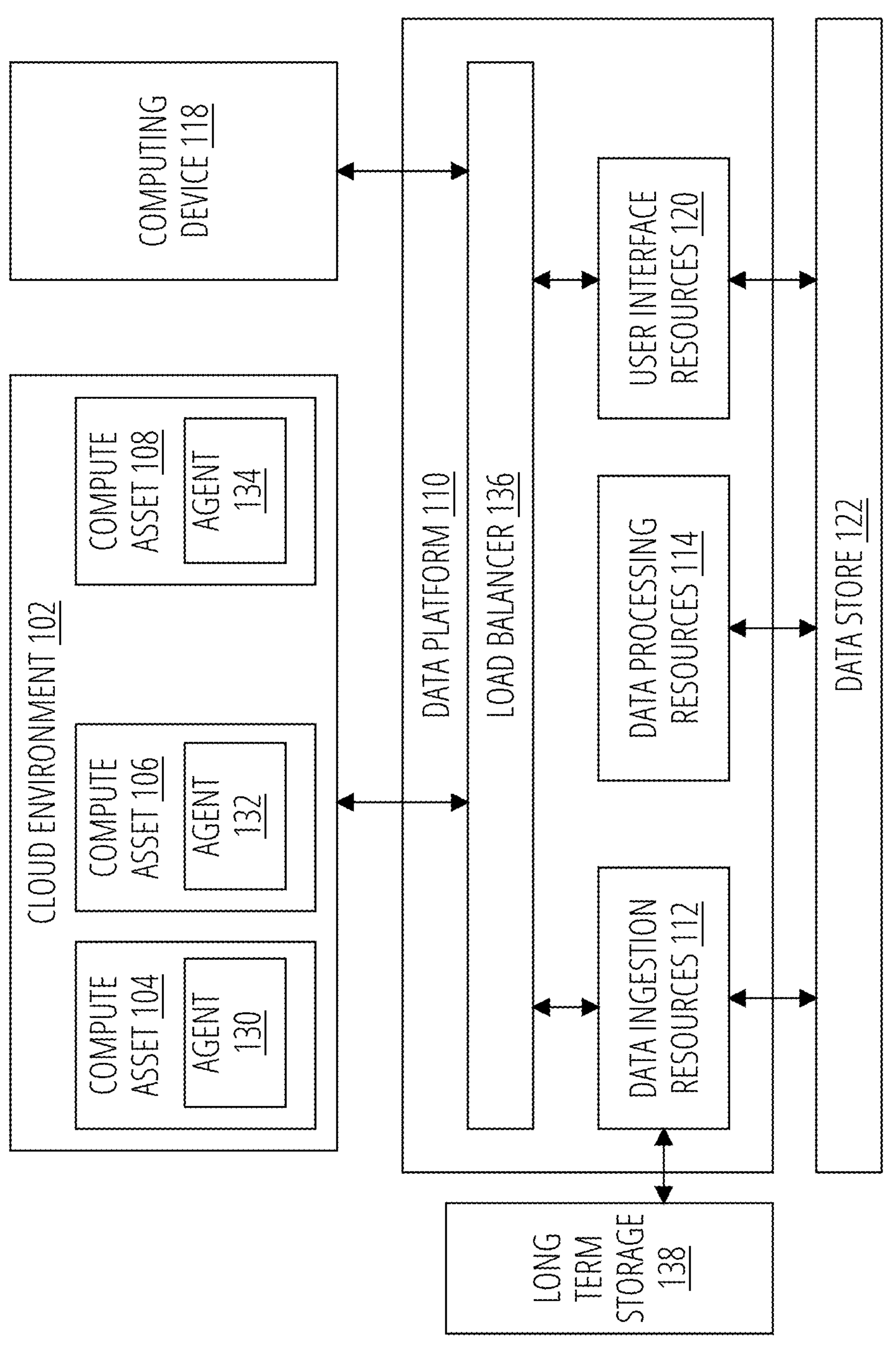
FIG. 1B shows an illustrative implementation of the configuration of FIG. 1A.

FIG. 1B shows an illustrative implementation of the configuration of FIG. 1A. FIG. 1B illustrates an implementation of the configuration of FIG. 1A in which agents (e.g., agent 130, agent 132, agent 134) are installed on each of compute assets. As used herein, an agent may include a self-contained binary and/or other type of code or application that can be run on any appropriate platforms, including within containers and/or other virtual compute assets. Agents may monitor the nodes on which they execute for a variety of different activities, including but not limited to, connection, process, user, machine, and file activities. In some examples, agents can be executed in user space and can use a variety of kernel modules (e.g., auditd, iptables, netfilter, pcap, etc.) to collect data. Agents can be implemented in any appropriate programming language, such as C or Golang, using applicable kernel APIs.

Agents may be deployed in any suitable manner. For example, an agent may be deployed as a containerized application or as part of a containerized application. As described herein, agents may selectively report information to data platform 110 in varying amounts of detail and/or with variable frequency.

Also shown in FIG. 1B is load balancer 136 configured to perform one or more load balancing operations with respect to data ingestion operations performed by data ingestion resources 112 and/or user interface operations performed by user interface resources 120. Load balancer 136 is shown to be included in data platform 110. However, load balancer 136 may alternatively be located external to data platform 110. Load balancer 136 may be implemented by any suitable microservice, application, and/or other computing resources. In some alternative examples, data platform 110 may not utilize a load balancer such as load balancer 136.

Also shown in FIG. 1B is long term storage 138 with which data ingestion resources 112 may interface. Long term storage 138 may be implemented by any suitable type of storage resources, such as cloud-based storage (e.g., AWS S3, etc.) and/or on-premises storage and may be used by data ingestion resources 112 as part of the data ingestion process. Examples of this are described herein. In some examples, data platform 110 may not utilize long term storage 138.

The embodiments described herein can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the principles described herein. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

In some examples, a non-transitory computer-readable medium storing computer-readable instructions may be provided in accordance with the principles described herein. The instructions, when executed by a processor of a computing device, may direct the processor and/or computing device to perform one or more operations, including one or more of the operations described herein. Such instructions may be stored and/or transmitted using any of a variety of known computer-readable media.

A non-transitory computer-readable medium as referred to herein may include any non-transitory storage medium that participates in providing data (e.g., instructions) that may be read and/or executed by a computing device (e.g., by a processor of a computing device). For example, a non-transitory computer-readable medium may include, but is not limited to, any combination of non-volatile storage media and/or volatile storage media. Exemplary non-volatile storage media include, but are not limited to, read-only memory, flash memory, a solid-state drive, a magnetic storage device (e.g. a hard disk, a floppy disk, magnetic tape, etc.), ferroelectric random-access memory ("RAM"), and an optical disc (e.g., a compact disc, a digital video disc, a Blu-ray disc, etc.). Exemplary volatile storage media include, but are not limited to, RAM (e.g., dynamic RAM).

Figure 1C:
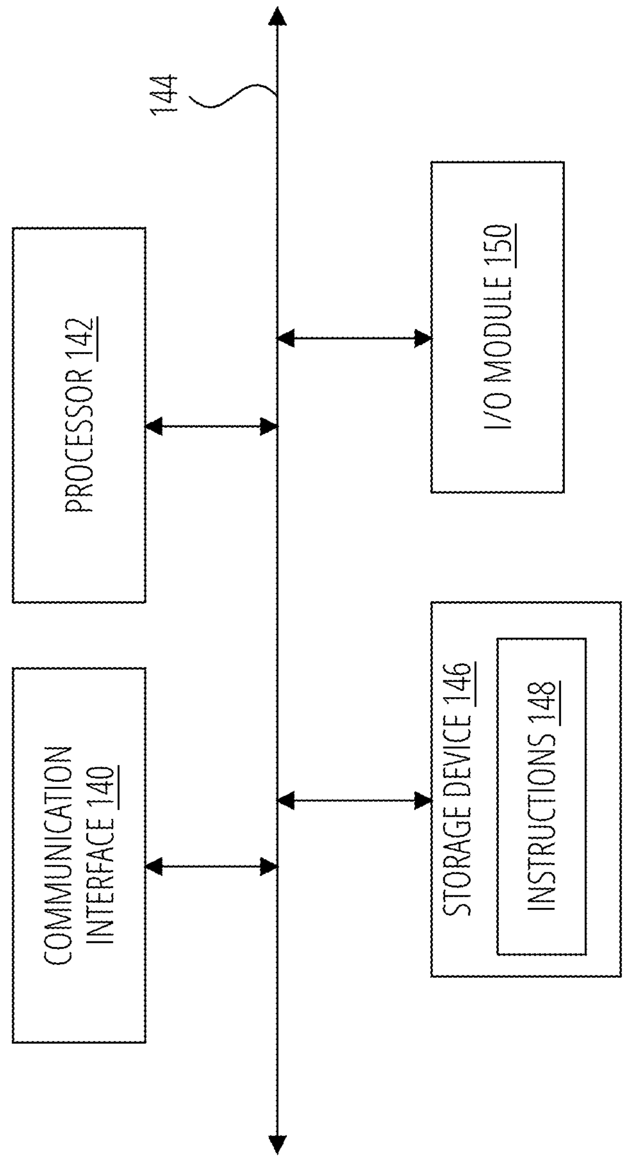
FIG. 1C illustrates an example computing device.

FIG. 1C illustrates an example computing device. FIG. 1C illustrates an example computing device that may be specifically configured to perform one or more of the processes described herein. Any of the systems, microservices, computing devices, and/or other components described herein may be implemented by computing device.

As shown in FIG. 1C, the example computing device may include communication interface 140, processor 142, storage device 146, and I/O module 150 communicatively connected one to another via communications infrastructure 144. While an exemplary computing device is shown in FIG. 1C, the components illustrated in FIG. 1C are not intended to be limiting. Additional or alternative components may be used in other embodiments. Components of the computing device shown in FIG. 1C will now be described in additional detail.

Communications infrastructure 144 may be configured to communicate with one or more computing devices. Examples of communications infrastructure 144 include, without limitation, a wired network interface (such as a network interface card), a wireless network interface (such as a wireless network interface card), a modem, an audio/video connection, and any other suitable interface.

Processor 142 generally represents any type or form of processing unit capable of processing data and/or interpreting, executing, and/or directing execution of one or more of the instructions, processes, and/or operations described herein. Processor 142 may perform operations by executing computer-executable instructions 148 (e.g., an application, software, code, and/or other executable data instance) stored in storage device 146.

Storage device 146 may include one or more data storage media, devices, or configurations and may employ any type, form, and combination of data storage media and/or device. For example, storage device 146 may include, but is not limited to, any combination of the non-volatile media and/or volatile media described herein. Electronic data, including data described herein, may be temporarily and/or permanently stored in storage device 146. For example, data representative of computer-executable instructions 148 configured to direct processor 142 to perform any of the operations described herein may be stored within storage device 146. In some examples, data may be arranged in one or more databases residing within 146.

I/O module 150 may include one or more I/O modules configured to receive user input and provide user output. I/O module 150 may include any hardware, firmware, software, or combination thereof supportive of input and output capabilities. For example, I/O module 150 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 150 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 150 is configured to provide graphical data to a display for presentation to a user. The graphical data may be representative of one or more graphical user interfaces and/or any other graphical content as may serve a particular implementation.

Figure 1D:
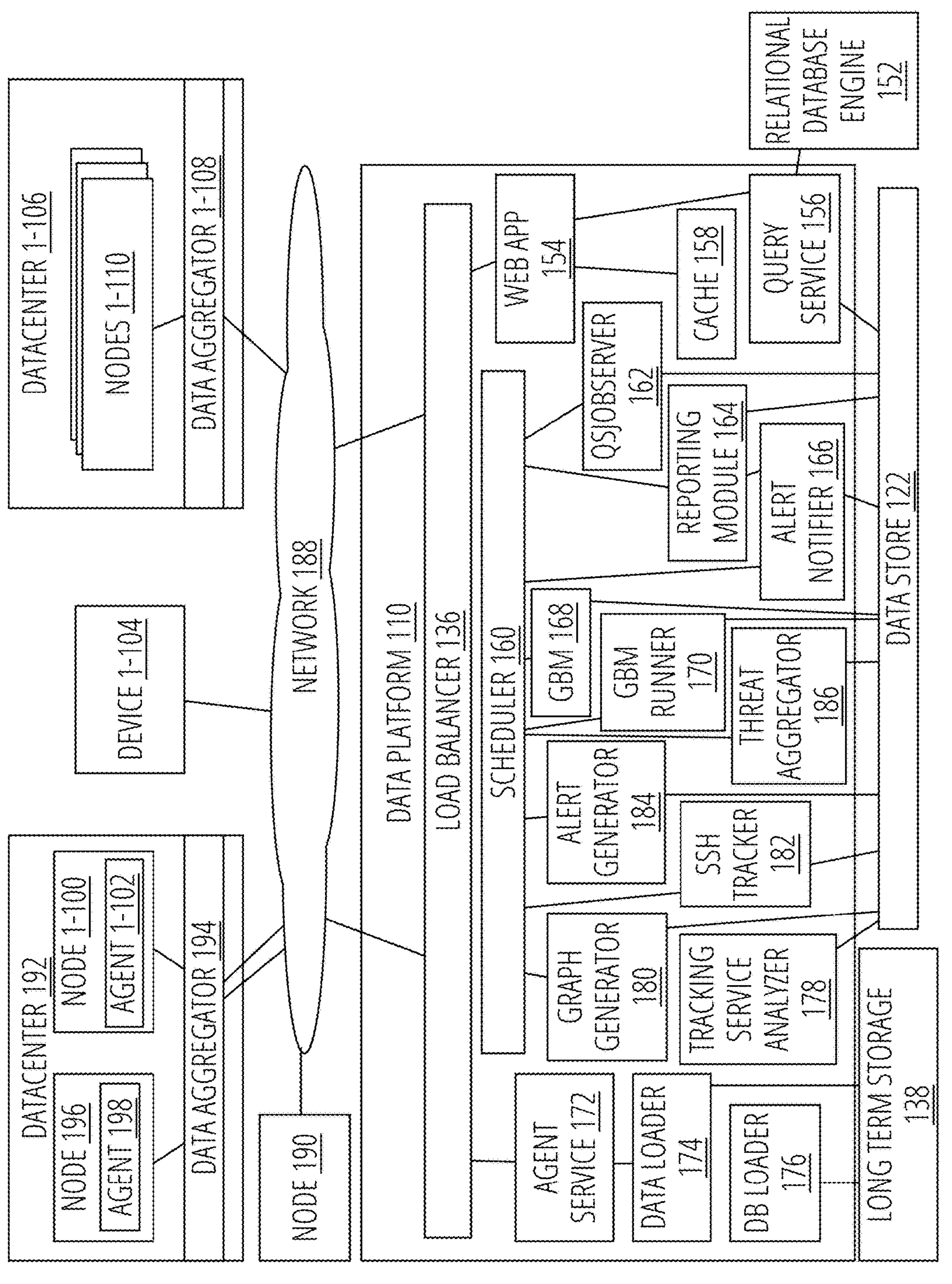
FIG. 1D illustrates an example of an environment in which activities that occur within datacenters are modeled.

FIG. 1D illustrates an example of an environment in which activities that occur within datacenters are modeled. FIG. 1D illustrates an example implementation of a configuration. As such, one or more components shown in FIG. 1D may implement one or more components shown in FIG. 1A and/or FIG. 1B. In particular, the implementation of FIG. 1D illustrates an environment in which activities that occur within datacenters are modeled using data platform 110. Using techniques described herein, a baseline of datacenter activity can be modeled, and deviations from that baseline can be identified as anomalous. Anomaly detection can be beneficial in a security context, a compliance context, an asset management context, a DevOps context, and/or any other data analytics context as may serve a particular implementation.

Two example datacenters (datacenter 192 and datacenter 1-106) are shown in FIG. 1D, and are associated with (e.g., belong to) entities named entity A and entity B, respectively. A datacenter may include dedicated equipment (e.g., owned and operated by entity A, or owned/leased by entity A and operated exclusively on entity A's behalf by a third party). A datacenter can also include cloud-based resources, such as infrastructure as a service (IaaS), platform as a service (PaaS), and/or software as a service (SaaS) elements. The techniques described herein can be used in conjunction with multiple types of datacenters, including ones wholly using dedicated equipment, ones that are entirely cloud-based, and ones that use a mixture of both dedicated equipment and cloud-based resources.

Both datacenter 192 and datacenter 1-106 include a plurality of nodes (e.g., node 196, node 1-100, node 1-100), depicted collectively as set of nodes 108 and set of nodes 110, respectively, in FIG. 1D. These nodes may implement compute assets. Installed on each of the nodes are in-server/in-virtual-machine (VM)/embedded-in-IoT device agents, which are configured to collect data and report it to data platform 110 for analysis. As described herein, agents may be small, self-contained binaries that can be run on any appropriate platforms, including virtualized ones (and, as applicable, within containers). Agents may monitor the nodes on which they execute for a variety of different activities, including connection, process, user, machine, and file activities. Agents can be executed in user space and can use a variety of kernel modules (e.g., auditd, iptables, netfilter, pcap, etc.) to collect data. Agents can be implemented in any appropriate programming language, such as C or Golang, using applicable kernel APIs.

As described herein, agents can selectively report information to data platform 110 in varying amounts of detail and/or with variable frequency. As is also described herein, the data collected by agents may be used by data platform 110 to create polygraphs, which are graphs of logical entities, connected by behaviors. In some embodiments, agents report information directly to data platform 110. In other embodiments, at least some agents provide information to a data aggregator, such as data aggregator 194 and/or data aggregator 1-108, which in turn provides information to data platform 110. The functionality of a data aggregator can be implemented as a separate binary or other application (distinct from an agent binary) and can also be implemented by having an agent execute in an "aggregator mode" in which the designated aggregator node acts as a Layer 7 proxy for other agents that do not have access to data platform 110. Further, a chain of multiple aggregators can be used, if applicable (e.g., with an agent providing data to a data aggregator, which in turn provides data to another aggregator (not pictured) which provides data to data platform 110). An example way to implement an aggregator is through a program written in an appropriate language, such as C or Golang.

Use of an aggregator can be beneficial in sensitive environments (e.g., involving financial or medical transactions) where various nodes are subject to regulatory or other architectural requirements (e.g., prohibiting a given node from communicating with systems outside of datacenter 192). Use of an aggregator can also help to minimize security exposure more generally. As one example, by limiting communications with data platform 110 to data aggregator 194, individual nodes need not make external network connections (e.g., via network 188), which can potentially expose them to compromise (e.g., by other external devices, such as device 1-104, operated by a criminal). Similarly, data platform 110 can provide updates, configuration information, etc., to data aggregator 194 (which in turn distributes them to the nodes), rather than requiring nodes to allow incoming connections from data platform 110 directly.

Another benefit of an aggregator model is that network congestion can be reduced (e.g., with a single connection being made at any given time between data aggregator 194 and data platform 110, rather than potentially many different connections being open between various of nodes and data platform 110). Similarly, network consumption can also be reduced (e.g., with the aggregator applying compression techniques/bundling data received from multiple agents).

One example way that an agent (e.g., agent 198, installed on node 196) can provide information to data aggregator 194 is via a REST API, formatted using data serialization protocols such as Apache Avro. One example type of information sent by agent 198 to data aggregator 194 is status information. Status information may be sent by an agent periodically (e.g., once an hour or once any other predetermined amount of time). Alternatively, status information may be sent continuously or in response to occurrence of one or more events. The status information may include, but is not limited to, a. an amount of event backlog (in bytes) that has not yet been transmitted, b. configuration information, c. any data loss period for which data was dropped, d. a cumulative count of errors encountered since the agent started, c. version information for the agent binary, and/or f. cumulative statistics on data collection (e.g., number of network packets processed, new processes seen, etc.).

A second example type of information that may be sent by agent 198 to data aggregator 194 is event data (described in more detail herein), which may include a UTC timestamp for each event. As applicable, the agent can control the amount of data that it sends to the data aggregator in each call (e.g., a maximum of 10 MB) by adjusting the amount of data sent to manage the conflicting goals of transmitting data as soon as possible and maximizing throughput. Data can also be compressed or uncompressed by the agent (as applicable) prior to sending the data.

Each data aggregator may run within a particular customer environment. A data aggregator (e.g., data aggregator 194) may facilitate data routing from many different agents (e.g., agents executing on nodes) to data platform 110. In various embodiments, data aggregator 194 may implement a SOCKS 5 caching proxy through which agents can connect to data platform 110. As applicable, data aggregator 194 can encrypt (or otherwise obfuscate) sensitive information prior to transmitting it to data platform 110 and can also distribute key material to agents which can encrypt the information (as applicable). Data aggregator 194 may include a local storage, to which agents can upload data (e.g., pcap packets). The storage may have a key-value interface. The local storage can also be omitted, and agents configured to upload data to a cloud storage or other storage area, as applicable. Data aggregator 194 can, in some embodiments, also cache locally and distribute software upgrades, patches, or configuration information (e.g., as received from data platform 110).

In the following example, suppose that a user (e.g., a network administrator) at entity A (hereinafter "user A") has decided to begin using the services of data platform 110. In some embodiments, user A may access a web frontend (e.g., Web app 154) using device 1-104 and enrolls (on behalf of entity A) an account with data platform 110. After enrollment is complete, user A may be presented with a set of installers, pre-built and customized for the environment of entity A, that user A can download from data platform 110 and deploy on one or more nodes. Examples of such installers include, but are not limited to, a Windows executable file, an iOS app, a Linux package (e.g., .deb or .rpm), a binary, or a container (e.g., a Docker container). When a user (e.g., a network administrator) at entity B (hereinafter "user B") also signs up for the services of data platform 110, user B may be similarly presented with a set of installers that are pre-built and customized for the environment of entity B.

User A deploys an appropriate installer on each node (e.g., with a Windows executable file deployed on a Windows-based platform or a Linux package deployed on a Linux platform, as applicable). As applicable, the agent can be deployed in a container. Agent deployment can also be performed using one or more appropriate automation tools, such as Chef, Puppet, Salt, and Ansible. Deployment can also be performed using managed/hosted container management/orchestration frameworks such as Kubernetes, Mesos, and/or Docker Swarm.

In various embodiments, the agent may be installed in the user space (i.e., is not a kernel module), and the same binary is executed on each node of the same type (e.g., all Windows-based platforms have the same Windows-based binary installed on them). An illustrative function of an agent, such as agent 1-102, is to collect data (e.g., associated with node 1-100) and report it (e.g., to data aggregator 194). Other tasks that can be performed by agents include data configuration and upgrading.

One approach to collecting data as described herein is to collect virtually all information available about a node (and, e.g., the processes running on it). Alternatively, the agent may monitor for network connections and then begin collecting information about processes associated with the network connections, using the presence of a network packet associated with a process as a trigger for collecting additional information about the process. As an example, if a user of a node executes an application, such as a calculator application, which does not typically interact with the network, no information about use of that application may be collected by the agent and/or sent to data aggregator 194. If, however, the user of node 196 executes an ssh command (e.g., to ssh from node 196 to node 1-100), agent 198 may collect information about the process and provide associated information to data aggregator 194. In various embodiments, the agent may always collect/report information about certain events, such as privilege escalation, irrespective of whether the event is associated with network activity.

An approach to collecting information (e.g., by an agent) is as follows, and described in conjunction with process 200 depicted in FIG. 2A. An agent (e.g., agent 1-102) monitors its node (e.g., node 1-100) for network activity. One example way that agent 1-102 can monitor node 1-100 for network activity is by using a network packet capture tool (e.g., listening using libpcap). As packets are received (201), the agent obtains and maintains (e.g., in an in-memory cache) connection information associated with the network activity (302). Examples of such information include DNS query/response, TCP, UDP, and IP information.

The agent may also determine a process associated with the network connection (203). One example approach is for the agent to use a kernel network diagnostic API (e.g., netlink_diag) to obtain inode/process information from the kernel. Another example approach is for the agent to scan using netstat (e.g., on/proc/net/tcp,/proc/net/tcp6,/proc/net/udp, and/proc/net/udp6) to obtain sockets and relate them to processes. Information such as socket state (e.g., whether a socket is connected, listening, etc.) can also be collected by the agent.

One way an agent can obtain a mapping between a given inode and a process identifier is to scan within the/proc/pid directory. For each of the processes currently running, the agent examines each of their file descriptors. If a file descriptor is a match for the inode, the agent can determine that the process associated with the file descriptor owns the inode. Once a mapping is determined between an inode and a process identifier, the mapping is cached. As additional packets are received for the connection, the cached process information is used (rather than a new search being performed).

In some cases, exhaustively scanning for an inode match across every file descriptor may not be feasible (e.g., due to CPU limitations). In various embodiments, searching through file descriptors is accordingly optimized. User filtering is one example of such an optimization. A given socket is owned by a user. Any processes associated with the socket will be owned by the same user as the socket. When matching an inode (identified as relating to a given socket) against processes, the agent can filter through the processes and only examine the file descriptors of processes sharing the same user owner as the socket. In various embodiments, processes owned by root are always searched against (e.g., even when user filtering is employed).

Another example of an optimization is to prioritize searching the file descriptors of certain processes over others. One such prioritization is to search through the subdirectories of/proc/starting with the youngest process. One approximation of such a sort order is to search through/proc/in reverse order (e.g., examining highest numbered processes first). Higher numbered processes are more likely to be newer (i.e., not long-standing processes), and thus more likely to be associated with new connections (i.e., ones for which inode-process mappings are not already cached). In some cases, the most recently created process may not have the highest process identifier (e.g., due to the kernel wrapping through process identifiers).

Another example prioritization is to query the kernel for an identification of the most recently created process and to search in a backward order through the directories in/proc/ (e.g., starting at the most recently created process and working backwards, then wrapping to the highest value (e.g., 32768) and continuing to work backward from there). An alternate approach is for the agent to keep track of the newest process that it has reported information on (e.g., to data aggregator 194), and begin its search of/proc/in a forward order starting from the PID of that process.

Another example prioritization is to maintain, for each user actively using node 1-100, a list of the five (or any other number) most recently active processes. Those processes are more likely than other processes (less active, or passive) on node 1-100 to be involved with new connections and can thus be searched first. For many processes, lower valued file descriptors tend to correspond to non-sockets (e.g., stdin, stdout, stderr). Yet another optimization is to preferentially search higher valued file descriptors (e.g., across processes) over lower valued file descriptors (that are less likely to yield matches).

In some cases, while attempting to locate a process identifier for a given inode, an agent may encounter a socket that does not correspond to the inode being matched against and is not already cached. The identity of that socket (and its corresponding inode) can be cached, once discovered, thus removing a future need to search for that pair.

In some cases, a connection may terminate before the agent is able to determine its associated process (e.g., due to a very short-lived connection, due to a backlog in agent processing, etc.). One approach to addressing such a situation is to asynchronously collect information about the connection using the audit kernel API, which streams information to user space. The information collected from the audit API (which can include PID/inode information) can be matched by the agent against pcap/inode information. In some embodiments, the audit API is always used, for all connections. However, due to CPU utilization considerations, use of the audit API can also be reserved for short/otherwise problematic connections (and/or omitted, as applicable).

Once the agent has determined which process is associated with the network connection (203), the agent can then collect additional information associated with the process (304). As will be described in more detail below, some of the collected information may include attributes of the process (e.g., a process parent hierarchy, and an identification of a binary associated with the process). As will also be described in more detail below, other of the collected information is derived (e.g., session summarization data and hash values).

The collected information is then transmitted (205), e.g., by an agent (e.g., agent 198) to a data aggregator (e.g., data aggregator 194), which in turn provides the information to data platform 110. In some embodiments, all information collected by an agent may be transmitted (e.g., to a data aggregator and/or to data platform 110). In other embodiments, the amount of data transmitted may be minimized (e.g., for efficiency reasons), using various techniques.

One approach to minimizing the amount of data flowing from agents (such as agents installed on nodes) to data platform 110 is to use a technique of implicit references with unique keys. The keys can be explicitly used by data platform 110 to extract/derive relationships, as necessary, in a data set at a later time, without impacting performance.

As previously mentioned, some data collected about a process is constant and does not change over the lifetime of the process (e.g., attributes), and some data changes (e.g., statistical information and other variable information). Constant data can be transmitted (205) once, when the agent first becomes aware of the process. And, if any changes to the constant data are detected (e.g., a process changes its parent), a refreshed version of the data can be transmitted (205) as applicable.

In some examples, an agent may collect variable data (e.g., data that may change over the lifetime of the process). In some examples, variable data can be transmitted (205) at periodic (or other) intervals. Alternatively, variable data may be transmitted in substantially real time as it is collected. In some examples, the variable data may indicate a thread count for a process, a total virtual memory used by the process, the total resident memory used by the process, the total time spent by the process executing in user space, and/or the total time spent by the process executing in kernel space. In some examples, the data may include a hash that may be used within data platform 110 to join process creation time attributes with runtime attributes to construct a full dataset.

Below are additional examples of data that an agent, such as agent 198, can collect and provide to data platform 110. User data (e.g., Core User Data: user name, UID (user ID), primary group, other groups, home directory; Failed Login Data: IP address, hostname, username, count; User Login Data: user name, hostname, IP address, start time, TTY (terminal), UID (user ID), GID (group ID), process, end time). Dropped Packet Data (e.g., source IP address, destination IP address, destination port, protocol, count). Machine Data (e.g., hostname, domain name, architecture, kernel, kernel release, kernel version, OS, OS version, OS description, CPU, memory, model number, number of cores, last boot time, last boot reason, tags (e.g., Cloud provider tags such as AWS, GCP, or Azure tags), default router, interface name, interface hardware address, interface IP address and mask, promiscuous mode).

Network Connection Data (e.g., source IP address, destination IP address, source port, destination port, protocol, start time, end time, incoming and outgoing bytes, source process, destination process, direction of connection, histograms of packet length, inter packet delay, session lengths, etc). Listening Ports in Server (e.g., source IP address, port number, protocol, process). Dropped Packet Data (e.g., source IP address, destination IP address, destination port, protocol, count). Arp Data (e.g., source hardware address, source IP address, destination hardware address, destination IP address). DNS Dat (e.g., source IP address, response code, response string, question (request), packet length, final answer (response)).

Package Data (e.g., exe path, package name, architecture, version, package path, checksums (MD5, SHA-1, SHA-256), size, owner, owner ID). Application Data (e.g., command line, PID (process ID), start time, UID (user ID), EUID (effective UID), PPID (parent process ID), PGID (process group ID), SID (session ID), exe path, username, container ID).

Container Image Data (e.g., image creation time, parent ID, author, container type, repo, (AWS) tags, size, virtual size, image version). Container Data (e.g., container start time, container type, container name, container ID, network mode, privileged, PID mode, IP addresses, listening ports, volume map, process ID). File path, file data hash, symbolic links, file creation data, file change data, file metadata, file mode.

As mentioned above, an agent, such as agent 198, can be deployed in a container (e.g., a Docker container), and can also be used to collect information about containers. Collection about a container can be performed by an agent irrespective of whether the agent is itself deployed in a container or not (as the agent can be deployed in a container running in a privileged mode that allows for monitoring).

Agents can discover containers (e.g., for monitoring) by listening for container create events (e.g., provided by Docker), and can also perform periodic ordered discovery scans to determine whether containers are running on a node. When a container is discovered, the agent can obtain attributes of the container, e.g., using standard Docker API calls (e.g., to obtain IP addresses associated with the container, whether there's a server running inside, what port it is listening on, associated PIDs, etc.). Information such as the parent process that started the container can also be collected, as can information about the image (which comes from the Docker repository).

In various embodiments, agents may use namespaces to determine whether a process is associated with a container. Namespaces are a feature of the Linux kernel that can be used to isolate resources of a collection of processes. Examples of namespaces include process ID (PID) namespaces, network namespaces, and user namespaces. Given a process, the agent can perform a fast lookup to determine whether the process is part of the namespace the container claims to be its namespace.

As mentioned, agents can be configured to report certain types of information (e.g., attribute information) once, when the agent first becomes aware of a process. In various embodiments, such static information is not reported again (or is reported once a day, every twelve hours, etc.), unless it changes (e.g., a process changes its parent, changes its owner, or a SHA-1 of the binary associated with the process changes).

In contrast to static/attribute information, certain types of data change constantly (e.g., network-related data). In various embodiments, agents are configured to report a list of current connections every minute (or other appropriate time interval). In that connection list will be connections that started in that minute interval, connections that ended in that minute interval, and connections that were ongoing throughout the minute interval (e.g., a one-minute slice of a one-hour connection).

In various embodiments, agents are configured to collect/compute statistical information about connections (e.g., at the one-minute level of granularity and or at any other time interval). Examples of such information include, for the time interval, the number of bytes transferred, and in which direction. Another example of information collected by an agent about a connection is the length of time between packets. For connections that span multiple time intervals (e.g., a seven-minute connection), statistics may be calculated for each minute of the connection. Such statistical information (for all connections) can be reported (e.g., to a data aggregator) once a minute.

In various embodiments, agents are also configured to maintain histogram data for a given network connection, and provide the histogram data (e.g., in the Apache Avro data exchange format) under the Connection event type data. Examples of such histograms include: 1. a packet length histogram (packet_len_hist), which characterizes network packet distribution; 2. a session length histogram (session_len_hist), which characterizes a network session length; 3. a session time histogram (session_time_hist), which characterizes a network session time; and 4. a session switch time histogram (session_switch_time_hist), which characterizes network session switch time (i.e., incoming->outgoing and vice versa). For example, histogram data may include one or more of the following fields: 1. count, which provides a count of the elements in the sampling; 2. sum, which provides a sum of elements in the sampling; 3. max, which provides the highest value element in the sampling; 4. std_dev, which provides the standard deviation of elements in the sampling; and 5. buckets, which provides a discrete sample bucket distribution of sampling data (if applicable).

For some protocols (e.g., HTTP), typically, a connection is opened, a string is sent, a string is received, and the connection is closed. For other protocols (e.g., NFS), both sides of the connection engage in a constant chatter. Histograms allow data platform 12 to model application behavior (e.g., using machine learning techniques), for establishing baselines, and for detecting deviations. As one example, suppose that a given HTTP server typically sends/receives 1,000 bytes (in each direction) whenever a connection is made with it. If a connection generates 500 bytes of traffic, or 2,000 bytes of traffic, such connections would be considered within the typical usage pattern of the server. Suppose, however, that a connection is made that results in 10G of traffic. Such a connection is anomalous and can be flagged accordingly.

Returning to FIG. 1D, as previously mentioned, data aggregator 194 may be configured to provide information (e.g., collected from nodes by agents) to data platform 110. data aggregator 1-108 may be similarly configured to provide information to data platform 110. As shown in FIG. 1D, both data aggregator 194 and data aggregator 1-108 may connect to a load balancer 136, which accepts connections from aggregators (and/or as applicable, agents), as well as other devices, such as device 1-104 (e.g., when it communicates with Web app 154), and supports fair balancing. In various embodiments, load balancer 136 is a reverse proxy that load balances accepted connections internally to various microservices (described in more detail below), allowing for services provided by data platform 110 to scale up as more agents are added to the environment and/or as more entities subscribe to services provided by data platform 110. Example ways to implement load balancer 136 include, but are not limited to, using HaProxy, using nginx, and using elastic load balancing (ELB) services made available by Amazon.

Agent service 172 is a microservice that is responsible for accepting data collected from agents (e.g., provided by data aggregator 194). In various embodiments, agent service 172 uses a standard secure protocol, such as HTTPS to communicate with aggregators (and, as applicable, agents), and receives data in an appropriate format such as Apache Avro. When agent service 172 receives an incoming connection, it can perform a variety of checks, such as to see whether the data is being provided by a current customer, and whether the data is being provided in an appropriate format. If the data is not appropriately formatted (and/or is not provided by a current customer), it may be rejected.

If the data is appropriately formatted, agent service 172 may facilitate copying the received data to a streaming data stable storage using a streaming service (e.g., Amazon Kinesis and/or any other suitable streaming service). Once the ingesting into the streaming service is complete, agent service 132 may send an acknowledgement to the data provider (e.g., data aggregator 194). If the agent does not receive such an acknowledgement, it is configured to retry sending the data-to-data platform 110. One way to implement agent service 172 is as a REST API server framework (e.g., Java DropWizard), configured to communicate with Kinesis (e.g., using a Kinesis library).

In various embodiments, data platform 110 uses one or more streams (e.g., Kinesis streams) for all incoming customer data (e.g., including data provided by data aggregator 194 and data aggregator 1-108), and the data is sharded based on the node (also referred to herein as a "machine") that originated the data (e.g., node 196 vs. node 1-100), with each node having a globally unique identifier within data platform 110. Multiple instances of agent service 172 can write to multiple shards.

Kinesis is a streaming service with a limited period (e.g., 1-7 days). To persist data longer than a day, the data may be copied to long term storage 138 (e.g., S3). Data loader 174 is a microservice that is responsible for picking up data from a data stream (e.g., a Kinesis stream) and persisting it in long term storage 138. In one example embodiment, files collected by data loader 174 from the Kinesis stream are placed into one or more buckets and segmented using a combination of a customer identifier and time slice. Given a particular time segment, and a given customer identifier, the corresponding file (stored in long term storage) contains five minutes (or another appropriate time slice) of data collected at that specific customer from all of the customer's nodes. Data loader 174 can be implemented in any appropriate programming language, such as Java or C, and can be configured to use a Kinesis library to interface with Kinesis. In various embodiments, data loader 174 uses the Amazon Simple Queue Service (SQS) (e.g., to alert DB loader 176 that there is work for it to do).

DB loader 176 is a microservice that is responsible for loading data into an appropriate data store 122, such as SnowflakeDB or Amazon Redshift, using individual per-customer databases. In particular, DB loader 176 is configured to periodically load data into a set of raw tables from files created by data loader 174 as per above. DB loader 176 manages throughput, errors, etc., to make sure that data is loaded consistently and continuously. Further, DB loader 176 can read incoming data and load into data store 122 data that is not already present in tables of data store 30 (also referred to herein as a database). DB loader 176 can be implemented in any appropriate programming language, such as Java or C, and an SQL framework such as jOOQ (e.g., to manage SQLs for insertion of data), and SQL/JDBC libraries. In some examples, DB loader 176 may use Amazon S3 and Amazon Simple Queue Service (SQS) to manage files being transferred to and from data store 122.

Customer data included in data store 122 can be augmented with data from additional data sources, such as AWS CloudTrail and/or other types of external tracking services. To this end, data platform may include tracking service analyzer 178, which is another microservice. Tracking service analyzer 178 may pull data from an external tracking service (e.g., Amazon CloudTrail) for each applicable customer account, as soon as the data is available. Tracking service analyzer 178 may normalize the tracking data as applicable, so that it can be inserted into data store 30 for later querying/analysis. Tracking service analyzer 178 can be written in any appropriate programming language, such as Java or C. Tracking service analyzer 178 also makes use of SQL/JDBC libraries to interact with data store 122 to insert/query data.

As described herein, data platform 110 can model activities that occur within datacenters, such as datacenters 192 and datacenter 1-106. The model may be stable over time, and differences, even subtle ones (e.g., between a current state of the datacenter and the model) can be surfaced. The ability to surface such anomalies can be particularly beneficial in datacenter environments where rogue employees and/or external attackers may operate slowly (e.g., over a period of months), hoping that the elastic nature of typical resource use (e.g., virtualized servers) will help conceal their nefarious activities.

Using techniques described herein, data platform 110 can automatically discover entities (which may implement compute assets) deployed in a given datacenter. Examples of entities include workloads, applications, processes, machines, virtual machines, containers, files, IP addresses, domain names, and users. The entities may be grouped together logically (into analysis groups) based on behaviors, and temporal behavior baselines can be established. In particular, using techniques described herein, periodic graphs can be constructed (also referred to herein as polygraphs), in which the nodes are applicable logical entities, and the edges represent behavioral relationships between the logical entities in the graph. Baselines can be created for every node and edge.

Communication (e.g., between applications/nodes) is one example of a behavior. A model of communications between processes is an example of a behavioral model. As another example, the launching of applications is another example of a behavior that can be modeled. The baselines may be periodically updated (e.g., hourly) for every entity. Additionally, or alternatively, the baselines may be continuously updated in substantially real-time as data is collected by agents. Deviations from the expected normal behavior can then be detected and automatically reported (e.g., as anomalies or threats detected). Such deviations may be due to a desired change, a misconfiguration, or malicious activity. As applicable, data platform 110 can score the detected deviations (e.g., based on severity and threat posed). Additional examples of analysis groups include models of machine communications, models of privilege changes, and models of insider behaviors (monitoring the interactive behavior of human users as they operate within the datacenter).

Two example types of information collected by agents are network level information and process level information. As previously mentioned, agents may collect information about every connection involving their respective nodes. And, for each connection, information about both the server and the client may be collected (e.g., using the connection-to-process identification techniques described above). DNS queries and responses may also be collected. The DNS query information can be used in logical entity graphing (e.g., collapsing many different IP addresses to a single service—e.g., s3.amazon.com). Examples of process level information collected by agents include attributes (user ID, effective user ID, and command line). Information such as what user/application is responsible for launching a given process and the binary being executed (and its SHA-256 values) may also provided by agents.

The dataset collected by agents across a datacenter can be very large, and many resources (e.g., virtual machines, IP addresses, etc.) are recycled very quickly. For example, an IP address and port number used at a first point in time by a first process on a first virtual machine may very rapidly be used (e.g., an hour later) by a different process/virtual machine.

In various examples, the hardware elements described in FIG. 1A to FIG. 1D can be utilized to run and manage ephemeral jobs (e.g., Spark jobs) in a containerized environment (e.g., Kubernetes). In some examples the ephemeral jobs provide security functionality and/or otherwise manage compute resources within a host computing environment. In some examples, the host computing environment is a cloud computing and/or storage environment. Within the scope of the functionality described above, the various processes and/or information collection approaches described in FIG. 2A to FIG. 2O can be utilized.

Figure 2A:
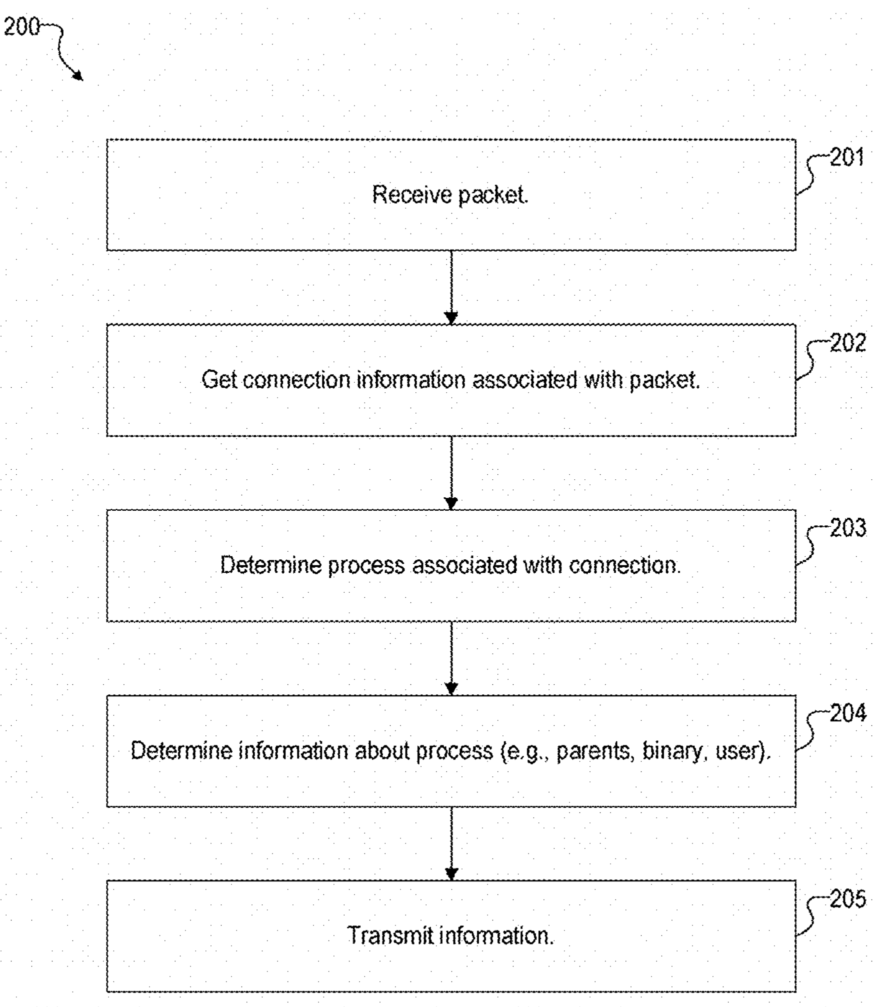
FIG. 2A illustrates an example of a process, used by an agent, to collect and report information about a client.

FIG. 2A illustrates an example of a process, used by an agent, to collect and report information about a client. An approach to collecting information (e.g., by an agent) is as follows, and described in conjunction with process 200 depicted in FIG. 2A. An agent monitors its node for network activity. One example way that the agent can monitor the node for network activity is by using a network packet capture tool (e.g., listening using libpcap). As packets are received (201), the agent obtains and maintains (e.g., in an in-memory cache) connection information associated with the network activity (202). Examples of such information include DNS query/response, TCP, UDP, and IP information.

The agent may also determine a process associated with the network connection (203). One example approach is for the agent to use a kernel network diagnostic API (e.g., netlink_diag) to obtain inode/process information from the kernel. Another example approach is for the agent to scan using netstat (e.g., on/proc/net/tcp,/proc/net/tcp6,/proc/net/udp, and/proc/net/udp6) to obtain sockets and relate them to processes. Information such as socket state (e.g., whether a socket is connected, listening, etc.) can also be collected by the agent.

Once the agent has determined which process is associated with the network connection (203), the agent can then collect additional information associated with the process (204). As will be described in more detail below, some of the collected information may include attributes of the process (e.g., a process parent hierarchy, and an identification of a binary associated with the process). As will also be described in more detail below, other of the collected information is derived (e.g., session summarization data and hash values).

The collected information is then transmitted (205), e.g., by an agent to a data aggregator, which in turn provides the information to the data platform. In some embodiments, all information collected by an agent may be transmitted. In other embodiments, the amount of data transmitted may be minimized (e.g., for efficiency reasons), using various techniques.

One approach to minimizing the amount of data flowing from agents (such as agents installed on nodes 108) to the data platform is to use a technique of implicit references with unique keys. The keys can be explicitly used by the data platform to extract/derive relationships, as necessary, in a data set at a later time, without impacting performance.

As previously mentioned, some data collected about a process is constant and does not change over the lifetime of the process (e.g., attributes), and some data changes (e.g., statistical information and other variable information). Constant data can be transmitted (205) once, when the agent first becomes aware of the process. And, if any changes to the constant data are detected (e.g., a process changes its parent), a refreshed version of the data can be transmitted (205) as applicable.

In some examples, an agent may collect variable data (e.g., data that may change over the lifetime of the process). In some examples, variable data can be transmitted (205) at periodic (or other) intervals. Alternatively, variable data may be transmitted in substantially real time as it is collected. In some examples, the variable data may indicate a thread count for a process, a total virtual memory used by the process, the total resident memory used by the process, the total time spent by the process executing in user space, and/or the total time spent by the process executing in kernel space. In some examples, the data may include a hash that may be used within the data platform to join process creation time attributes with runtime attributes to construct a full dataset.

Figure 2B:
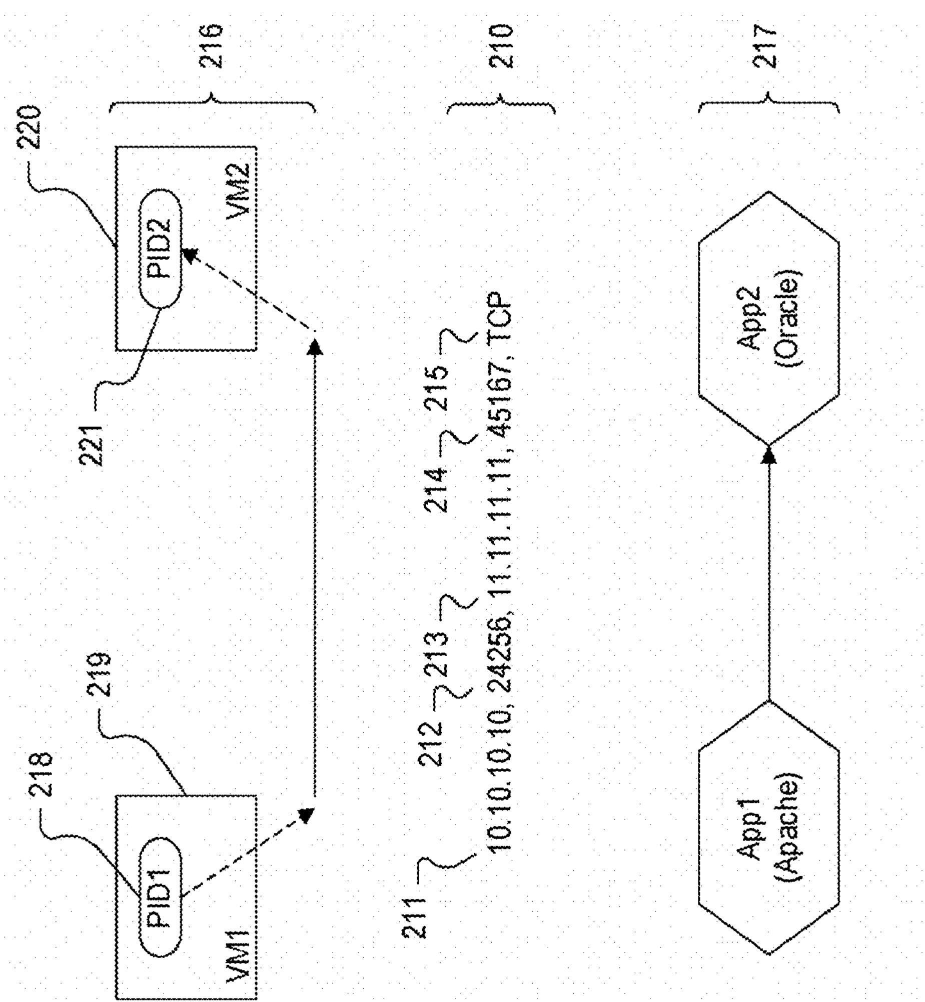
FIG. 2B illustrates a 5-tuple of data collected by an agent, physically and logically.

FIG. 2B illustrates a 5-tuple of data collected by an agent, physically and logically. A dataset (and elements within it) can be considered at both a physical level, and a logical level, as illustrated in FIG. 2B. In particular, FIG. 2B illustrates an example 5-tuple of data 210 collected by an agent, represented physically (216) and logically (217). The 5-tuple includes a source address 211, a source port 212, a destination address 213, a destination port 214, and a protocol 215. In some cases, port numbers (e.g., 212, 214) may be indicative of the nature of a connection (e.g., with certain port usage standardized). However, in many cases, and in particular in datacenters, port usage is ephemeral. For example, a Docker container can listen on an ephemeral port, which is unrelated to the service it will run. When another Docker container starts (for the same service), the port may well be different. Similarly, particularly in a virtualized environment, IP addresses may be recycled frequently (and are thus also potentially ephemeral) or could be NATed, which makes identification difficult.

A physical representation of the 5-tuple is depicted in region 216. A process 218 (executing on machine 219) has opened a connection to machine 220. In particular, process 218 is in communication with process 221. Information such as the number of packets exchanged between the two machines over the respective ports can be recorded.

As previously mentioned, in a datacenter environment, portions of the 5-tuple may change—potentially frequently—but still be associated with the same behavior. Namely, one application (e.g., Apache) may frequently be in communication with another application (e.g., Oracle), using ephemeral datacenter resources. Further, either/both of Apache and Oracle may be multi-homed. This can lead to potentially thousands of 5-tuples (or more) that all correspond to Apache communicating with Oracle within a datacenter. For example, Apache could be executed on a single machine, and could also be executed across fifty machines, which are variously spun up and down (with different IP addresses each time). An alternate representation of the 5-tuple of data 210 is depicted in region 217 and is logical. The logical representation of the 5-tuple aggregates the 5-tuple (along with other connections between Apache and Oracle having other 5-tuples) as logically representing the same connection. By aggregating data from raw physical connection information into logical connection information, using techniques described herein, a size reduction of six orders of magnitude in the data set can be achieved.

Figure 2C:
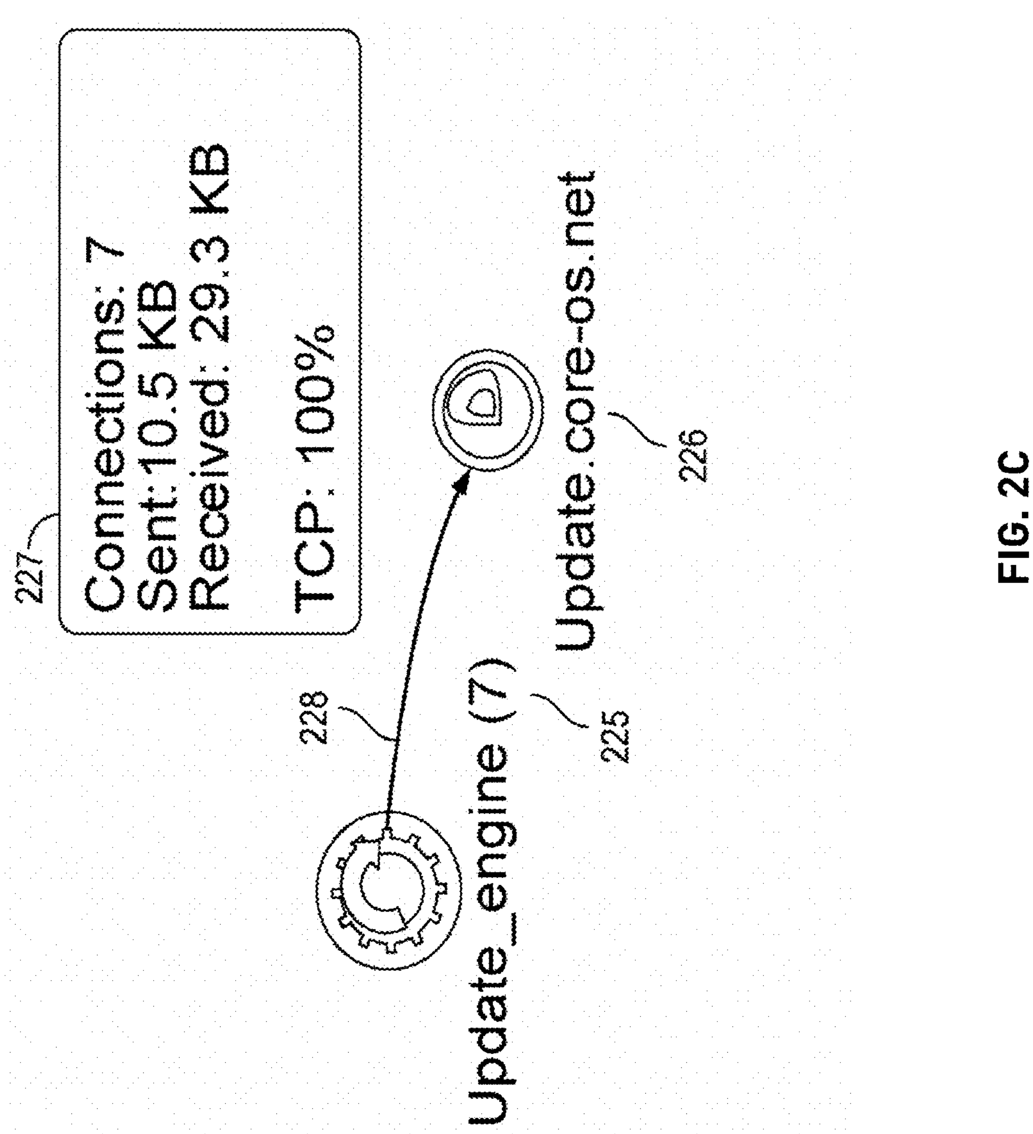
FIG. 2C illustrates a portion of a polygraph.

FIG. 2C illustrates a portion of a polygraph. FIG. 2C depicts a portion of a logical polygraph. Suppose a datacenter has seven instances of the application update_engine 225, executing as seven different processes on seven different machines, having seven different IP addresses, and using seven different ports. The instances of update_engine variously communicate with update.core-os.net 226, which may have a single IP address or many IP addresses itself, over the one-hour time period represented in the polygraph. In the example shown in FIG. 2C, update_engine is a client, connecting to the server update.core-os.net, as indicated by arrow 228.

Behaviors of the seven processes are clustered together, into a single summary. As indicated in region 227, statistical information about the connections is also maintained (e.g., number of connections, histogram information, etc.). A polygraph such as is depicted in FIG. 2C can be used to establish a baseline of behavior (e.g., at the one-hour level), allowing for the future detection of deviations from that baseline. As one example, suppose that statistically an update_engine instance transmits data at 11 bytes per second. If an instance were instead to transmit data at 1000 bytes per second, such behavior would represent a deviation from the baseline and could be flagged accordingly. Similarly, changes that are within the baseline (e.g., an eighth instance of update_engine appears, but otherwise behaves as the other instances; or one of the seven instances disappears) are not flagged as anomalous. Further, datacenter events, such as failover, autobalancing, and A-B refresh are unlikely to trigger false alarms in a polygraph, as at the logical level, the behaviors remain the same.

In various embodiments, polygraph data is maintained for every application in a datacenter, and such polygraph data can be combined to make a single datacenter view across all such applications.

Figure 2D:
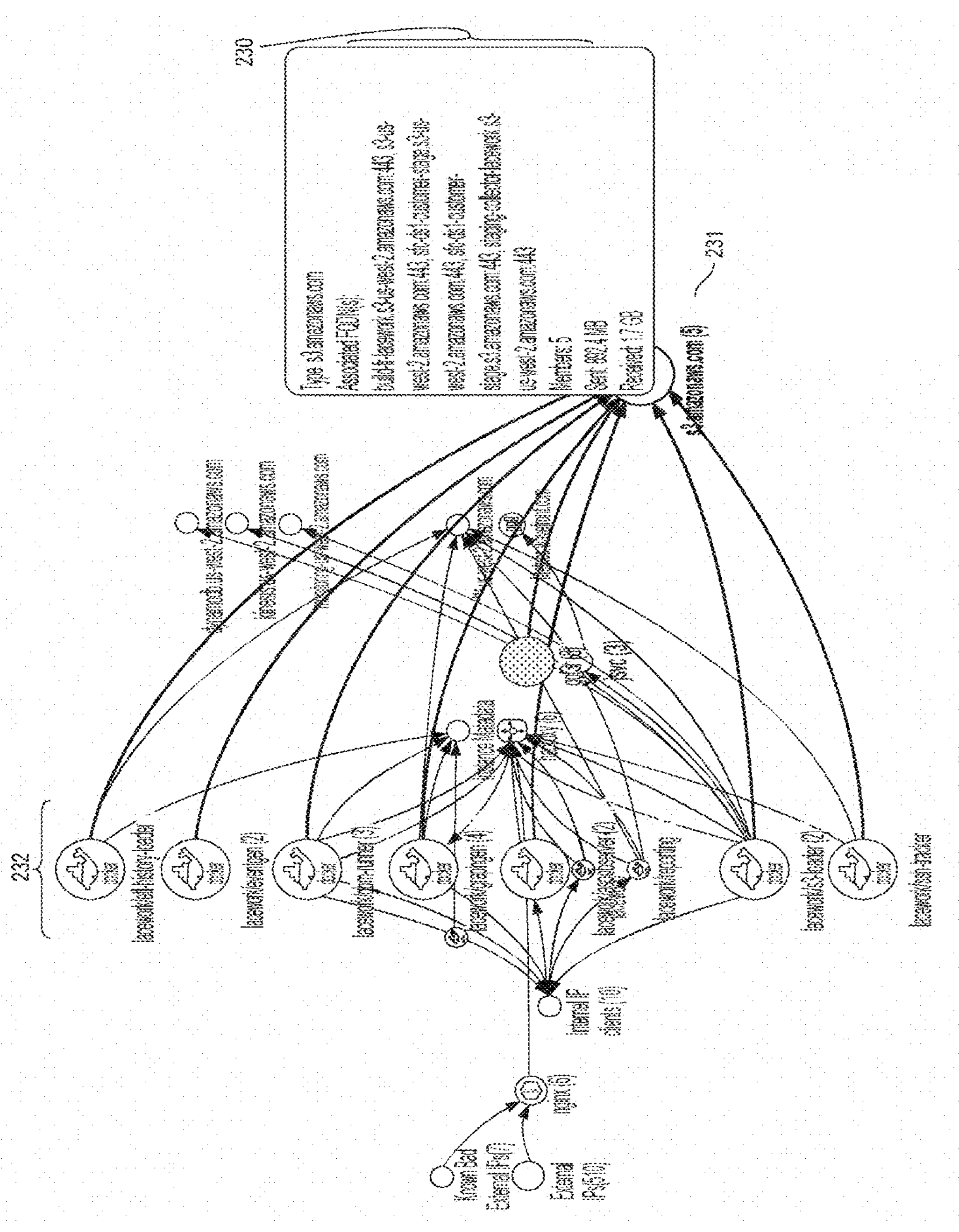
FIG. 2D illustrates a portion of a polygraph.

FIG. 2D illustrates a portion of a polygraph. FIG. 2D illustrates a portion of a polygraph for a service that evidences more complex behaviors than are depicted in FIG. 2C. In particular, FIG. 2D illustrates the behaviors of S3 as a service (as used by a particular customer datacenter). Clients within the datacenter variously connect to the S3 service using one of five fully qualified domains (listed in region 230). Contact with any of the domains is aggregated as contact with S3 (as indicated in region 231). Depicted in region 232 are various containers which (as clients) connect with S3. Other containers (which do not connect with S3) are not included. As with the polygraph portion depicted in FIG. 2C, statistical information about the connections is known and summarized, such as the number of bytes transferred, histogram information, etc.

Figure 2E:
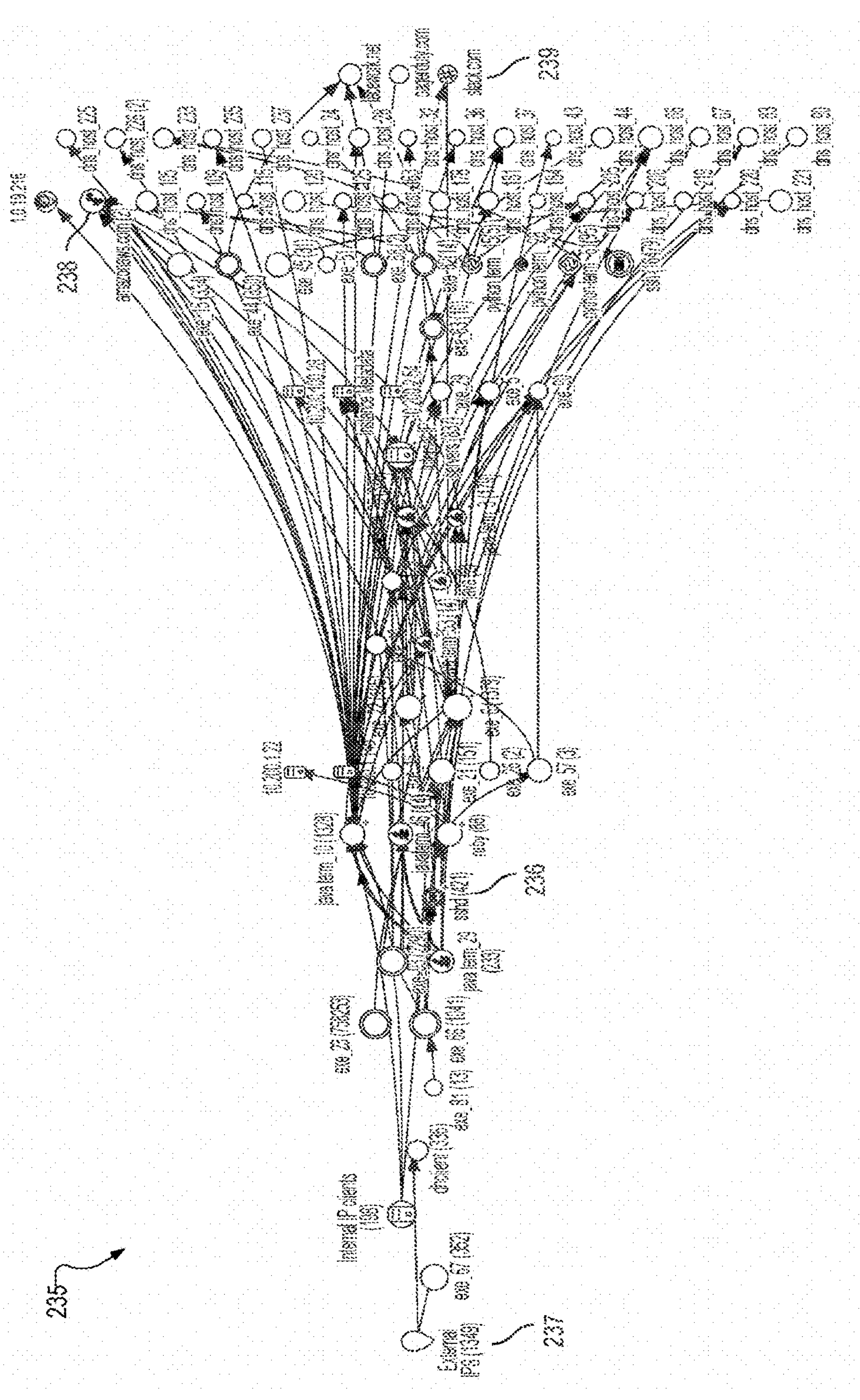
FIG. 2E illustrates an example of a communication polygraph.

FIG. 2E illustrates an example of a communication polygraph. FIG. 2E illustrates a communication polygraph for a datacenter. In particular, the polygraph indicates a one hour summary of approximately 500 virtual machines, which collectively run one million processes, and make 100 million connections in that hour. As illustrated in FIG. 2E, a polygraph represents a drastic reduction in size (e.g., from tracking information on 100 million connections in an hour, to a few hundred nodes and a few hundred edges). Further, as a datacenter scales up (e.g., from using 10 virtual machines to 100 virtual machines as the datacenter uses more workers to support existing applications), the polygraph for the datacenter will tend to stay the same size (with the 100 virtual machines clustering into the same nodes that the 10 virtual machines previously clustered into). As new applications are added into the datacenter, the polygraph may automatically scale to include behaviors involving those applications.

In the particular polygraph shown in FIG. 2E, nodes generally correspond to workers, and edges correspond to communications the workers engage in (with connection activity being the behavior modeled in polygraph 235). Another example polygraph could model other behavior, such as application launching. The communications graphed in FIG. 2E include traffic entering the datacenter, traffic exiting the datacenter, and traffic that stays wholly within the datacenter (e.g., traffic between workers). One example of a node included in polygraph 235 is the sshd application, depicted as node 236. As indicated in FIG. 2E, 421 instances of sshd were executing during the one-hour time period of data represented in polygraph 235. As indicated in region 237, nodes within the datacenter communicated with a total of 1349 IP addresses outside of the datacenter (and not otherwise accounted for, e.g., as belonging to a service such as Amazon AWS 238 or Slack 239).

In the following examples, suppose that user B, an administrator of a datacenter, is interacting with a data platform to view visualizations of polygraphs in a web browser (e.g., as served to user B via a web app). One type of polygraph user B can view is an application-communication polygraph, which indicates, for a given one-hour window (or any other suitable time interval), which applications communicated with which other applications. Another type of polygraph user B can view is an application launch polygraph. User B can also view graphs related to user behavior, such as an insider behavior graph which tracks user connections (e.g., to internal and external applications, including chains of such behavior), a privilege change graph which tracks how privileges change between processes, and a user login graph, which tracks which (logical) machines a user logs into.

Figure 2F:
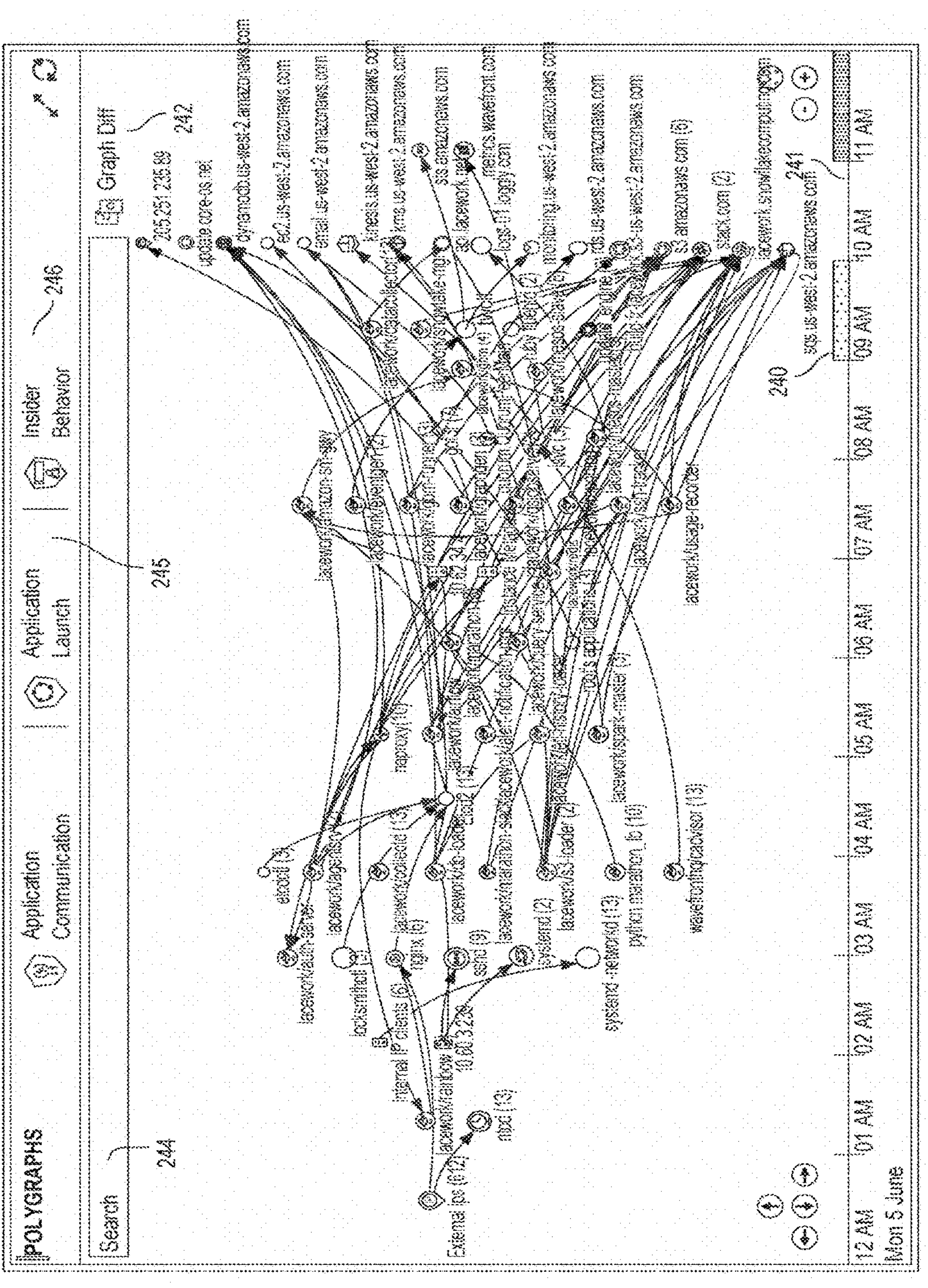
FIG. 2F illustrates an example of a polygraph.

FIG. 2F illustrates an example of a polygraph. FIG. 2F illustrates an example of an application-communication polygraph for a datacenter for the one-hour period of 9 am-10 am on June 5. The time slice currently being viewed is indicated in region 240. If user B clicks his mouse in region 241, user B will be shown a representation of the application-communication polygraph as generated for the following hour (10 am-11 am on June 5).

Figure 2G:
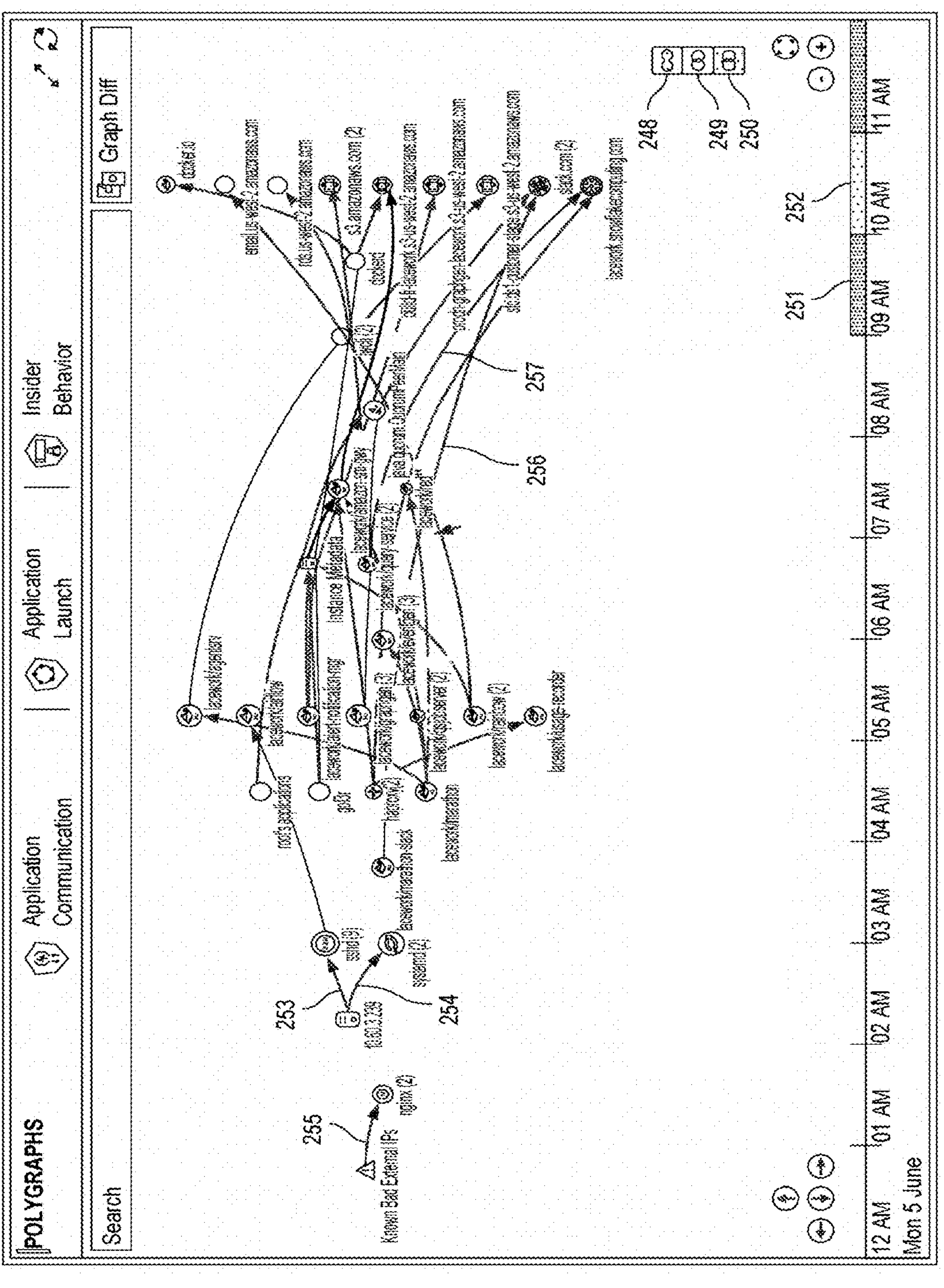
FIG. 2G illustrates an example of a polygraph as rendered in an interface.

FIG. 2G illustrates an example of a polygraph as rendered in an interface. FIG. 2G depicts what is shown in user B's browser after he has clicked on region 241 and has further clicked on region 242. The selection in region 242 turns on and off the ability to compare two time intervals to one another. User B can select from a variety of options when comparing the 9 am-10 am and 10 am-11 am time intervals. By clicking region 248, user B will be shown the union of both graphs (i.e., any connections that were present in either time interval). By clicking region 249, user B will be shown the intersection of both graphs (i.e., only those connections that were present in both time intervals).

As shown in FIG. 2G, user B has elected to click on region 250, which depicts connections that are only present in the 9 am-10 am polygraph in a first color 251, and depicts connections that are only present in the 10 am-11 am polygraph in a second color 252. Connections present in both polygraphs are omitted from display. As one example, in the 9 am-10 am polygraph (corresponding to connections made during the 9 am-10 am time period at the datacenter), a connection was made by a server to sshd (253) and also to systemd (254). Both of those connections ended prior to 10 am and are thus depicted in the first color. As another example, in the 10 am-11 am polygraph (corresponding to connections made during the 10 am-11 am time period at the datacenter), a connection was made from a known bad external IP to nginx (255). The connection was not present during the 9 am-10 am time slice and thus is depicted in the second color. As yet another example, two different connections were made to a Slack service between 9 am and 11 am. However, the first was made by a first client during the 9 am-10 am time slice (256) and the second was made by a different client during the 10 am-11 am slice (257), and so the two connections are depicted respectively in the first and second colors and blue.

Returning to the polygraph depicted in FIG. 2F, suppose user B enters "etcd" into the search box located in region 244. User B will then be presented with the interface illustrated in FIG. 2H.

Figure 2H:
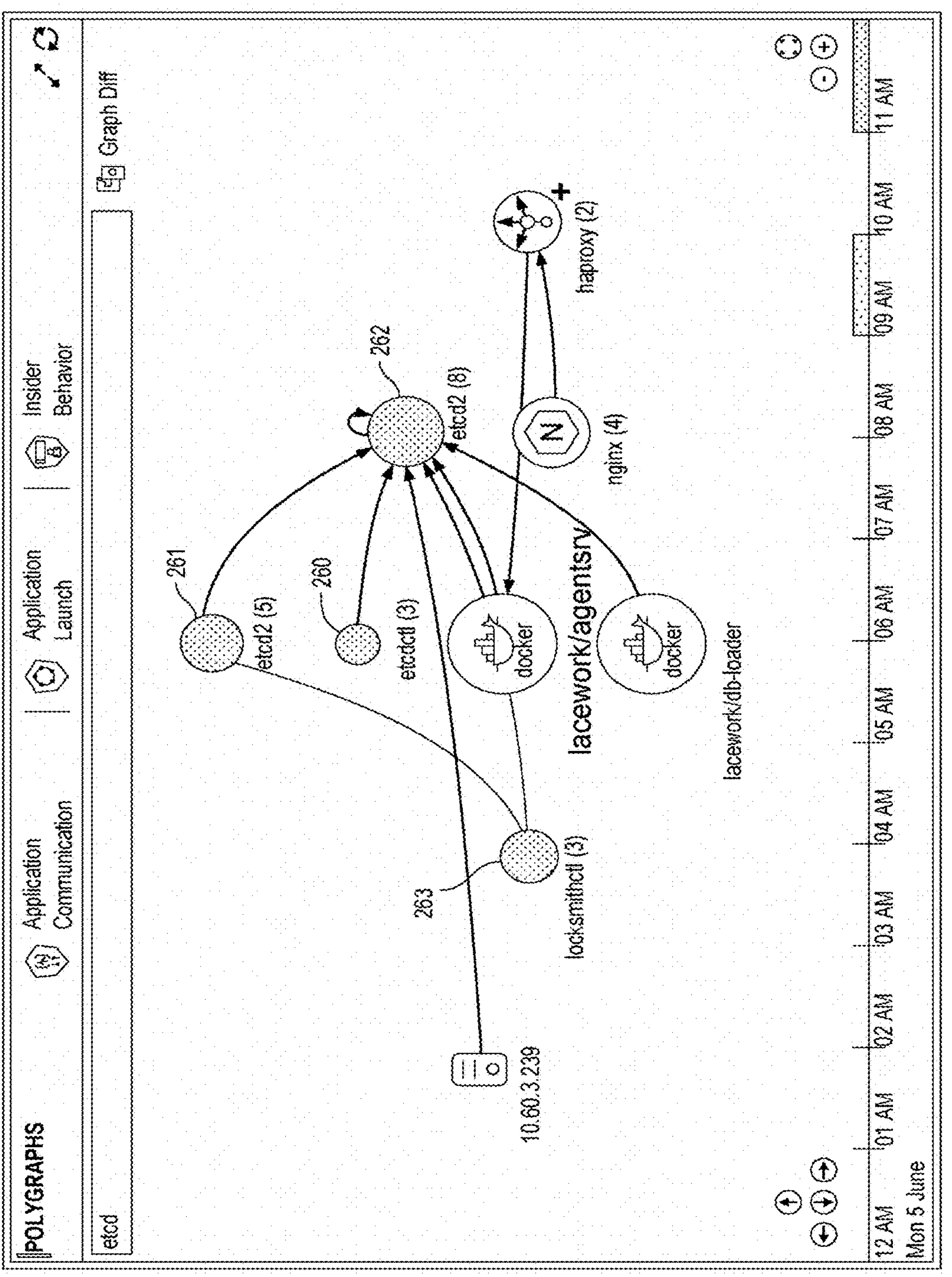
FIG. 2H illustrates an example of a portion of a polygraph as rendered in an interface.
Figure 2I:
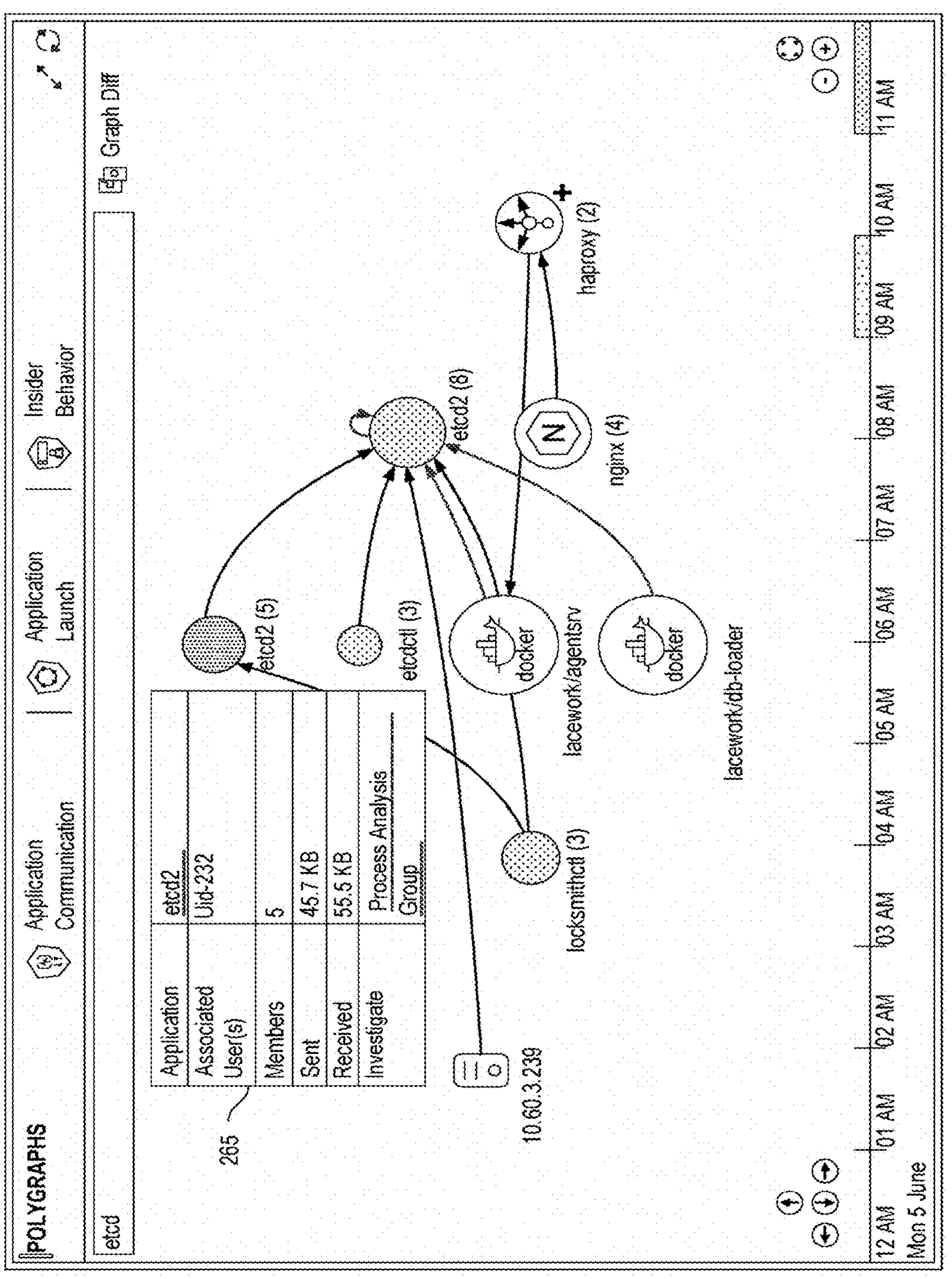
FIG. 2I illustrates an example of a portion of a polygraph as rendered in an interface.

FIG. 2H illustrates an example of a portion of a polygraph as rendered in an interface. As shown in FIG. 2H, three applications containing the term "etcd" were engaged in communications during the 9 am-10 am window. One application is etcdct1, a command line client for etcd. As shown in FIG. 2H, a total of three different etcdet1 processes were executed during the 9 am-10 am window, and were clustered together (260). FIG. 2H also depicts two different clusters that are both named etcd2. The first cluster includes (for the 9 am-10 am window) five members (261) and the second cluster includes (for the same window) eight members (262). The reason for these two distinct clusters is that the two groups of applications behave differently (e.g., they exhibit two distinct sets of communication patterns). Specifically, the instances of etcd2 in cluster 261 only communicate with locksmithctl (263) and other etcd2 instances (in both clusters 261 and 262). The instances of eted2 in cluster 262 communicate with additional entities, such as etcdet1 and Docker containers. As desired, user B can click on one of the clusters (e.g., cluster 261) and be presented with summary information about the applications included in the cluster, as is shown in FIG. 2I (e.g., in region 265). User B can also double click on a given cluster (e.g., cluster 261) to see details on each of the individual members of the cluster broken out.

Suppose user B now clicks on region 245 of the interface shown in FIG. 2F. User B will then be shown an application launch polygraph. Launching an application is another example of a behavior. The launch polygraph models how applications are launched by other applications.

FIG. 2I illustrates an example of a portion of a polygraph as rendered in an interface. The instances of eted2 in cluster 262 communicate with additional entities, such as etcdct1 and Docker containers. As desired, user B can click on one of the clusters (e.g., cluster 261) and be presented with summary information about the applications included in the cluster, as is shown in FIG. 2I (e.g., in region 265). User B can also double click on a given cluster (e.g., cluster 261) to see details on each of the individual members of the cluster broken out.

Suppose user B now clicks on region 245 of the interface shown in FIG. 2F. User B will then be shown an application launch polygraph. Launching an application is another example of a behavior. The launch polygraph models how applications are launched by other applications.

Figure 2J:
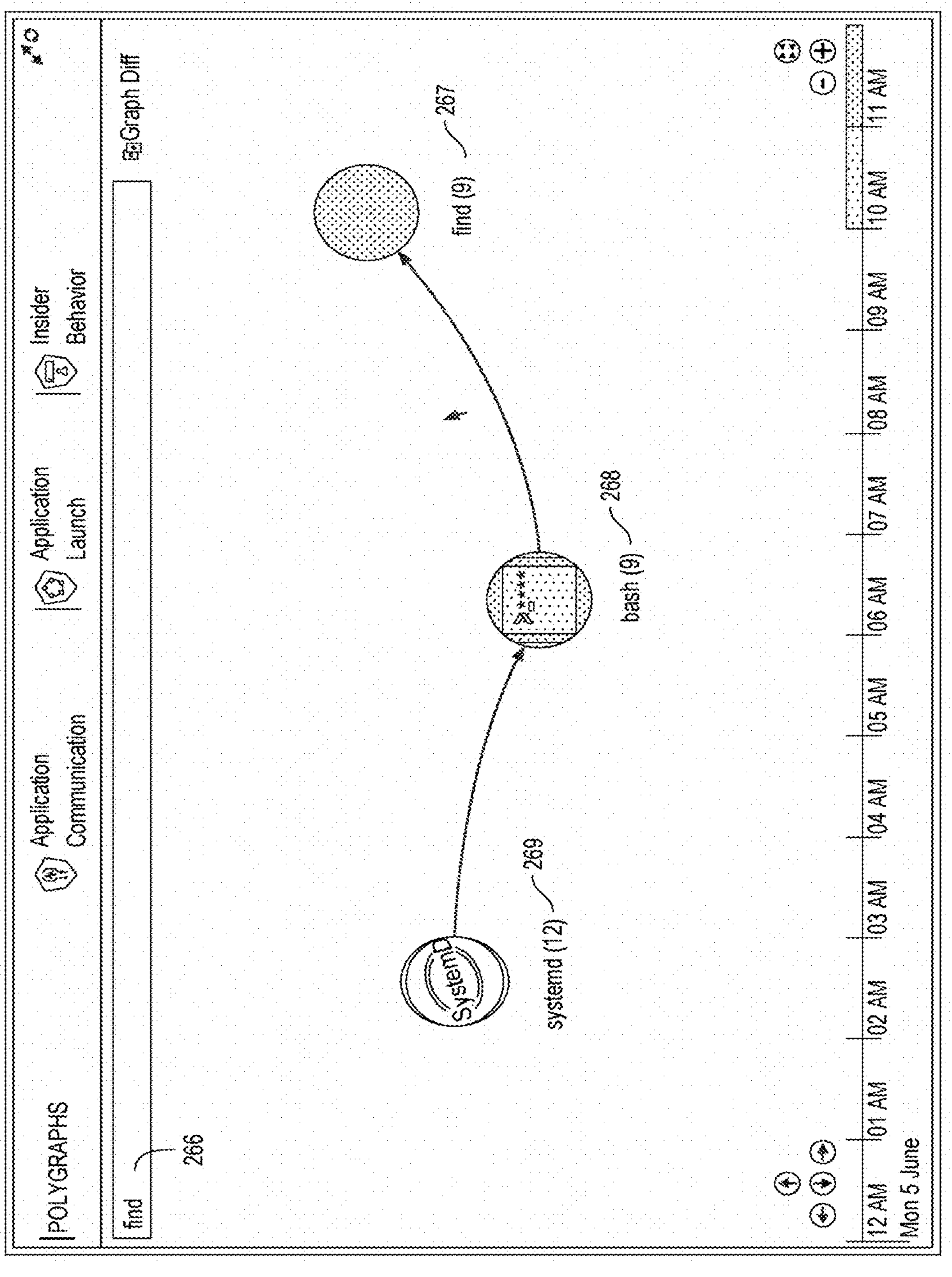
FIG. 2J illustrates an example of a portion of a polygraph as rendered in an interface.

FIG. 2J illustrates an example of a portion of a polygraph as rendered in an interface. FIG. 2J illustrates an example of a portion of a launch polygraph. In particular, user B has typed "find" into region 266, to see how the "find" application is being launched. As shown in FIG. 2J, in the launch polygraph for the 10 am-11 am time period, find applications (267) are always launched by bash (268), which is in turn always launched by systemd (269). If find is launched by a different application, this would be anomalous behavior.

Figure 2K:
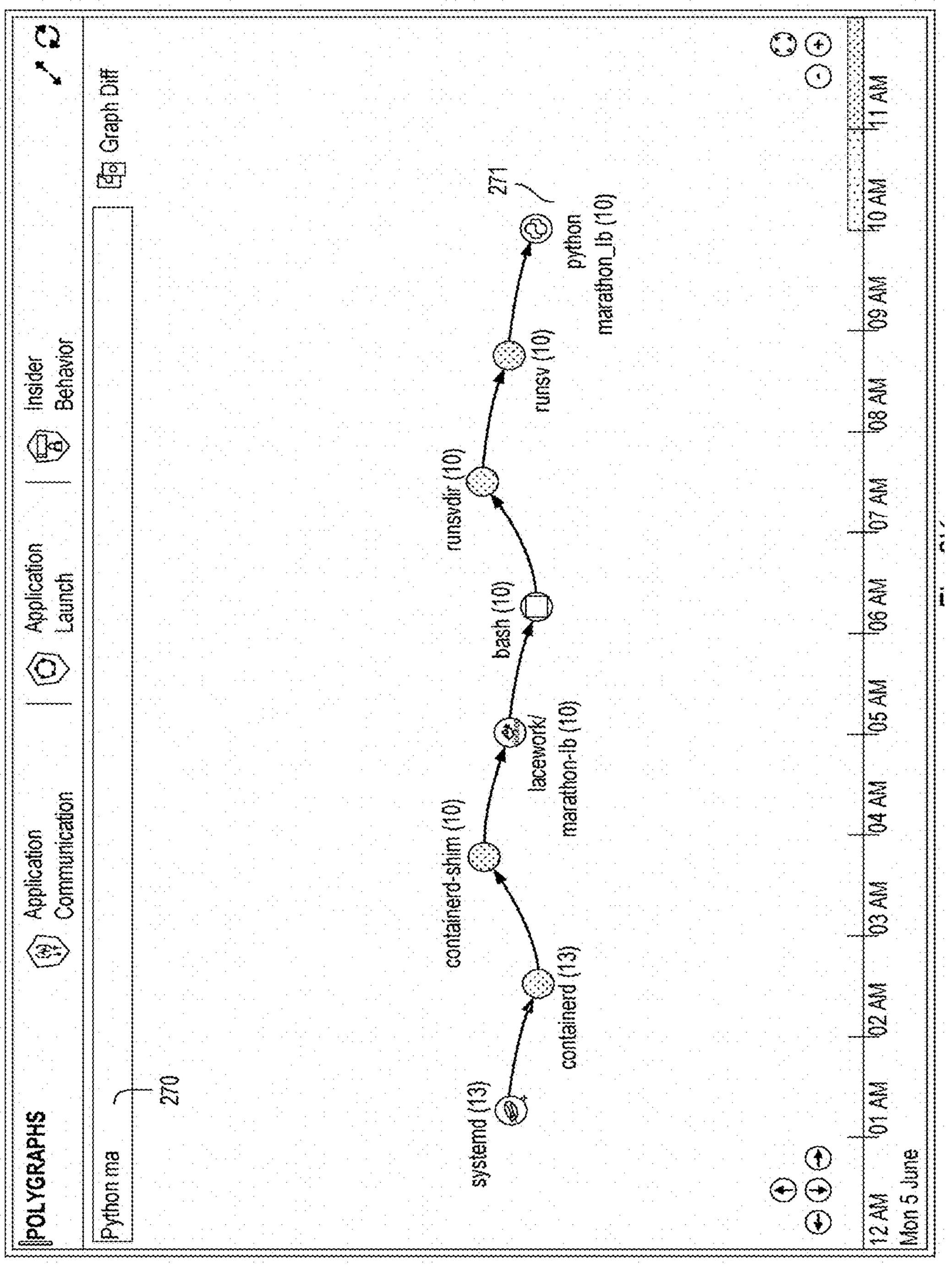
FIG. 2K illustrates an example of a portion of a polygraph as rendered in an interface.

FIG. 2K illustrates an example of a portion of a polygraph as rendered in an interface. FIG. 2K illustrates another example of a portion of an application launch polygraph. In FIG. 2K, user B has searched (270) for "python ma" to see how "python marathon_lb" (271) is launched. As shown in FIG. 2K, in each case (during the one-hour time slice of 10 am-11 am), python marathon_lb is launched as a result of a chain of the same seven applications each time. If python marathon_lb is ever launched in a different manner, this indicates anomalous behavior. The behavior could be indicative of malicious activities, but could also be due to other reasons, such as a misconfiguration, a performance-related issue, and/or a failure, etc.

Suppose user B now clicks on region 246 of the interface shown in FIG. 2F. User B will then be shown an insider behavior graph. The insider behavior graph tracks information about behaviors such as processes started by a user interactively using protocols such as ssh or telnet, and any processes started by those processes. As one example, suppose an administrator logs into a first virtual machine in the datacenter (e.g., using sshd via an external connection he makes from a hotel), using a first set of credentials (e.g., first.last@example.com and an appropriate password). From the first virtual machine, the administrator connects to a second virtual machine (e.g., using the same credentials), then uses the sudo command to change identities to those of another user, and then launches a program. Graphs built by the data platform can be used to associate the administrator with each of his actions, including launching the program using the identity of another user.

Figure 2L:
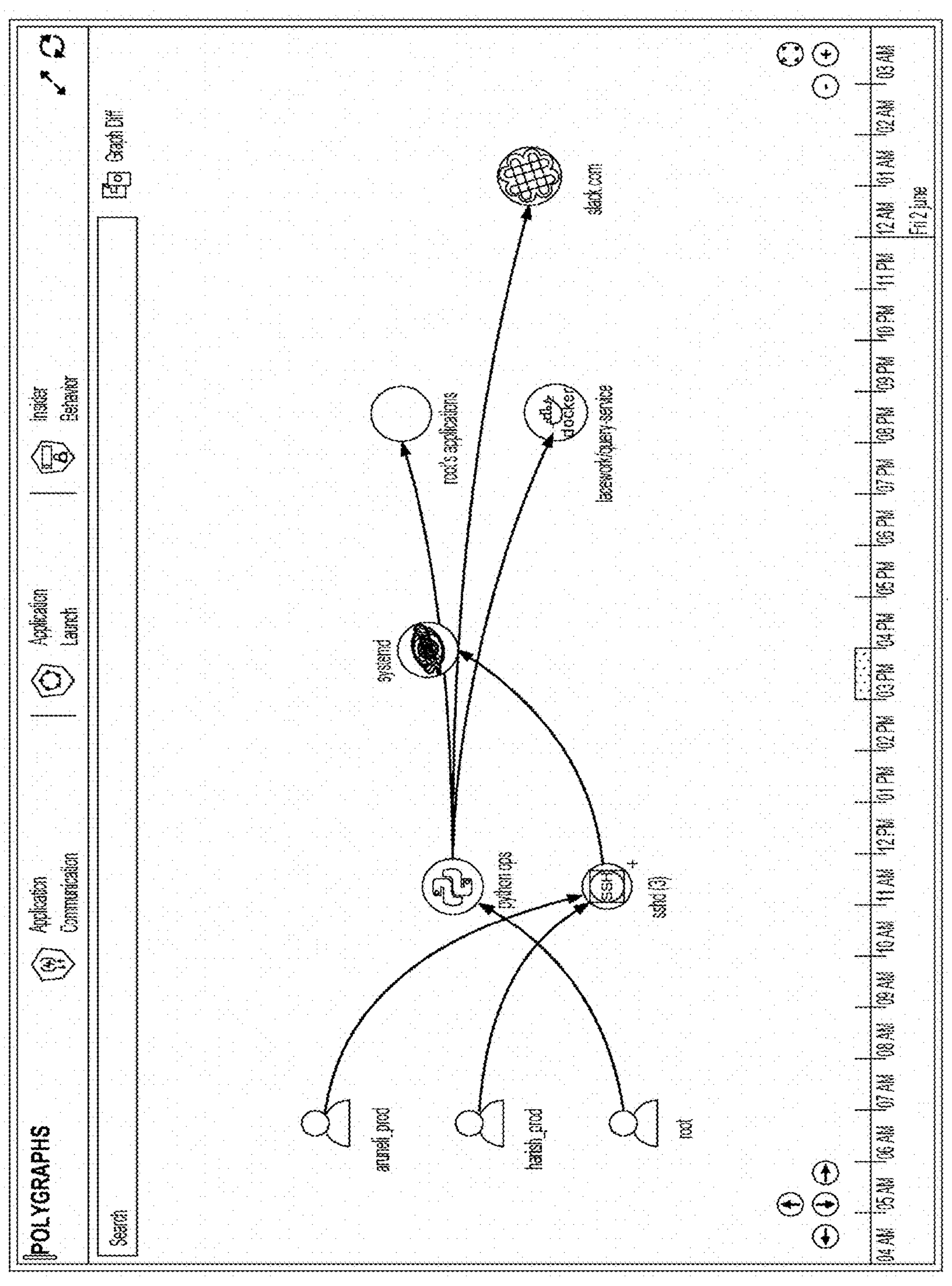
FIG. 2L illustrates an example of an insider behavior graph as rendered in an interface.

FIG. 2L illustrates an example of an insider behavior graph as rendered in an interface. FIG. 2L illustrates an example of a portion of an insider behavior graph. In particular, in FIG. 2L, user B is viewing a graph that corresponds to the time slice of 3 pm-4 pm on June 1. FIG. 2L illustrates the internal/external applications that users connected to during the one-hour time slice. If a user typically communicates with particular applications, that information will become part of a baseline. If the user deviates from his baseline behavior (e.g., using new applications, or changing privilege in anomalous ways), such anomalies can be surfaced.

Figure 2M:
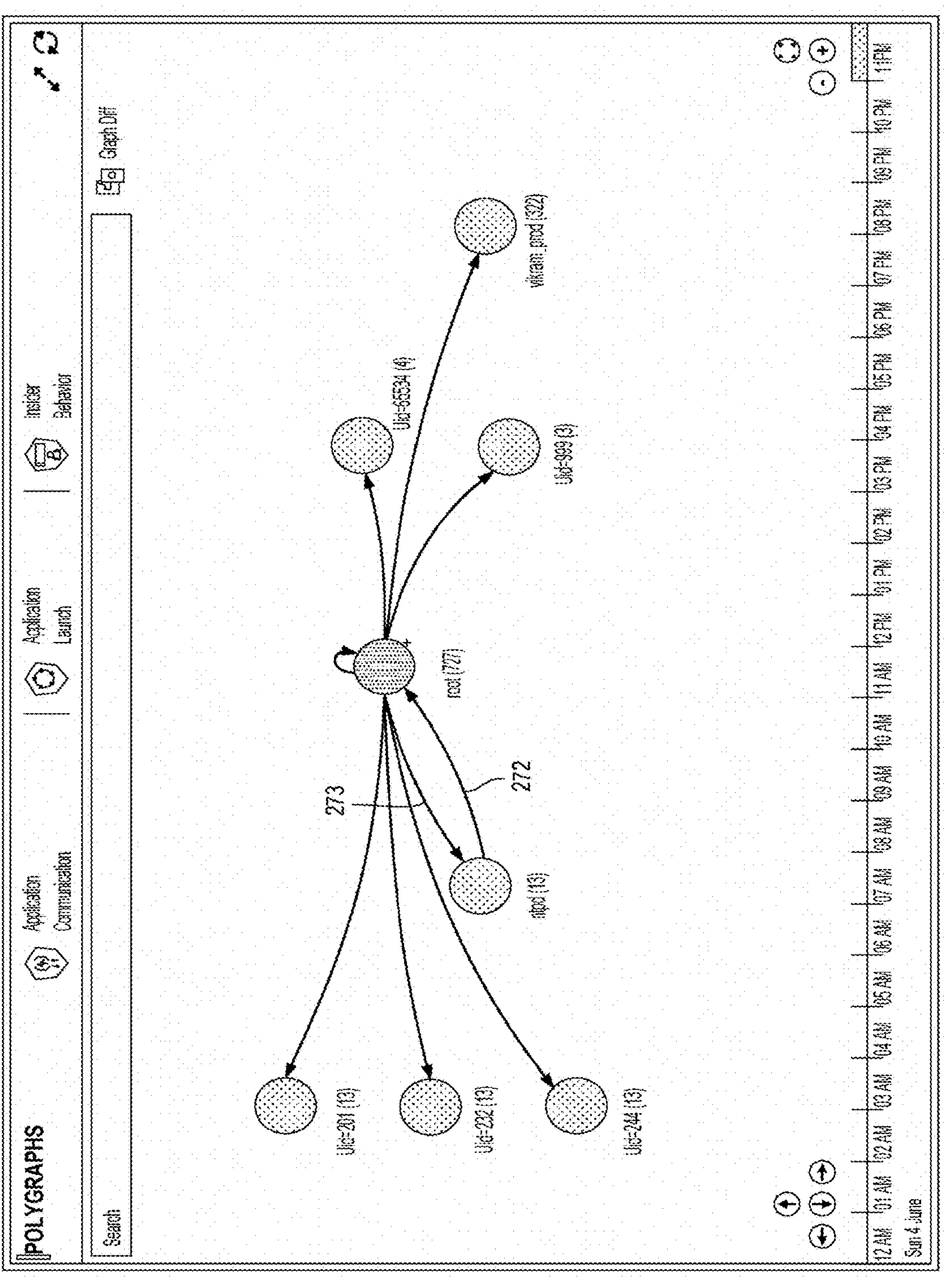
FIG. 2M illustrates an example of a privilege change graph as rendered in an interface.

FIG. 2M illustrates an example of a privilege change graph as rendered in an interface. FIG. 2M illustrates an example of a portion of a privilege change graph, which identifies how privileges are changed between processes. Typically, when a user launches a process (e.g., "1s"), the process inherits the same privileges that the user has. And, while a process can have fewer privileges than the user (i.e., go down in privilege), it is rare (and generally undesirable) for a user to escalate in privilege. Information included in the privilege change graph can be determined by examining the parent of each running process, and determining whether there is a match in privilege between the parent and the child. If the privileges are different, a privilege change has occurred (whether a change up or a change down). The application ntpd is one rare example of a scenario in which a process escalates (272) to root, and then returns back (273). The sudo command is another example (e.g., used by an administrator to temporarily have a higher privilege). As with the other examples, ntpd's privilege change actions, and the legitimate actions of various administrators (e.g., using sudo) will be incorporated into a baseline model by the data platform. When deviations occur, such as where a new application that is not ntpd escalates privilege, or where an individual that has not previously/does not routinely use sudo does so, such behaviors can be identified as anomalous.

Figure 2N:
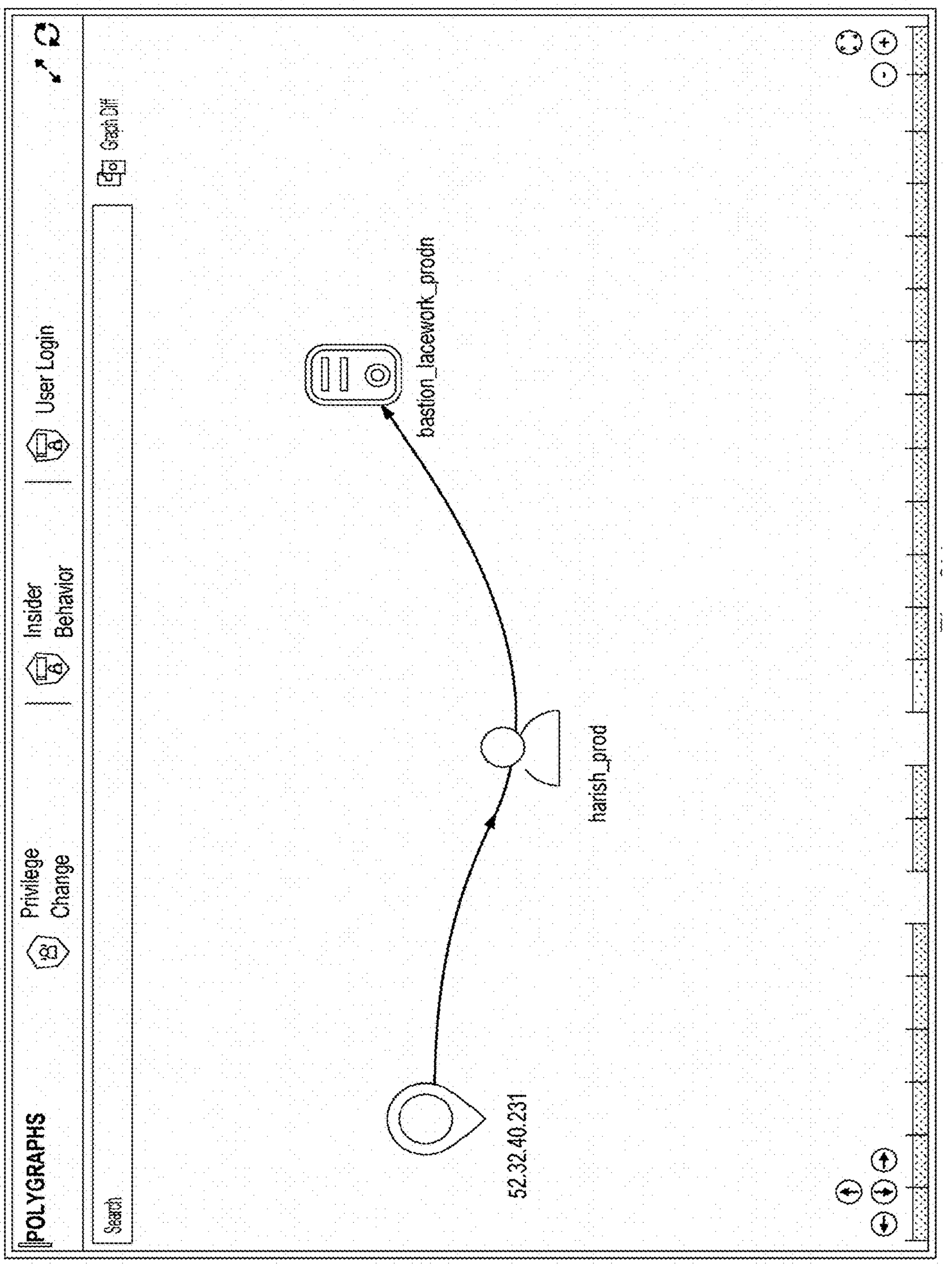
FIG. 2N illustrates an example of a user login graph as rendered in an interface.
Figure 20:
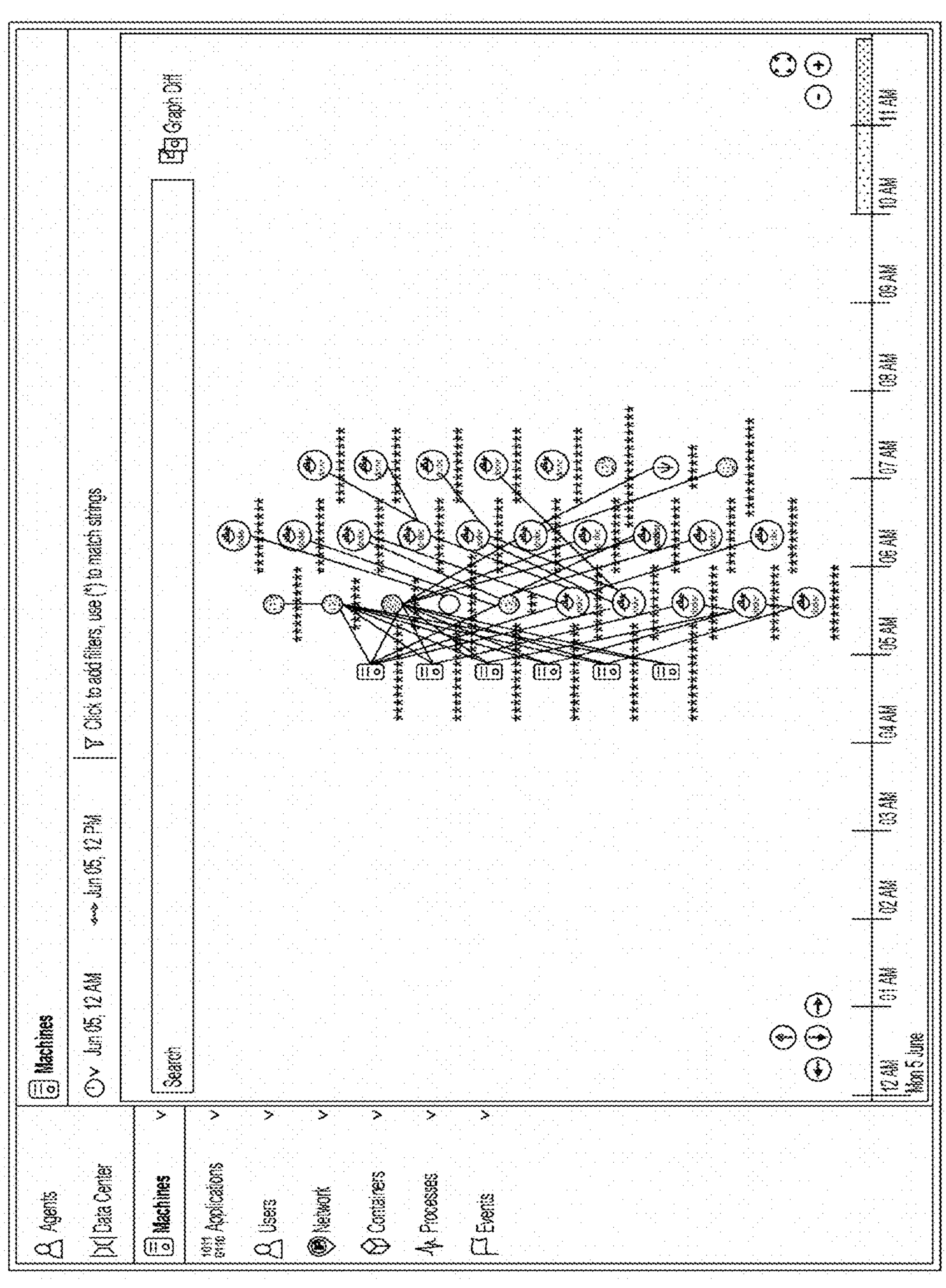

FIG. 2N illustrates an example of a user login graph as rendered in an interface. FIG. 2N illustrates an example of a portion of a user login graph, which identifies which users log into which logical nodes. Physical nodes (whether bare metal or virtualized) are clustered into a logical machine cluster, for example, using yet another graph, a machine-server graph, an example of which is shown in FIG. 2O.

FIG. 2O illustrates an example of a machine server graph as rendered in an interface. For each machine, a determination is made as to what type of machine it is, based on what kind(s) of workflows it runs. As one example, some machines run as master nodes (having a typical set of workflows they run, as master nodes) and can thus be clustered as master nodes. Worker nodes are different from master nodes, for example, because they run Docker containers, and frequently change as containers move around. Worker nodes can similarly be clustered.

As previously mentioned, the polygraph depicted in FIG. 2E corresponds to activities in a datacenter in which, in a given hour, approximately 500 virtual machines collectively run one million processes, and make 100 million connections in that hour. The polygraph represents a drastic reduction in size (e.g., from tracking information on 100 million connections in an hour, to a few hundred nodes and a few hundred edges). Using techniques described herein, such a polygraph can be constructed (e.g., using commercially available computing infrastructure) in less than an hour (e.g., within a few minutes). Thus, ongoing hourly snapshots of a datacenter can be created within a two-hour moving window (i.e., collecting data for the time period 8 am-9 am, while also generating a snapshot for the time previous time period 7 am-8 am). The following describes various example infrastructure that can be used in polygraph construction and also describes various techniques that can be used to construct polygraphs.

Returning to FIG. 1D, embodiments of data platform 110 may be built using any suitable infrastructure as a service (IaaS) (e.g., AWS). For example, data platform 110 can use Simple Storage Service (S3) for data storage, Key Management Service (KMS) for managing secrets, Simple Queue Service (SQS) for managing messaging between applications, Simple Email Service (SES) for sending emails, and Route 53 for managing DNS. Other infrastructure tools can also be used. Examples include: orchestration tools (e.g., Kubernetes or Mesos/Marathon), service discovery tools (e.g., Mesos-DNS), service load balancing tools (e.g., marathon-LB), container tools (e.g., Docker or rkt), log/metric tools (e.g., collectd, fluentd, kibana, etc.), big data processing systems (e.g., Spark, Hadoop, AWS Redshift, Snowflake etc.), and distributed key value stores (e.g., Apache Zookeeper or etcd2).

As previously mentioned, in various embodiments, data platform 12 may make use of a collection of microservices. Each microservice can have multiple instances, and may be configured to recover from failure, scale, and distribute work amongst various such instances, as applicable. For example, microservices are auto-balancing for new instances, and can distribute workload if new instances are started or existing instances are terminated. In various embodiments, microservices may be deployed as self-contained Docker containers. A Mesos-Marathon or Spark framework can be used to deploy the microservices (e.g., with Marathon monitoring and restarting failed instances of microservices as needed). The service etcd2 can be used by microservice instances to discover how many peer instances are running and used for calculating a hash-based scheme for workload distribution. Microservices may be configured to publish various health/status metrics to either an SQS queue, or etcd2, as applicable. In some examples, Amazon DynamoDB can be used for state management.

Additional information on various microservices used in embodiments of data platform 110 is provided below. Graph generator 180 is a microservice that may be responsible for generating raw behavior graphs on a per customer basis periodically (e.g., once an hour). In particular, graph generator 180 may generate graphs of entities (as the nodes in the graph) and activities between entities (as the edges). In various embodiments, graph generator 180 also performs other functions, such as aggregation, enrichment (e.g., geolocation and threat), reverse DNS resolution, TF-IDF based command line analysis for command type extraction, parent process tracking, etc.

Graph generator 180 may perform joins on data collected by the agents, so that both sides of a behavior are linked. For example, suppose a first process on a first virtual machine (e.g., having a first IP address) communicates with a second process on a second virtual machine (e.g., having a second IP address). Respective agents on the first and second virtual machines may each report information on their view of the communication (e.g., the PID of their respective processes, the amount of data exchanged and in which direction, etc.). When graph generator performs a join on the data provided by both agents, the graph will include a node for each of the processes, and an edge indicating communication between them (as well as other information, such as the directionality of the communication—i.e., which process acted as the server and which as the client in the communication).

In some cases, connections are process to process (e.g., from a process on one virtual machine within the cloud environment associated with entity A to another process on a virtual machine within the cloud environment associated with entity A). In other cases, a process may be in communication with a node (e.g., outside of entity A) which does not have an agent deployed upon it. As one example, a node within entity A might be in communication with node 196, outside of entity A. In such a scenario, communications with node 196 are modeled (e.g., by graph generator 180) using the IP address of node 196. Similarly, where a node within entity A does not have an agent deployed upon it, the IP address of the node can be used by graph generator in modeling.

Graphs created by graph generator 180 may be written to data store 122 and cached for further processing. A graph may be a summary of all activity that happened in a particular time interval. As each graph corresponds to a distinct period of time, different rows can be aggregated to find summary information over a larger timestamp. In some examples, picking two different graphs from two different timestamps can be used to compare different periods. If necessary, graph generator 180 can parallelize its workload (e.g., where its backlog cannot otherwise be handled within a particular time period, such as an hour, or if is required to process a graph spanning a long time period).

Graph generator 180 can be implemented in any appropriate programming language, such as Java or C, and machine learning libraries, such as Spark's MLLib. Example ways that graph generator computations can be implemented include using SQL or Map-R, using Spark or Hadoop.

SSH tracker 182 is a microservice that may be responsible for following ssh connections and process parent hierarchies to determine trails of user ssh activity. Identified ssh trails are placed by SSH tracker 182 into data store 122 and cached for further processing.

SSH tracker 182 can be implemented in any appropriate programming language, such as Java or C, and machine libraries, such as Spark's MLLib. Example ways that SSH tracker computations can be implemented include using SQL or Map-R, using Spark or Hadoop.

Threat aggregator 186 is a microservice that may be responsible for obtaining third party threat information from various applicable sources, and making it available to other micro-services. Examples of such information include reverse DNS information, GeoIP information, lists of known bad domains/IP addresses, lists of known bad files, etc. As applicable, the threat information is normalized before insertion into data store 122. Threat aggregator 186 can be implemented in any appropriate programming language, such as Java or C, using SQL/JDBC libraries to interact with data store 122 (e.g., for insertions and queries).

Scheduler 160 is a microservice that may act as a scheduler and that may run arbitrary jobs organized as a directed graph. In some examples, scheduler 160 ensures that all jobs for all customers are able to run during a given time interval (e.g., every hour). Scheduler 160 may handle errors and retrying for failed jobs, track dependencies, manage appropriate resource levels, and/or scale jobs as needed. Scheduler 160 can be implemented in any appropriate programming language, such as Java or C. A variety of components can also be used, such as open source scheduler frameworks (e.g., Airflow), or AWS services (e.g., the AWS Data pipeline) which can be used for managing schedules.

Graph Behavior Modeler (GBM) 168 is a microservice that may compute polygraphs. In particular, GBM 168 can be used to find clusters of nodes in a graph that should be considered similar based on some set of their properties and relationships to other nodes. As described herein, the clusters and their relationships can be used to provide visibility into a datacenter environment without requiring user specified labels. GBM 168 may track such clusters over time persistently, allowing for changes to be detected and alerts to be generated.

GBM 168 may take as input a raw graph (e.g., as generated by graph generator 180). Nodes are actors of a behavior, and edges are the behavior relationship itself. For example, in the case of communication, example actors include processes, which communicate with other processes. GBM 168 clusters the raw graph based on behaviors of actors and produces a summary (the polygraph). The polygraph summarizes behavior at a datacenter level. GBM 168 also produces "observations" that represent changes detected in the datacenter. Such observations may be based on differences in cumulative behavior (e.g., the baseline) of the datacenter with its current behavior. GBM 168 can be implemented in any appropriate programming language, such as Java, C, or Golang, using appropriate libraries (as applicable) to handle distributed graph computations (handling large amounts of data analysis in a short amount of time). Apache Spark is another example tool that can be used to compute polygraphs. GBM 168 can also take feedback from users and adjust the model according to that feedback. For example, if a given user is interested in relearning behavior for a particular entity, GBM 168 can be instructed to "forget" the implicated part of the polygraph.

GBM runner 170 is a microservice that may be responsible for interfacing with GBM 154 and providing GBM 168 with raw graphs (e.g., using a query language, such as SQL, to push any computations it can to data store 30). GBM runner 170 may also insert polygraph output from GBM 168 to data store 122. GBM runner 170 can be implemented in any appropriate programming language, such as Java or C, using SQL/JDBC libraries to interact with data store 122 to insert and query data.

Alert generator 184 is a microservice that may be responsible for generating alerts. Alert generator 158 may examine observations (e.g., produced by GBM 168) in aggregate, deduplicate them, and score them. Alerts may be generated for observations with a score exceeding a threshold. Alert generator 184 may also compute (or retrieve, as applicable) data that a customer (e.g., user A or user B) might need when reviewing the alert. Examples of events that can be detected by data platform 110 (and alerted on by alert generator 184) include, but are not limited to the following:

new user: This event may be created the first time a user (e.g., of node 116) is first observed by an agent within a datacenter.

user launched new binary: This event may be generated when an interactive user launches an application for the first time.

new privilege escalation: This event may be generated when user privileges are escalated, and a new application is run.

new application or container: This event may be generated when an application or container is seen for the first time.

new external connection: This event may be generated when a connection to an external IP/domain is made from a new application.

new external host or IP: This event may be generated when a new external host or IP is involved in a connection with a datacenter.

new internal connection: This event may be generated when a connection between internal-only applications is seen for the first time.

new external client: This event may be generated when a new external connection is seen for an application which typically does not have external connections.

new parent: This event may be generated when an application is launched by a different parent.

connection to known bad IP/domain: data platform 110 maintains (or can otherwise access) one or more reputation feeds. If an environment makes a connection to a known bad IP or domain, an event will be generated.

login from a known bad IP/domain: An event may be generated when a successful connection to a datacenter from a known bad IP is observed by data platform 110.

Alert generator 184 can be implemented in any appropriate programming language, such as Java or C, using SQL/JDBC libraries to interact with data store 122 to insert and query data. In various embodiments, alert generator 184 also uses one or more machine learning libraries, such as Spark's MLLib (e.g., to compute scoring of various observations). Alert generator 184 can also take feedback from users about which kinds of events are of interest and which to suppress.

QsJobServer 162 is a microservice that may look at all the data produced by data platform 110 for an hour and compile a materialized view (MV) out of the data to make queries faster. The MV helps make sure that the queries customers most frequently run, and data that they search for, can be easily queried and answered. QsJobServer 162 may also precompute and cache a variety of different metrics so that they can quickly be provided as answers at query time. QsJobServer 162 can be implemented using any appropriate programming language, such as Java or C, using SQL/JDBC libraries. In some examples, QsJobServer 162 is able to compute an MV efficiently at scale, where there could be a large number of joins. An SQL engine, such as Oracle, can be used to efficiently execute the SQL, as applicable.

Alert notifier 166 is a microservice that may take alerts produced by alert generator 184 and send them to customers' integrated Security Information and Event Management (SIEM) products (e.g., Splunk, Slack, etc.). Alert notifier 166 can be implemented using any appropriate programming language, such as Java or C. Alert notifier 166 can be configured to use an email service (e.g., AWS SES or pagerduty) to send emails. Alert notifier 166 may also provide templating support (e.g., Velocity or Moustache) to manage templates and structured notifications to SIEM products.

Reporting module 164 is a microservice that may be responsible for creating reports out of customer data (e.g., daily summaries of events, etc.) and providing those reports to customers (e.g., via email). Reporting module 164 can be implemented using any appropriate programming language, such as Java or C. Reporting module 164 can be configured to use an email service (e.g., AWS SES or pagerduty) to send emails. Reporting module 164 may also provide templating support (e.g., Velocity or Moustache) to manage templates (e.g., for constructing HTML-based email).

Web app 154 is a microservice that provides a user interface to data collected and processed on data platform 110. Web app 154 may provide login, authentication, query, data visualization, etc. features. Web app 154 may, in some embodiments, include both client and server elements. Example ways the server elements can be implemented are using Java Drop Wizard or Node.Js to serve business logic, and a combination of JSON/HTTP to manage the service. Example ways the client elements can be implemented are using frameworks such as React, Angular, or Backbone. JSON, jQuery, and JavaScript libraries (e.g., underscore) can also be used.

Query service 156 is a microservice that may manage all database access for web app 120. Query service 156 abstracts out data obtained from data store 30 and provides a JSON-based REST API service to Web app 154. Query service 156 may generate SQL queries for the REST APIs that it receives at run time. Query service 166 can be implemented using any appropriate programming language, such as Java or C and SQL/JDBC libraries, or an SQL framework such as jOOQ. Query service 156 can internally make use of a variety of types of databases, including a relational database engine 168 (e.g., AWS Aurora) and/or data store 30 to manage data for clients. Examples of tables that query service 156 manages are OLTP tables and data warehousing tables.

Cache 170 may be implemented by Redis and/or any other service that provides a key-value store. Data platform 12 can use cache 170 to keep information for frontend services about users. Examples of such information include valid tokens for a customer, valid cookies of customers, the last time a customer tried to login, etc.

Figure 3:
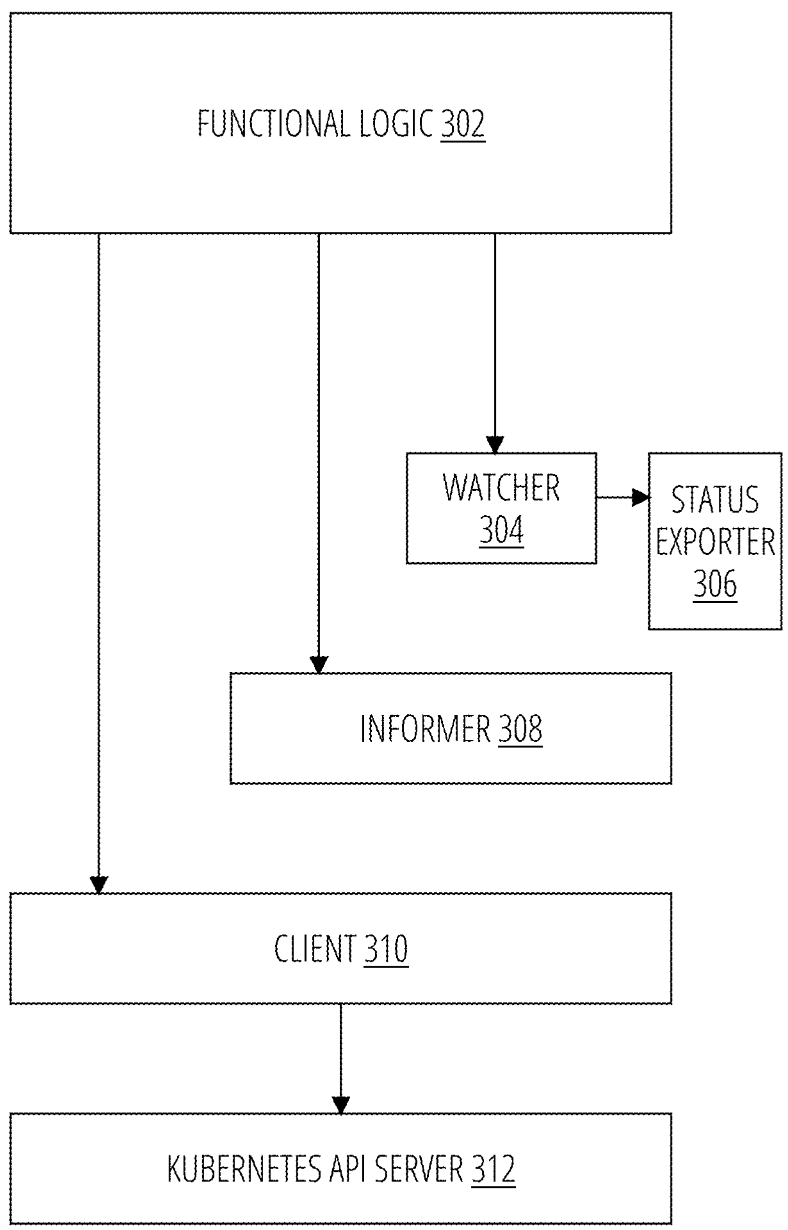
FIG. 3 is a block diagram of an example application program interface (API) access for an ephemeral job controller (EJC).

FIG. 3 is a block diagram of an example application program interface (API) access for an ephemeral job controller (EJC). In some embodiments, the job controller (EJC) may include components such as a runtime component, a controller component, a database component, and Kubernetes client abstractions. The controller component may implement service handlers and may provide a starting point for method invocations. The database component may contain logic for interacting with a database (e.g., a MySQL database). The abstractions may define a number of abstractions for interacting with Kubernetes.

In the example of FIG. 3, client 310 configures rate limits and settings according to a runtime configuration map, parses error conditions into consumable enumerations, implements retry handling (can provide exponential back-off), logs metrics to a data store (not illustrated in FIG. 3), and/or logs to a data store (not illustrated in FIG. 3). In an example, a Kubernetes client structure can wrap a Golang Kubernetes client and may provide one or more of the features listed. In some embodiments, the Kubernetes client may implement effectful API calls (e.g., CREATE and DELETE) via Kubernetes API server 312. Non-effectful calls (e.g., GET, LIST, WATCH) may be implemented using cache primitives.

In an example, informer 308 retains an in-memory copy of pod and job objects within the EJC namespace, using, for example, the Kubernetes Informer class. In an example, informer 308 provides one or more of the following functions. In an example, informer 308 allows for querying jobs directly from cache, without the cost of an API call. In an example, informer 308 provides a single abstraction on top of both job and pod informers, giving callers a consistent view of a job's state. In an example, informer 308 logs metrics to a data store and/or logs to a data store. In an example, informer 308 has the appropriate hooks to enable the watcher class (e.g., watcher 304).

In an example, watcher 304 allows callers to subscribe to updates to a particular ephemeral job, or all ephemeral jobs (including both job and pod updates). In an example, watcher 304 provides one or more of the following features. In an example, watcher 304 dynamically constructs and destructs channels corresponding to a given job. In an example, watcher 304 provides helper methods to construct observable streams from the job channels. In an example, if the state of a job in Kubernetes drifts away from the state of the job in the EJC informer, unexpected things can happen. For example, suppose client 310 calls "CreateEphemeralJob," and then immediately calls "GetEphemeralJob." If the job object has not yet been synced to informer 308, client 310 may reasonably retry creation.

In an example, watcher 304 allows the EJC to block Create/Delete requests on informer 308 being synced. This improves read-after-write consistency (timeouts being the exception). In an example, watcher 304 additionally provides a basis to implement a streaming interface.

In an example, status exporter 306 utilizes informer 308 and watcher 304 classes to tail job status updates and push these changes to metrics using an influx database client. In an example, status exporter 306 tags the database influx point with, for example, the job namespace, name, client ID, and workload. Additional and/or different tags can also be utilized. In an example, in addition to job status, the status information may include job annotations such as SLA deadline, target deadline, and estimated duration in the point's fields. In an example, if the job is completed, then a wall time may also be included in the point's fields.

In an example, a tracer may export event traces to an application performance management platform (e.g., Honeycomb). In an example, the tracer may be implemented as a wrapper around an observability framework such as an Open Telemetry client.

Functional logic 302 can be configured to provide various types of functionality including, for example, validation of requests to create ephemeral jobs, mutation of requests to create ephemeral jobs to allow the EJC to track the ephemeral jobs (e.g., mutations can include application of annotations), status monitoring by evaluating jobs and corresponding pod objects from Kubernetes and converting the evaluations to status representations, and/or the ability to launch Spark jobs, (e.g., which may include crating a job object from a request to create an ephemeral job and filling in command arguments and environment variables).

In an example, a Kubernetes job reaper (not illustrated in FIG. 3) can automatically clean up Kubernetes jobs and pods once they have reached a terminated state. The reaper mirrors the state of the job into a database table, for example, so that it can be consumed by callers.

Figure 4:
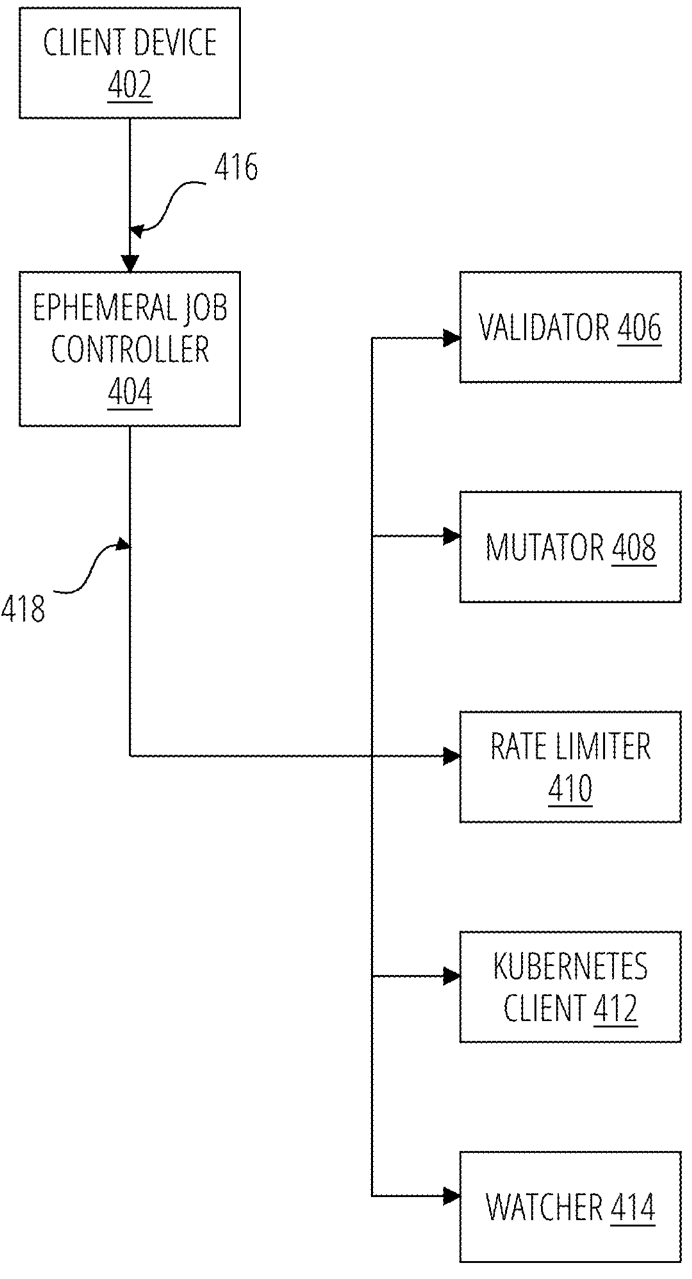
FIG. 4 is a block diagram of example components that can be configured to create a job.

FIG. 4 is a block diagram of example components that can be configured to create a job. Creation of a job can be a multi-step process. In an optional configuration (not illustrated in FIG. 4), a Spark "GetConfig" component can be utilized. That is, a component that manages the utilization of the Spark "GetConfig" functionality can be included.

In an example, if the job 416 is a Spark job, ephemeral job controller 404 converts a request to create an ephemeral job into job object 418. In an example, job object 418 may be validated using validator 406 to ensure the requisite options are set for EJC, and/or to enforce job best practices. In an example, job object 418 is mutated by 208 to add additional annotations and settings.

In an example, a token is obtained from rate limiter 410 to submit the job to Kubernetes. This ensures that the Kubernetes API is not overwhelmed. Job object 418 is then submitted to Kubernetes client 412. In an example, watcher 414 is utilized to watch the job to ensure it reaches a "created" state.

Figure 5:
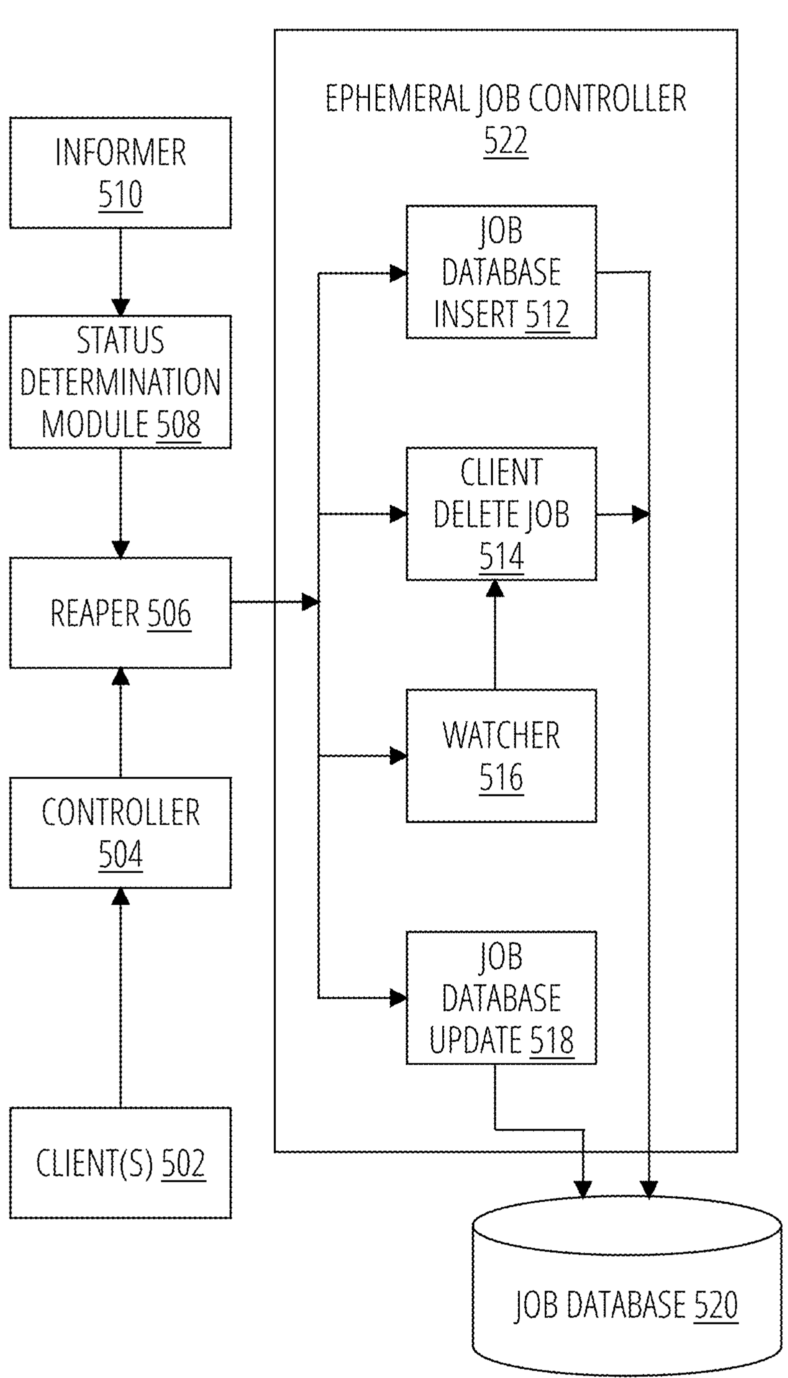
FIG. 5 is a block diagram of example components that can be configured to perform job reaping.

FIG. 5 is a block diagram of example components that can be configured to perform job reaping. In some implementations, job reaping may be started via one of two mechanisms as illustrated in FIG. 5.

In an first approach, a user manually submits a request to ephemeral job controller 522 (e.g., via client(s) 502 and controller 504 to reaper 506) to terminate an ephemeral job (e.g., a request to terminate a Spark job) to the EJC server. In a second approach, ephemeral job controller 522 receives an event from the Kubernetes informer (e.g., via informer 510 and status determination module 508 to reaper 506) indicating that a job has entered a terminal state (successful or unsuccessful).

In either of these two cases, one or more of the following functions may be performed by, for example, ephemeral job controller 522. The current state of the job is captured, including child pods. In an example, this state information is passed through status determination module 508 to determine the status of the job. The state of the job is persisted to a database (e.g., job database 520) via job database insert 512 or job database update 518 (with the client delete job 514 deleting the job when appropriate). The job and any children pods are deleted from Kubernetes when the job is terminated by the manual request or has entered a terminal state.

In an example, watcher 516 is utilized to ensure that the job has been deleted from Kubernetes. In an example, this is done using the Watcher class. When the job has been confirmed deleted, it is marked deleted in job database 520.

Figure 6:
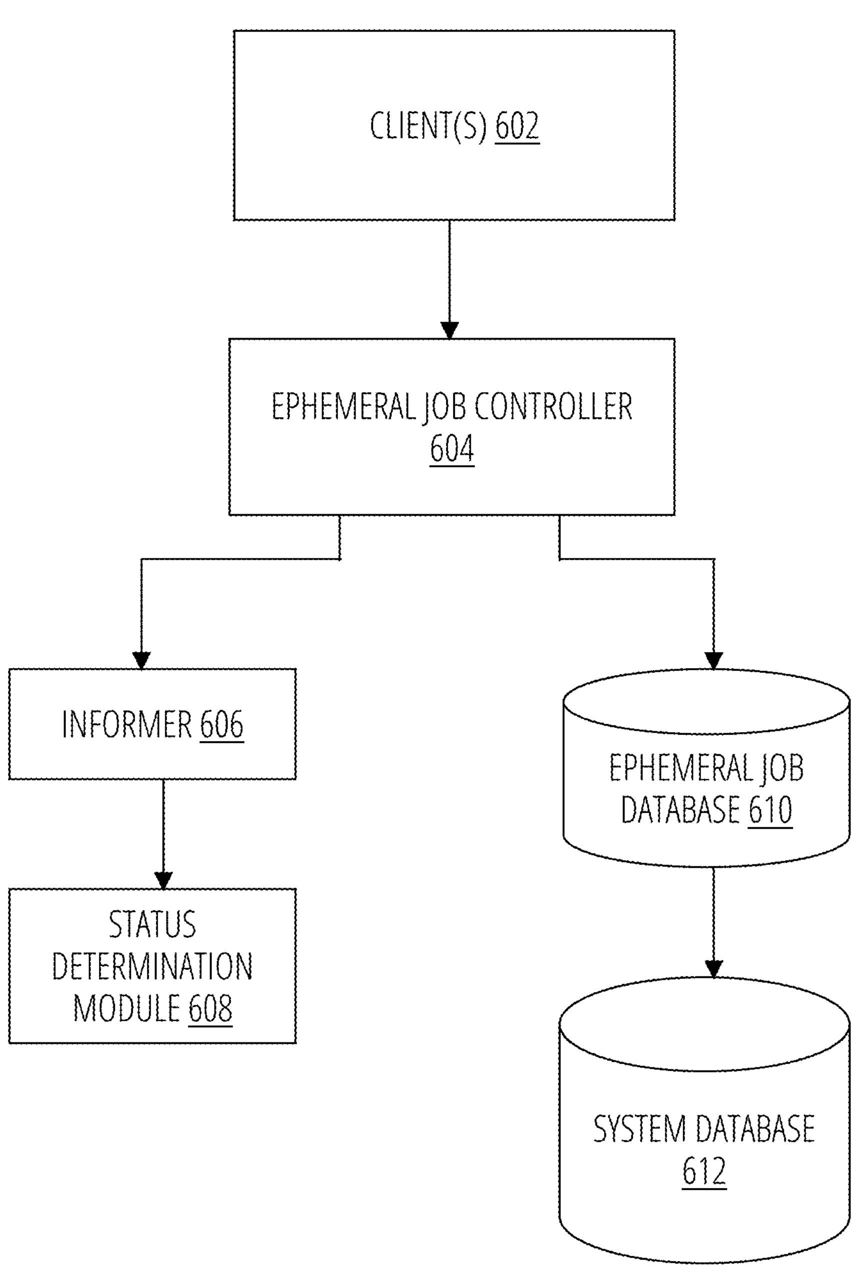
FIG. 6 is a block diagram of an example architecture for providing a source of truth for a job state.

FIG. 6 is a block diagram of an example architecture for providing a source of truth for a job state. In some embodiments, the source of truth for a job state can either be in (Kubernetes) informer 606 and/or status determination module 608 (for currently running jobs), or in ephemeral job database 610 and/or system database 612. In an example, to return all possible job results matching a query, both sources of truth are queried. The results from both sources of truth are merged and the merged result is returned.

In an example, informer-based (e.g., informer 606) queries may be performed using custom indexers over annotations on the pod. In an example, database queries may be performed using, for example, a MySQL JSON query, which may be made performant using custom indexes on JSON properties.

Figure 7:
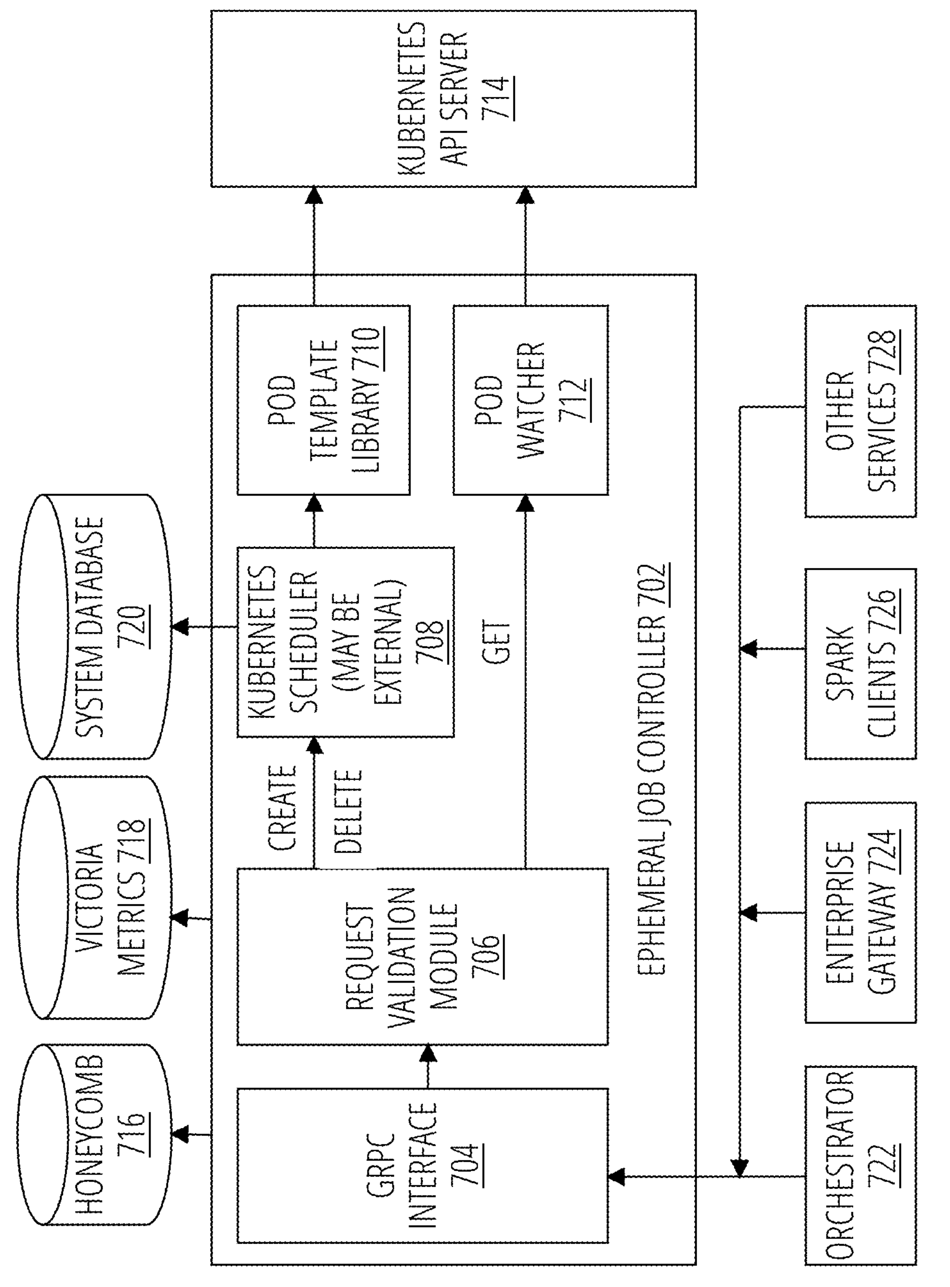
FIG. 7 is a block diagram of an example ephemeral job controller.

FIG. 7 is a block diagram of an example ephemeral job controller. In some embodiments, the ephemeral job controller 702 may be configured to support one or more of: rate limits on pods and/or IP addresses, per-namespace resource limiting, feedback looks between orchestrator and job controller, running Spark jobs as either ephemeral or persisted jobs, multi-tenancy, intelligent scheduling, and load balancing across multiple managed service clusters (e.g., EKS clusters).

In some embodiments, ephemeral job controller 702 is configured to provide one or more of the following features/functions. In an example, ephemeral job controller 702 monitors jobs using a Kubernetes informer (see above), allowing the data platform system to serve requests for the current state of a job without a round-trip to Kubernetes. In an example, ephemeral job controller 702 reaps completed jobs from Kubernetes, and persists the relevant state information to system database 720. This allows clients (e.g., orchestrator 722, enterprise gateway 724, Spark clients 726, other services 728) to request the state of past jobs, while freeing up the bandwidth for other jobs. In an example, ephemeral job controller 702 applies concurrency limits to the number of jobs created by each client, protecting the Kubernetes backplane.

In an example, ephemeral job controller 702 exposes more ergonomic APIs (e.g., via gRPC interface 704) for creating and querying the state of jobs. Ephemeral job controller 702 may also impose validations on job specifications and mutate jobs to add important metadata properties (for tracking and performance purposes) via request validation module 706, for example.

In Kubernetes gRPC refers to the integration and use of the gRPC framework within Kubernetes environments to facilitate high-performance, remote procedure calls between services. In general, gRPC is a high-performance, open-source RPC (Remote Procedure Call) framework developed by Google. It is designed to make it easier for developers to build distributed systems and micro-services by abstracting the complexities of network communication. It supports multiple programming languages and uses Protocol Buffers as its interface definition language, which allows for efficient serialization and deserialization of data.

Kubernetes allows the creation of custom resources using custom resource definitions (CRDs), which can be used to define specific configurations for gRPC services. Kubernetes supports gRPC health checking, allowing users to define liveness and readiness probes for gRPC servers running in pods. This ensures that services are healthy and ready to handle requests. Newer versions of ingress controllers, like Kong Ingress Controller 2.9, support exposing gRPC services using the Gateway API, allowing for streamlined management of gRPC traffic within Kubernetes clusters. Overall, integrating gRPC with Kubernetes enhances the performance and scalability of micro-services by leveraging Kubernetes' orchestration capabilities along with gRPC's efficient communication protocols.

Request validation in is primarily handled by request validation module 706 which reviews requests to the Kubernetes API server before any object is persisted. In an example, request validation module 706 can either allow or deny requests based on predefined rules.

Returning to FIG. 7, in an example, ephemeral job controller 702 supports creating Spark Jobs natively (without a spark-operator). Ephemeral job controller 702 may implement additional Spark functionalities (shared Spark properties, launching small jobs in single-pod mode, using generic ephemeral volumes), which may improve the reliability and performance of Spark jobs. In an example, ephemeral job controller 702 provides Prometheus counters and Honeycomb tracing, giving better observability into job status.

Prometheus is an open-source monitoring and alerting toolkit that is widely used in conjunction with Kubernetes and Apache Spark for monitoring purposes. Prometheus integrates seamlessly with Kubernetes by using a pull-based model to scrape metrics from instrumented jobs. It leverages Kubernetes' service discovery to automatically find and monitor applications running within the cluster.

Prometheus stores all scraped samples locally and can run rules over this data to aggregate and record new time series or generate alerts. It is designed for reliability, allowing users to diagnose problems even during outages. Tools like Grafana are often used alongside Prometheus to visualize the collected data, providing insights into the performance and health of applications running in Kubernetes.

In Apache Spark, especially when running on Kubernetes, Prometheus can be used to monitor Spark clusters by scraping metrics exposed through endpoints like JMX (Java Management Extensions). With Apache Spark 3.0, there is native support for Prometheus monitoring, which simplifies the integration process. Users can enable Prometheus metrics collection by configuring specific settings. For environments where Spark clusters are dynamically created and destroyed, such as in Kubernetes, Prometheus can use service discovery configurations or the Prometheus Operator to efficiently monitor these transient clusters.

Honeycomb is an observability platform that includes a Kubernetes-aware feature designed to help developers and platform engineers better understand and manage the complexities of applications running on Kubernetes. This allows users to correlate application requests with specific Kubernetes infrastructure components such as pods, nodes, and cluster configurations. It aims to bridge the visibility gaps between application service requests and infrastructure orchestration, providing granular insights into how code behavior impacts application performance.

Honeycomb provides detailed insights into application performance by correlating it with Kubernetes infrastructure, helping teams identify whether issues are application-related or infrastructure-related. Honeycomb clusters Kubernetes data into a single stream of rich events, simplifying debugging processes and enhancing workflow efficiency. Honeycomb uses statistical analysis to surface unique attribute values related to any identified anomalies, enabling quick identification of infrastructure issues affecting application performance. Honeycomb supports OpenTelemetry for collecting metrics, events, and trace span context from Kubernetes environments. It offers low-code and no-code options for easy integration.

Returning to FIG. 7, in some embodiments, the data platform system may provide tools (e.g., Prometheus, Honeycomb) for use by job developers to test jobs end-to-end and/or to simulate infrastructure and job failures. In some embodiments, ephemeral job controller 702 may provide or use a rate limiting service, which may be implemented as a distributed semaphore backed by a distributed key-value store such as etcd. Etcd is an open-source distributed key-value store designed to provide strong consistency, high availability, and survivability in distributed systems. It was developed by the CoreOS team and is widely used in cloud environments and container orchestration platforms like Kubernetes. Etcd ensures that data is always up-to-date and consistent across the cluster using the Raft consensus algorithm. The distributed architecture of eted replicates data across multiple nodes, ensuring the system remains operational even if some nodes fail. Etcd can survive network partitions and node failures, maintaining data accessibility and consistency under adverse conditions. Applications can register a watch on specific keys or directories, allowing them to react to changes in values.

In an example, pod watcher 712 is a tool or mechanism used to monitor the status and events related to pods within a Kubernetes cluster. Pod watcher 712 can watch for groups of pods in a Kubernetes namespace. Pod watcher 712 can be used to watch all pods within a specific namespace.

In an example, Kubernetes Scheduler (may be external) 708 provides scheduling functionality including the following. Assigning newly created pods to nodes in a cluster, identifying nodes that meet the specific requirements of a pod, such as resource availability (CPU, memory), hardware/software constraints, and policy rules (nodes that pass this filtering are considered "feasible" for the pod) and/or scoring the feasible nodes based on several factors like resource utilization, affinity/anti-affinity rules, and data locality. The node with the highest score is selected for the pod.

In an example, pod template library 710 provides a blueprint used by controllers to create pods. It specifies the desired state of pods, including container images, resource requests, and environment variables. Pod templates are integral parts of workload resources such as Deployments, Jobs, and DaemonSets. When a controller creates a pod, it uses the specifications defined in the pod template to ensure consistency across all instances of that pod type. This allows for easy scaling and management of applications. A pod template typically includes details about container images, commands to run within containers, volume mounts, and other configuration settings necessary for the pod's operation.

In some embodiments, ephemeral job controller 702 may leverage a database (e.g., system database 720) such as a MySQL database to store historical jobs. Alternatively, ephemeral job controller 702 may be configured to leverage a database (e.g., system database 720) as a service.

In some embodiments, ephemeral job controller 702 may be configured as a wrapper around an Amazon Elastic Kubernetes Service (EKS) API server. Amazon Elastic Kubernetes Service (EKS) is a fully managed Kubernetes service provided by AWS that simplifies the deployment and management of containerized applications. When using EKS, AWS manages the Kubernetes control plane, which includes components like the API server, etcd, and scheduler, ensuring high availability and security across multiple availability zone. EKS integrates with other AWS services such as IAM, CloudWatch, and VPC, providing a cohesive environment for running applications. EKS eliminates the need to manage the underlying infrastructure, reducing operational costs associated with running Kubernetes clusters. Ephemeral job controller 702 may create, watch, and delete jobs in EKS with a persistent state store and rate limiting.

In certain examples, a job may be triggered in an orchestrator of the data service platform. The specification file(s) for the job indicate to the orchestrator whether to direct the job directly to EKS or to run the job through ephemeral job controller 702. If the job is an EJC job, orchestrator 722 will issue calls such as gRPC calls to the ephemeral job controller 702, which may receive and handle the calls.

For a request to get job status, ephemeral job controller 702 may determine a job status by querying a database (e.g., system database 720) and an in-memory job cache (Kubernetes informer as described above). Ephemeral job controller 702 may return a status that indicates a job state, as well as the states of all pods created by the job.

For a request to create a job, ephemeral job controller 702 may call a rate limiting service that determines whether there are sufficient resources to create the job or if the job should be rate limited due to insufficient resources, in which case a "busy" notification may be returned. In an example, ephemeral job controller 702 deletes Kubernetes jobs when they are done. A reaper process may be initiated (e.g., periodically) by ephemeral job controller 702. The reaper process may loop through all jobs in the cache and delete any terminated jobs. Deleted jobs may be recorded in system database 720.

In some embodiments, ephemeral job controller 702 may be deployed in a controller namespace and may provide a single EJC pod for each job in the controller namespace. Pods created by jobs (worker pods) may be in separate job namespaces. In some embodiments, ephemeral job controller 702 may be configured to create different types of jobs, such as Spark and non-Spark jobs. Non-Spark jobs may be Kubernetes jobs, for example.

In some embodiments, the job controller may utilize a rate limiting service (RLS) to impose limits on the number of concurrent jobs across all namespaces, concurrent pods across all namespaces, concurrent jobs for each namespace and/or concurrent pods for each namespace.

In some implementations, ephemeral job controller 702 may reject a job creation request from orchestrator 722 if any of these limits is reached. In some embodiments, ephemeral job controller 702 may rate limit the number of calls to the EKS API server. This rate limit may be per namespace and may be burstable. In some embodiments, ephemeral job controller 702 may use a Kubernetes namespace resource quota as a guardrail to prevent ephemeral job controller 702 from taking up too many resources. The job controller's own rate limiting should prevent this namespace resource quota from being reached.

Figure 8:
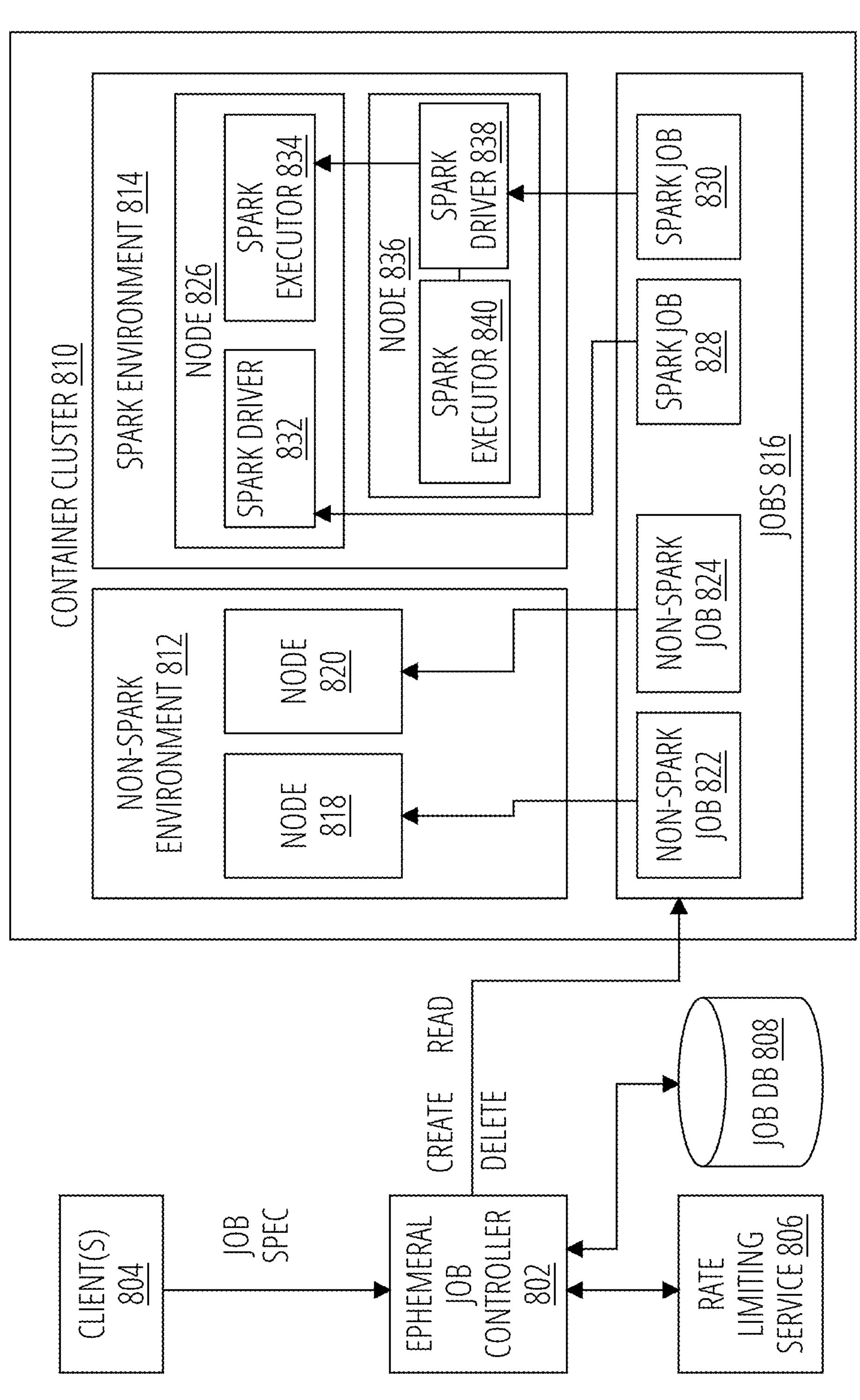
FIG. 8 is a block diagram representing a compute infrastructure having an ephemeral job controller.

FIG. 8 is a block diagram representing a compute infrastructure having an ephemeral job controller. As described above, in an example, the ephemeral job controller (EJC) provides additional services to create, watch, and delete jobs in the host computing environment. In an example, when the computing environment is a Kubernetes environment, the EJC can provide a persistent state store and/or rate-limiting functionality.

In an example, the EJC allows other services to dynamically launch Kubernetes jobs, with special helpers for launching Spark jobs. In some examples, the EJC can enforce concurrency limits to limit the number of concurrent jobs a client can have. In an example, GET requests are multiplexed over a Kubernetes informer, and the EJC only consumes a limited number of active connections from the Kubernetes API server. In an example, the EJC provides abstractions over the Kubernetes API to make it easier to understand the state of the job. This allows clients to better handle jobs that are in an unexpected state.

In an example, the EJC provides an interface for creating Spark jobs, which simplifies the management of, for example, a Spark infrastructure. In an example, the EJC provides validation where jobs are validated against Kubernetes best practices. In an example, the EJC provides one or more gRPC endpoints (e.g., CreateEphemeralJob, CreateSparkJob, GetEphemeralJobStatus, GetSparkJobStatus, List SparkJobStatus, TerminateEphemeralJob, TerminateSparkJob).

In the example of FIG. 8, ephemeral job controller 802 receives one or more job specifications from client(s) 804. In an example, ephemeral job controller 802 can access rate limiting service 806 and job DB 808 to support rate limiting and/or job status/tracking operations, respectively. In an example, ephemeral job controller 802 can CREATE, READ or DELETE jobs in jobs 816, which is part of container cluster 810. In an example, container cluster 810 is a Kubernetes-based cluster. In an example, jobs 816 can include both Spark jobs (e.g., Spark job 828, Spark job 830) and non-Spark jobs (e.g., non-Spark job 822, non-Spark job 824).

Within container cluster 810, non-Spark jobs (e.g., non-Spark job 822, non-Spark job 824) are assigned to nodes (e.g., node 818, node 820, respectively) in non-Spark environment 812. Similarly, Spark jobs (e.g., Spark job 828, Spark job 830) are assigned to nodes (e.g., node 826, node 836) in Spark environment 814.

In the example of FIG. 8, non-Spark jobs are managed differently than Spark jobs. For example, Spark job 828 is assigned to Spark driver 832 in node 826. In an example, Spark driver 832 operates in local mode to execute Spark job 828 locally within 826. In contrast Spark job 830 is assigned to spark driver 838, which operates in cluster mode so that Spark job 830 can be executed by node 836 and node 826.

In an example, when the ephemeral jobs in jobs 816 are complete (or have been executed for a specified period), they can be terminated by ephemeral job controller 802 (e.g., utilizing a DELETE command).

FIG. 9 is a flow diagram of an example approach to the use of ephemeral workloads to monitor compute environments.

In an example, an ephemeral job controller receives a request to initiate an ephemeral job within a computing environment having one or more containers and corresponding container support functionality, 902. In an example, the ephemeral job controller is configured to support one or more of: rate limits on pods and/or Internet Protocol (IP) addresses, per-namespace resource limiting, feedback looks between orchestrator and job controller, running Spark jobs as either ephemeral or persisted jobs, multi-tenancy, intelligent scheduling, and load balancing across multiple managed service clusters.

In an example, the ephemeral job controller analyzes the request to initiate the ephemeral job to determine resources and/or limits based on a target container to which an ephemeral job is to be deployed, 904. In an example, the ephemeral job controller is configured to support one or more of: rate limits on pods and/or Internet Protocol (IP) addresses, per-namespace resource limiting, feedback looks between orchestrator and job controller, running Spark jobs as either ephemeral or persisted jobs, multi-tenancy, intelligent scheduling, and load balancing across multiple managed service clusters.

In an example, the ephemeral job controller initiates the ephemeral job corresponding to the request in the target container with limits determined from the target container, 906.

In an example, the ephemeral job controller obtains metrics from the target container via the ephemeral job, 908. In an example, metrics are utilized to generate a polygraph to establish a baseline of behavior allowing for the future detection of deviations from that baseline. In an example, polygraph data is maintained for a set of applications in a datacenter, and such polygraph data is combined to make a datacenter view across the set of applications.

In an example, the ephemeral job controller provides the metrics to a remote entity outside of the target container, 910.

In an example, the ephemeral job controller (and within a pre-specified period of time) terminates the ephemeral job, 912.

FIG. 10 is an example of a system to perform an example approach to the use of ephemeral workloads to monitor compute environments. In an example, system 1002 can include processor(s) 1004 and non-transitory computer-readable storage medium 1006. Non-transitory computer-readable storage medium 1006 may store instructions 1008, 1010, 1012, 1014, 1016 and 1018 that, when executed by processor(s) 1004, cause processor(s) 1004 to perform various functions. Examples of processor(s) 1004 may include a microcontroller, a microprocessor, a central processing unit (CPU), a graphics processing unit (GPU), a data processing unit (DPU), an application-specific integrated circuit (ASIC), a field programmable gate array (FPGA), a system on a chip (SoC), etc. Examples of non-transitory computer-readable storage medium 1006 include tangible media such as random-access memory (RAM), read-only memory (ROM), electrically erasable programmable read-only memory (EEPROM), flash memory, a hard disk drive, etc.

Instructions 1008 cause processor(s) 1004 to receive a request to initiate an ephemeral job within a computing environment having one or more containers and corresponding container support functionality. In an example, an ephemeral job controller is configured to support one or more of: rate limits on pods and/or Internet Protocol (IP) addresses, per-namespace resource limiting, feedback looks between orchestrator and job controller, running Spark jobs as either ephemeral or persisted jobs, multi-tenancy, intelligent scheduling, and load balancing across multiple managed service clusters.

Instructions 1010 cause processor(s) 1004 to analyze the request to initiate the ephemeral job to determine resources and/or limits based on a target container to which an ephemeral job is to be deployed. In an example, the ephemeral job controller is configured to support one or more of: rate limits on pods and/or Internet Protocol (IP) addresses, per-namespace resource limiting, feedback looks between orchestrator and job controller, running Spark jobs as either ephemeral or persisted jobs, multi-tenancy, intelligent scheduling, and load balancing across multiple managed service clusters.

Instructions 1012 cause processor(s) 1004 to initiate the ephemeral job corresponding to the request in the target container with limits determined from the target container.

Instructions 1014 cause processor(s) 1004 to obtain metrics from the target container via the ephemeral job. In an example, metrics are utilized to generate a polygraph to establish a baseline of behavior allowing for the future detection of deviations from that baseline. In an example, polygraph data is maintained for a set of applications in a datacenter, and such polygraph data is combined to make a datacenter view across the set of applications.

Instructions 1016 cause processor(s) 1004 to provide the metrics to a remote entity outside of the target container.

Instructions 1018 cause processor(s) 1004 to cause the ephemeral job controller (and within a pre-specified period of time) terminate the ephemeral job.

Figure 11:
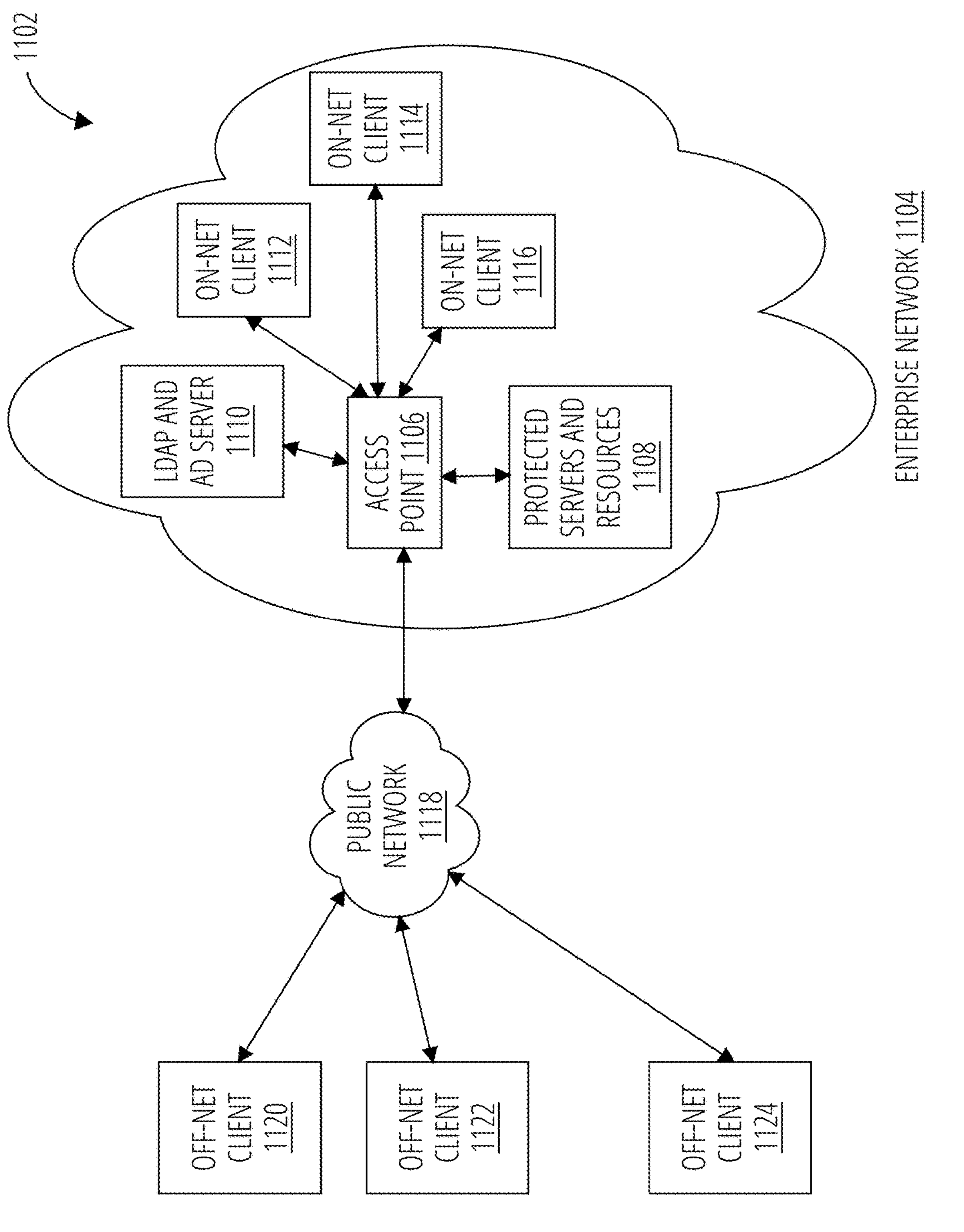
FIG. 11 is a block diagram of an architecture that can provide endpoint client authentication and application access control in a zero-trust network access (ZTNA) environment.

FIG. 11 is a block diagram illustrating operating environment 1102 in which various embodiments of the present disclosure may be employed. In the context of the present example, multiple off-net clients (e.g., off-net client 1120, off-net client 1122, off-net client 1124) access enterprise network 1104 via public network 1118 (e.g., the Internet). The off-net clients may represent endpoint or client devices (e.g., workstations, desktop computers, laptop computers, or mobile devices) used by remote workers associated with a particular organization or enterprise.

In an example, enterprise network 1104 includes Lightweight Directory Access Protocol (LDAP) and Active Directory (AD) (LDAP and AD) server 1110, access point 1106, protected servers and resources 1108, and multiple on-net clients (e.g., on-net client 1112, on-net client 1114, on-net client 1116). In an example, the on-net clients are locally attached client devices used by onsite workers. In an example, access point 1106 is a network security appliance operable within enterprise network 1104. Access point 1106 may be responsible for controlling access to protected servers and resources 1108, which may include various protected network devices, servers, resources, services, TCP applications, and/or databases. For example, as is known in the art, access point 1106 may evaluate policies to determine what devices and users can access a given target service of protected servers and resources 1108.

In an example, when a given user session matches a policy, access point 1106 may set up a proxy tunnel session (e.g., a TFAP tunnel) between an endpoint security agent (not shown), running on a requesting endpoint device (e.g., one of the off-net clients or one of the on-net clients) and acting as a proxy on behalf of a client application (e.g., a browser), and the target service. In some cases, the evaluation of the policies may include consulting LDAP and AD server 1110 regarding a user's AD group and/or domain. For example, access to one or more of protected servers and resources 1108 may be limited to a requesting endpoint that belongs to AD. In some examples, access to certain Virtual Local Area Networks (VLANs) may be based on the logged in user's AD group membership. Deny policies can be used with endpoints when they fall outside of security posture policies; for example, access may be denied to certain resources or network segments if an endpoint is tagged with critical vulnerabilities.

One or more components illustrated in FIG. 11 can utilize Zero-Trust Network Access (ZTNA) technologies and/or other functionalities that enable secure access to internal applications for local or remote users. In an example, one or more security applications operates using one or more ephemeral jobs in a containerized environment.

Figure 12:
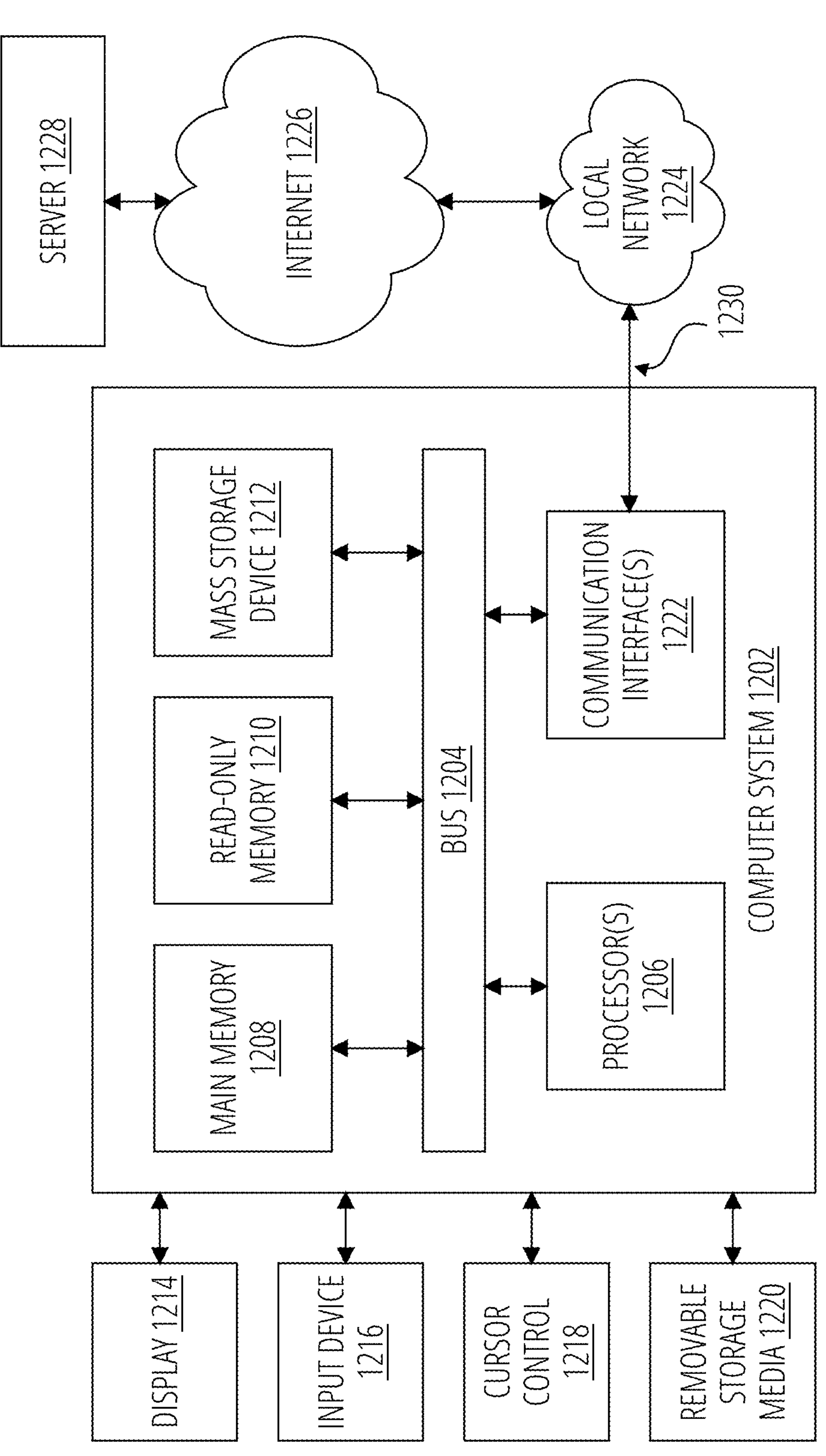
FIG. 12 is a block diagram that illustrates a computer system in which or with which an embodiment of the present disclosure may be implemented.

FIG. 12 is a block diagram that illustrates a computer system in which or with which an embodiment of the present disclosure may be implemented. Computer system 1202 may be representative of an endpoint or client device (e.g., one of the off-net clients or on-net clients) on which an endpoint security agent is running and acting as a proxy on behalf of a client application (e.g., a browser). Notably, components of computer system 1202 described herein are meant only to exemplify various possibilities. In no way should example computer system 1202 limit the scope of the present disclosure. In the context of the present example, computer system 1202 includes bus 1204 or other communication mechanism for communicating information and one or more processing resources (e.g., one or more hardware processor(s) 1206) coupled with bus 1204 for processing information. Hardware processor(s) 1206 may include, for example, one or more general-purpose microprocessors available from one or more current or future microprocessor manufacturers (e.g., Intel Corporation, Advanced Micro Devices, Inc., and/or the like) and/or one or more special-purpose processors (e.g., CPs, NPs, and/or accelerators or co-processors). In some examples, one or more processing resources may be part of an ASIC-based security processing unit (e.g., the FORTISP family of security processing units available from Fortinet, Inc. of Sunnyvale, CA).

Computer system 1202 also includes main memory 1208, such as a random-access memory (RAM) or other dynamic storage device, coupled to bus 1204 for storing information and instructions to be executed by processor(s) 1206. Main memory 1208 also may be used for storing temporary variables or other intermediate information during execution of instructions to be executed by processor(s) 1206. Such instructions, when stored in non-transitory storage media accessible to processor(s) 1206, render computer system 1202 into a special-purpose machine customized to perform the operations specified in the instructions.

Computer system 1202 includes a read-only memory 1210 or other static storage device coupled to bus 1204 for storing static information and instructions for processor(s) 1206. Mass storage device 1212 (e.g., a magnetic disk, optical disk or flash disk (made of flash memory chips), is provided and coupled to bus 1204 for storing information and instructions.

Computer system 1202 may be coupled via bus 1204 to display 1214 (e.g., a cathode ray tube (CRT), Liquid Crystal Display (LCD), Organic Light-Emitting Diode Display (OLED), Digital Light Processing Display (DLP) or the like, for displaying information to a computer user. Input device 1216, including alphanumeric and other keys, is coupled to bus 1204 for communicating information and command selections to processor(s) 1206. Another type of user input device is cursor control 1218, such as a mouse, a trackball, a trackpad, or cursor direction keys for communicating direction information and command selections to processor(s) 1206 and for controlling cursor movement on display 1214. This input device typically has two degrees of freedom in two axes, a first axis (e.g., x) and a second axis (e.g., y), that allows the device to specify positions in a plane.

Removable storage media 1220 can be any kind of external storage media, including, but not limited to, hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM), USB flash drives and the like.

Computer system 1202 may implement the techniques described herein using customized hard-wired logic, one or more ASICs or FPGAs, firmware or program logic which in combination with the computer system causes or programs computer system 1202 to be a special-purpose machine. According to one embodiment, the techniques herein are performed by computer system 1202 in response to processor(s) 1206 executing one or more sequences of one or more instructions contained in main memory 1208. Such instructions may be read into main memory 1208 from another storage medium, such as mass storage device 1212. Execution of the sequences of instructions contained in main memory 1208 causes processor(s) 1206 to perform the process steps described herein. In alternative embodiments, hard-wired circuitry may be used in place of or in combination with software instructions.

The term "storage media" as used herein refers to any non-transitory media that store data or instructions that cause a machine to operation in a specific fashion. Such storage media may comprise non-volatile media or volatile media. Non-volatile media includes, for example, optical, magnetic, or flash disks, such as mass storage device 1212. Volatile media includes dynamic memory, such as main memory 1208. Common forms of storage media include, for example, a flexible disk, a hard disk, a solid-state drive, a magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media.

For example, transmission media includes coaxial cables, copper wires, and fiber optics, including the wires that comprise bus 1204. Transmission media can also be acoustic or light waves, such as those generated during radio-wave and infrared data communications.

Various forms of media may be involved in carrying one or more sequences of one or more instructions to processor(s) 1206 for execution. For example, the instructions may initially be carried on a magnetic disk or solid-state drive of a remote computer. The remote computer can load the instructions into its dynamic memory and send the instructions over a telephone line using a modem. A modem local to computer system 1202 can receive the data on the telephone line and use an infra-red transmitter to convert the data to an infra-red signal. An infra-red detector can receive the data from the infra-red signal, and appropriate circuitry can place the data on bus 1204. Bus 1204 carries the data to main memory 1208, from which processor(s) 1206 retrieve and execute the instructions. The instructions received by main memory 1208 may optionally be stored on mass storage device 1212 either before or after execution by processor(s) 1206.

Computer system 1202 also includes communication interface(s) 1222 coupled to bus 1204. Communication interface(s) 1222 provides a two-way data communication coupling to network link 1230 that is connected to local network 1224. For example, communication interface(s) 1222 may be an integrated services digital network (ISDN) card, cable modem, satellite modem, or a modem to provide a data communication connection to a corresponding type of telephone line. Another example is communication interface(s) 1222, which may be a local area network (LAN) card that provides a data communication connection to a compatible LAN. Wireless links may also be implemented. In any such implementation, communication interface(s) 1222 sends and receives electrical, electromagnetic or optical signals that carry digital data streams representing various types of information.

Network link 1230 typically provides data communication through one or more networks to other data devices. Local network 1224 and internet 1226 both use electrical, electromagnetic or optical signals that carry digital data streams. The signals through the various networks and network link 1230 and through communication interface(s) 1222, which carry the digital data to and from computer system 1202, are example forms of transmission media.

Computer system 1202 can send messages and receive data, including program code, through the network(s), network link 1230 and communication interface(s) 1222. In the Internet example, server 1228 might transmit a requested code for an application program through internet 1226, local network 1224 and communication interface(s) 1222. The received code may be executed by processor(s) 1206 as it is received or stored in mass storage device 212 or other non-volatile storage for later execution.

Embodiments may be implemented as any or a combination of one or more microchips or integrated circuits interconnected using a parent board, hardwired logic, software stored by a memory device and executed by a microprocessor, firmware, an application-specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include but is not limited to, floppy diskettes, optical disks, CD-ROMs (Compact Disc-Read Only Memories), magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

The drawings and the forgoing description give examples of embodiments. Those skilled in the art will appreciate that one or more of the described elements may be combined into a single functional element. Alternatively, certain elements may be split into multiple functional elements. Elements from one embodiment may be added to another embodiment. For example, orders of processes described herein may be changed and are not limited to the manner described herein. Moreover, the actions in any flow diagram need not be implemented in the order shown, nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as the following claims.

Reference in the specification to "one example" or "an example" means that a particular feature, structure, or characteristic described in connection with the example is included in at least one embodiment of the disclosure. The appearances of the phrase "in one example" in various places in the specification do not necessarily refer to the same embodiment.

It is contemplated that any number and type of components may be added to and/or removed to facilitate various embodiments, including adding, removing, and/or enhancing certain features. For brevity, clarity, and case of understanding, many standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

The terms "component," "module," "system," and the like as used herein are intended to refer to a computer-related entity, either software-executing general-purpose processor, hardware, firmware, or a combination thereof. For example, a component may be, but is not limited to, a process running on a processor, a processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various non-transitory, computer-readable media with various data structures stored thereon. The components may communicate via local and/or remote processes, such as in accordance with a signal having one or more data packets (e.g., data from one component interacting with another component in a local system, distributed system, and/or across a network such as the Internet with other systems via the signal).

Computer-executable components can be stored, for example, on non-transitory, computer-readable media including, but not limited to, an ASIC, CD, DVD, ROM, floppy disk, hard disk, EEPROM, memory stick or any other storage device type, in accordance with the claimed subject matter.

What is claimed is:

1. A method comprising:

receiving, with an ephemeral job controller, a request to initiate an ephemeral job within a computing environment having one or more containers and corresponding container support functionality;

analyzing, with the ephemeral job controller, the request to initiate the ephemeral job to determine resources and/or limits based on a target container to which an ephemeral job is to be deployed;

initiating, with the ephemeral job controller, the ephemeral job corresponding to the request in the target container with limits determined from the target container;

obtaining, with the ephemeral job controller, one or more metrics from the target container via the ephemeral job;

providing, with the ephemeral job controller, the one or more metrics to a remote entity outside of the target container; and terminating, with the ephemeral job controller and within a pre-specified period of time, the ephemeral job.

2. The method of claim 1, further comprising initiating and monitoring, with the ephemeral job controller, a plurality of ephemeral jobs across a corresponding plurality of containers.

3. The method of claim 1, wherein the ephemeral job controller is configured to support one or more of: rate limits on pods and/or Internet Protocol (IP) addresses, per-namespace resource limiting, feedback looks between orchestrator and job controller, running Spark jobs as either ephemeral or persisted jobs, multi-tenancy, intelligent scheduling, and load balancing across multiple managed service clusters.

4. The method of claim 1, wherein the one or more metrics are utilized to generate a polygraph to establish a baseline of behavior allowing for the future detection of deviations from that baseline.

5. The method of claim 4, wherein polygraph data is maintained for a set of applications in a datacenter, and such polygraph data is combined to make a datacenter view across the set of applications.

6. The method of claim 1, wherein the ephemeral job comprises a Spark-compliant job.

7. The method of claim 1, wherein the container comprises a Kubernetes-compliant container.

8. A non-transitory computer-readable medium having stored therein instructions that, when executed by one or more hardware processors, are configurable to cause the one or more hardware processors to:

receive, with an ephemeral job controller, a request to initiate an ephemeral job within a computing environment having one or more containers and corresponding container support functionality;

analyze, with the ephemeral job controller, the request to initiate the ephemeral job to determine resources and/or limits based on a target container to which an ephemeral job is to be deployed;

initiate, with the ephemeral job controller, the ephemeral job corresponding to the request in the target container with limits determined from the target container;

obtain, with the ephemeral job controller, one or more metrics from the target container via the ephemeral job;

provide, with the ephemeral job controller, the one or more metrics to a remote entity outside of the target container; and terminate, with the ephemeral job controller and within a pre-specified period of time, the ephemeral job.

9. The non-transitory computer-readable medium of claim 8 further comprising instructions that, when executed by the one or more hardware processors, are configurable to cause the one or more hardware processors to:

initiate, with the ephemeral job controller, a plurality of ephemeral jobs across a corresponding plurality of containers; and monitor, with the ephemeral job controller, the plurality of ephemeral jobs across the corresponding plurality of containers.

10. The non-transitory computer-readable medium of claim 8, wherein the ephemeral job controller is configured to support one or more of: rate limits on pods and/or Internet Protocol (IP) addresses, per-namespace resource limiting, feedback looks between orchestrator and job controller, running Spark jobs as either ephemeral or persisted jobs, multi-tenancy, intelligent scheduling, and load balancing across multiple managed service clusters.

11. The non-transitory computer-readable medium of claim 8, wherein the one or more metrics are utilized to generate a polygraph to establish a baseline of behavior allowing for the future detection of deviations from that baseline.

12. The non-transitory computer-readable medium of claim 11, wherein polygraph data is maintained for a set of applications in a datacenter, and such polygraph data is combined to make a datacenter view across the set of applications.

13. The non-transitory computer-readable medium of claim 8, wherein the ephemeral job comprises a Spark-compliant job.

14. The non-transitory computer-readable medium of claim 8, wherein the container comprises a Kubernetes-compliant container.

15. A system comprising:

a memory subsystem having a plurality of memory devices; and a set of hardware processors coupled with the memory subsystem, the set of hardare processors configurable to:

receive a request to initiate an ephemeral job within a computing environment having one or more containers and corresponding container support functionality;

analyze the request to initiate the ephemeral job to determine resources and/or limits based on a target container to which an ephemeral job is to be deployed;

initiate the ephemeral job corresponding to the request in the target container with limits determined from the target container;

obtain one or more metrics from the target container via the ephemeral job;

provide the one or more metrics to a remote entity outside of the target container; and terminate within a pre-specified period of time, the ephemeral job.

16. The system of claim 15, wherein the set of hardware processors are further configurable to:

initiate a plurality of ephemeral jobs across a corresponding plurality of containers; and monitor the plurality of ephemeral jobs across the corresponding plurality of containers.

17. The system of claim 15, wherein the ephemeral job controller is configured to support one or more of: rate limits on pods and/or Internet Protocol (IP) addresses, per-namespace resource limiting, feedback looks between orchestrator and job controller, running Spark jobs as either ephemeral or persisted jobs, multi-tenancy, intelligent scheduling, and load balancing across multiple managed service clusters.

18. The system of claim 15, wherein the one or more metrics are utilized to generate a polygraph to establish a baseline of behavior allowing for the future detection of deviations from that baseline.

19. The system of claim 18, wherein polygraph data is maintained for a set of applications in a datacenter, and such polygraph data is combined to make a datacenter view across the set of applications.

20. The system of claim 15, wherein the ephemeral job comprises a Spark-compliant job.

* * * * *